(12) United States Patent
Liu et al.

(10) Patent No.: US 12,184,168 B2
(45) Date of Patent: Dec. 31, 2024

(54) SWITCHED CAPACITOR VOLTAGE CONVERTER CIRCUIT AND SWITCHED CAPACITOR VOLTAGE CONVERSION METHOD

(71) Applicant: Richtek Technology Corporation, Zhubei (TW)

(72) Inventors: Kuo-Chi Liu, Hsinchu (TW); Ta-Yung Yang, Taoyuan (TW); Chung-Lung Pai, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 314 days.

(21) Appl. No.: 17/838,195

(22) Filed: Jun. 11, 2022

(65) Prior Publication Data

US 2023/0028873 A1 Jan. 26, 2023

Related U.S. Application Data

(60) Provisional application No. 63/225,335, filed on Jul. 23, 2021.

(30) Foreign Application Priority Data

May 24, 2022 (TW) .................................. 111119354

(51) Int. Cl.
*H02M 3/07* (2006.01)
*H02M 1/00* (2006.01)

(52) U.S. Cl.
CPC ............ *H02M 3/07* (2013.01); *H02M 1/0058* (2021.05)

(58) Field of Classification Search
CPC .... H02M 3/07; H02M 1/0058; H02M 1/0054; H02M 3/01
See application file for complete search history.

(56) References Cited

U.S. PATENT DOCUMENTS

| 11,165,335 | B2 * | 11/2021 | Sblano | H02M 3/1584 |
| 2021/0328507 | A1 * | 10/2021 | Liu | H02M 1/0095 |
| 2021/0367520 | A1 * | 11/2021 | Liu | H02M 3/158 |

* cited by examiner

*Primary Examiner* — Kyle J Moody
(74) *Attorney, Agent, or Firm* — Tung & Associates

(57) ABSTRACT

A switched capacitor voltage converter circuit includes: a switched capacitor converter and a control circuit; wherein the control circuit adjusts operation frequencies and/or duty ratios of operation signals which control switches of the switched capacitor converter, so as to adjust a ratio of a first voltage to a second voltage to a predetermined ratio. When the control circuit decreases the duty ratios of the operation signals, if a part of the switches of the switched capacitor converter are turned ON, an inductor current flowing toward the second voltage is in a first state; if the inductor current continues to flow via a current freewheeling path, the inductor current flowing toward the second voltage becomes in a second state. A corresponding inductor is thereby switched between the first state and the second state to perform inductive power conversion.

34 Claims, 32 Drawing Sheets

Q3, Q5, Q6, Q10 : are always OFF
C3, C2 are floating

Q5, Q6 : are always OFF
C2 are floating

SWITCHED CAPACITOR VOLTAGE CONVERTER CIRCUIT AND SWITCHED CAPACITOR VOLTAGE CONVERSION METHOD

CROSS REFERENCE

The present invention claims priority to U.S. 63/225,335 filed on Jul. 23, 2021 and claims priority to TW 111119354 filed on May 24, 2022.

BACKGROUND OF THE INVENTION

Field of Invention

The present invention relates to a switched capacitor voltage converter circuit, and in particular to such switched capacitor voltage converter circuit capable of adjusting a ratio between an input voltage and an output voltage. The present invention also relates to a switched capacitor voltage conversion method.

Description of Related Art

FIG. 1 shows a conventional voltage step-down converter 10. An inductor L of the conventional voltage step-down converter circuit 10 needs to withstand a voltage stress of the level of the input voltage, so it requires a large size inductor with a high inductance. In general, by operating in a higher switching frequency, the converter can use a smaller size inductor. However, the switching power loss also increases significantly along with the high switching frequency and the high input voltage (with respect to the switches).

In view of the drawback of the prior art, the present invention proposes an innovated switched capacitor voltage converter circuit.

SUMMARY OF THE INVENTION

In one aspect, the present invention provides a switched capacitor voltage converter circuit configured to convert a first voltage into a second voltage or to convert the second voltage into the first voltage, the switched capacitor voltage converter circuit comprising: a switched capacitor converter coupled between the first voltage and second voltage; and a control circuit configured to generate a control signal to control the switched capacitor converter to convert the first voltage to the second voltage or to convert the second voltage to first voltage; wherein the switched capacitor converter includes: at least one resonant capacitor; a plurality of switches coupled to the at least one resonant capacitor; and at least one inductor; wherein the control signal generated by the control circuit includes a first operation signal and a second operation signal, wherein the first operation signal is configured to operate first plural switches of the plurality of switches, and the second operation signal is configured to operate second plural switches of the plurality of switches; wherein, in a first process, the first operation signal controls the first switches so that the at least one resonant capacitor and a corresponding one of the at least one inductor are connected in series between the first voltage and second voltage, to form a first current path and to operate in resonant operation; wherein, in at least one second process, the second operation signal controls the second switches so that the at least one resonant capacitor and the corresponding inductor are connected in series between the second voltage and a DC potential, to simultaneously form or sequentially form a plurality of second current paths and operate in resonant operation; wherein the first switches and the second switches have respective conduction periods which do not overlap each other, so that the first process and the second process do not overlap each other; wherein the control circuit adjusts an operation frequency and/or a duty ratio of the first operation signal and/or an operation frequency and/or a duty ratio of the second operation signal according to a predetermined ratio, so as to adjust a ratio between the first voltage and second voltage to the predetermined ratio; wherein the first process and the at least one second processes are performed in a repeated, alternating manner, so as to convert the first voltage into a second voltage or to convert the second voltage into a first voltage; wherein when the control circuit decreases the duty ratio of the first operation signal and/or the second operation signal according to the predetermined ratio, in the first process and/or the second process, when the first switches and/or the second switches are turned ON, an inductor current flowing toward the second voltage is in a first state, wherein the first state is that the inductor current flowing toward the second voltage is a resonant current, and wherein when the control circuit decreases the duty ratio of the first operation signal and/or the second operation signal according to the predetermined ratio, in the first process and/or in the second process, the inductor current flowing through the corresponding inductor keeps freewheeling along a current freewheeling path, whereby the inductor current flowing toward the second voltage is in a second state, such that the corresponding inductor switches between the first state and second state to perform inductive power conversion.

From another perspective, the present invention provides a switched capacitor voltage conversion method for converting a first voltage into a second voltage or the second voltage into the first voltage, the switched capacitor voltage conversion method comprising: operating a plurality of first switches according to a first operation signal; operating a plurality of second switches according to a second operation signal; wherein, in a first process, the first operation signal controls the first switches so that at least one resonant capacitor and a inductor are connected in series between the first voltage and second voltage, to form a first current path and to operate in resonant operation; wherein, in at least one second process, the second operation signal controls the second switches so that the at least one resonant capacitor and the inductor are connected in series between the second voltage and a DC potential, to simultaneously form or sequentially form a plurality of second current paths and operate in resonant operation; and adjusting an operation frequency and/or a duty ratio of the first operation signal and/or an operation frequency and/or a duty ratio of the second operation signal according to a predetermined ratio, so as to adjust a ratio between the first voltage and second voltage to the predetermined ratio; wherein the first switches and the second switches have respective conduction periods which do not overlap each other, so that the first process and the second process do not overlap each other; wherein the first process and the at least one second processes are performed in a repeated, alternating manner, so as to convert the first voltage into a second voltage or to convert the second voltage into a first voltage; wherein when the duty ratio of the first operation signal and/or the second operation signal is decreased according to the predetermined ratio, in the first process and/or the second process, when the first switches and/or the second switches are turned ON, an inductor current flowing toward the second voltage is in a first state, wherein the first state is that the inductor current flowing toward the second voltage is a resonant current, and wherein when the duty ratio of the first operation signal and/or the second operation signal is decreased according to the predetermined ratio, in the first process and/or in the second process, the inductor current flowing through the corresponding inductor keeps freewheeling along a current freewheeling path, whereby the inductor current flowing toward the second voltage is in a second state, such that the corresponding inductor switches between the first state and second state to perform inductive power conversion.

In one embodiment, when the control circuit decreases the duty ratio of the first operation signal and/or the second operation signal according to the predetermined ratio, in the first process and/or the second process, when the first switches and the second switches are all non-conductive, one end of the corresponding inductor is conducted through the body diode of at least one switch to the DC potential, so that the inductor current flowing toward the second voltage is the linear ramp current, to adjust the predetermined ratio.

In one embodiment, when the control circuit decreases the duty ratio of the first operation signal and/or the second operation signal according to the predetermined ratio, in the first process and/or the second process, when the first switches and the second switches are non-conductive, by means of a conduction of the body diode in at least one of the switches, the inductor current flowing through the corresponding inductor keeps freewheeling along a closed-loop formed by a resonant tank and the body diode in the at least one switch, so that the second state is that the inductor current stops flowing toward the second voltage, wherein the resonant tank is formed by the at least one resonant capacitor and the corresponding inductor.

In one embodiment, the switched capacitor voltage conversion method further includes providing a non-resonant capacitor coupled to the resonant capacitor, wherein a voltage across the non-resonant capacitor is maintained at a constant DC voltage in the first process and second process.

In one embodiment, the switched capacitor voltage conversion method further includes providing a switched capacitor converter, the switched capacitor converter including the plurality of first switches, the plurality of second switches, the at least one resonant capacitor and the inductor, wherein the switched capacitor converter comprises a distributed switched capacitor converter, series-parallel switched capacitor converter, Dickson switched capacitor converter, ladder switched capacitor converter, voltage doubler switched capacitor converter, Fibonacci switched capacitor converter, pipelined switched capacitor converter, or switched cavity converter.

In one embodiment, the switched capacitor voltage conversion method further includes: sensing a current flowing through the at least one inductor to generate a current sensing signal; and generating the first operation signal and/or the second operation signal according to the current sensing signal and the predetermined ratio.

In one embodiment, the second state is that the inductor current flowing toward the second voltage is a non-resonant current.

In one embodiment, the second state is that the inductor current stops flowing toward the second voltage, or the inductor current flowing toward the second voltage is a linear ramp current.

In one embodiment, in the first process and/or the second process, when the first switches and the second switches are non-conductive, the inductor current is in the second state, and the current freewheeling path along which the inductor current flows includes a body diode in a corresponding switch of the first or second switches.

In one embodiment, when the control circuit decreases the duty ratio of the first operation signal and/or the duty ratio of the second operation signal according to the predetermined ratio, in the first process and/or the second process, when the first switches and the second switches are all non-conductive, one end of the corresponding inductor is conducted through the body diode of at least one switch to the DC potential, so that the inductor current flowing toward the second voltage is the linear ramp current, to adjust the predetermined ratio.

In one embodiment, when the control circuit decreases the duty ratio of the first operation signal and/or the second operation signal according to the predetermined ratio, in the first process and/or the second process, when the first switches and the second switches are non-conductive, by means of a conduction of the body diode in at least one of the switches, the inductor current flowing through the corresponding inductor keeps freewheeling along a closed-loop formed by a resonant tank and the body diode in the at least one switch, so that the second state is that the inductor current stops flowing toward the second voltage, wherein the resonant tank is formed by the at least one resonant capacitor and the at least one inductor.

In one embodiment, in the first process and/or the second process, after the inductor current flowing through the corresponding inductor is decreased to zero, the switches remain non-conductive for a zero-current period.

In one embodiment, the switched capacitor voltage converter circuit further comprises a non-resonant capacitor coupled to the resonant capacitor, wherein a voltage across the non-resonant capacitor is maintained at a constant DC voltage in the first process and the second process.

In one embodiment, the first voltage is twice the second voltage, and the first operation signal and second operation signal have respective corresponding operation frequencies.

In one embodiment, the duty ratio of the first operation signal and the duty ratio of the second operation signal are both 50%.

In one embodiment, the predetermined ratio is a ratio of the first voltage to the second voltage, and the operation frequency of the first operation signal and/or the operation frequency of the second operation signal is in positive correlation to the predetermined ratio.

In one embodiment, the operation frequency of the first operation signal is higher than a resonant frequency of the at least one resonant capacitor and the corresponding inductor in the first process, and the operation frequency of the second operation signal is higher than a resonant frequency of the at least one resonant capacitor and the corresponding inductor in the second process.

In one embodiment, the predetermined ratio is a positive integer not less than 2.

In one embodiment, the switched capacitor converter comprises a distributed switched capacitor converter, series-parallel switched capacitor converter, Dickson switched capacitor converter, ladder switched capacitor converter, doubler switched capacitor converter, Fibonacci switched capacitor converter, pipelined switched capacitor converter, and switched tank converter.

In one embodiment, the series-parallel switched capacitor converter includes: a 2-to-1 series-parallel switched capacitor converter, 3-to-1 series-parallel switched capacitor converter, or 4-to-1 series-parallel switched capacitor converter.

In one embodiment, the DC potential is ground potential.

In one embodiment, the control circuit comprises: a current sensing circuit for sensing a current flowing through the at least one inductor to generate a current sensing signal; and a control signal generation circuit which is coupled to the current sensing circuit and which is configured to generate the control signal according to the current sensing signal and predetermined ratio.

Advantages of this invention include: by adjusting the duty ratios and the operation frequencies and by keeping the inductor current freewheeling, this invention improves the power conversion efficiency, reduces the switching loss, reduces the voltage stress on the switches and the inductor, reduces the required size of the inductor, and the output voltage is adjustable.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
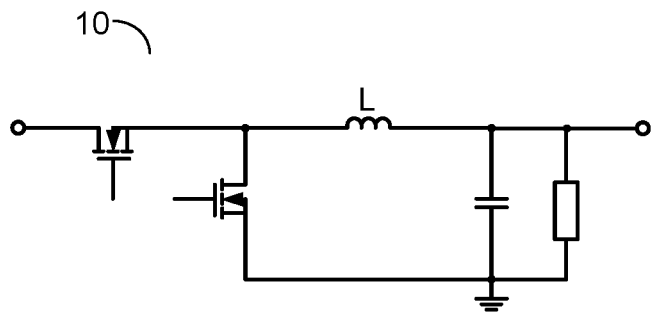
FIG. 1 shows a schematic diagram of a conventional voltage step-down converter.
Figure 2A:
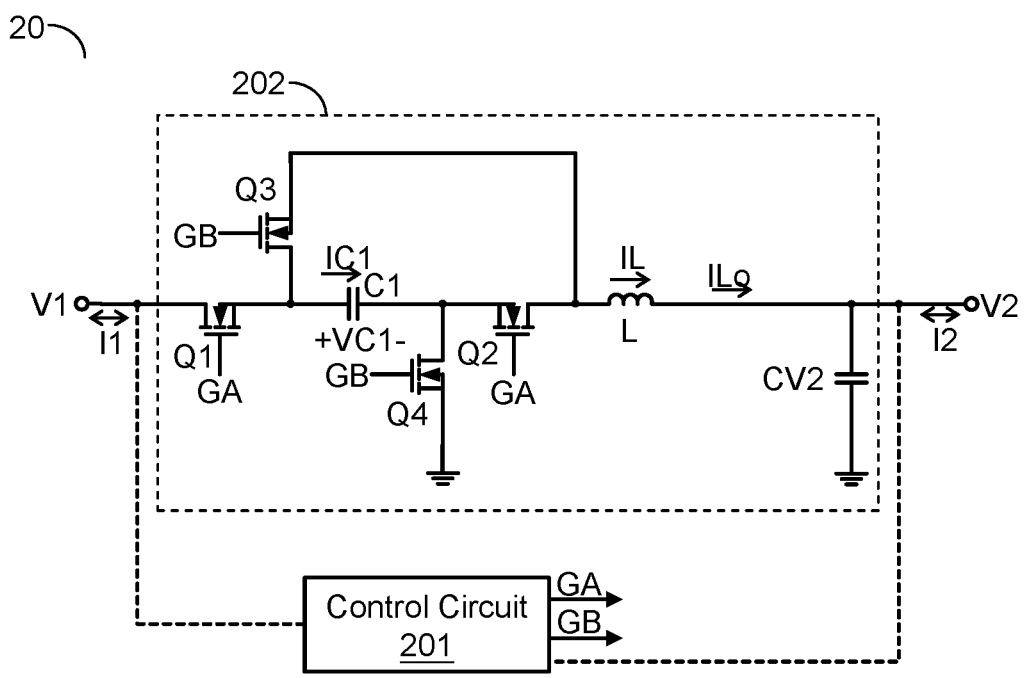
FIG. 2A shows a schematic circuit diagram of a switched capacitor voltage converter circuit according to an embodiment of the present invention.

FIG. 2A shows a schematic circuit diagram of a switched capacitor voltage converter circuit according to an embodiment of the present invention. As shown in FIG. 2A, the switched capacitor voltage converter circuit 20 is configured to convert the first voltage V1 to the second voltage V2 or to convert the second voltage V2 to the first voltage V1. The switched capacitor voltage converter circuit 20 includes a control circuit 201 and a switched capacitor converter 202. The switched capacitor converter 202 is coupled between the first voltage V1 and the second voltage V2. The control circuit 201 is configured to generate a control signal for controlling the switched capacitor converter 202 to convert the first voltage V1 to the second voltage V2 or convert the second voltage V2 to the first voltage V1. The switched capacitor converter 202 includes at least one resonant capacitor C1, plural switches (e.g., switches Q1~Q4), and at least one inductor L. The inductor L is coupled to the at least one resonant capacitor C1. The control signal generated by the control circuit 201 includes a first operation signal GA and a second operation signal GB. The first operation signal GA is configured to operate first switches (e.g., switches Q1 and Q2) of the plural switches (e.g., switches Q1~Q4) and the second operation signal GB is configured to operate second switches (e.g., switches Q3 and Q4) of the plural switches (e.g., switches Q1~Q4).

In a first process, the first operation signal GA controls the first switches (e.g., switches Q1 and Q2) such that the at least one resonant capacitor C1 and the corresponding inductor L are connected in series between the first voltage V1 and second voltage V2, so as to form a first current path and operate in resonant operation. In at least one second process, the second operation signal GB controls the second switches (e.g., switches Q3 and Q4) such that the at least one resonant capacitor C1 and the corresponding inductor L are connected in series between the second voltage V2 and the DC potential, so as to simultaneously form or sequentially form plural second current paths and operate in resonant operation. In one embodiment, the control circuit 201 regulates the operation frequencies and/or the duty ratios of the first operation signal GA and/or of the second operation signal GB according to a predetermined ratio and adjusts the ratio between the first voltage V1 and second voltage V2 to the predetermined ratio. The first process and the at least one second process are performed in a repeated, alternating manner, to convert the first voltage V1 to the second voltage V2 or convert the second voltage V2 to the first voltage V1. In one embodiment, the first voltage V1 is 2-fold of the second voltage V2, and the first operation signal GA and the second operation signal GB have respective corresponding operation frequencies. In one embodiment, the predetermined ratio is the ratio of the first voltage V1 to the second voltage V2, and the operation frequencies of the first operation signal GA and/or the second operation signal GB are in positive correlation with the predetermined ratio. In one embodiment, the operation frequency of the first operation signal GA is higher than the resonant frequency of the at least one resonant capacitor C1 and the corresponding inductor L in the first process, and the operation frequency of the second operation signal GB is higher than the resonant frequency of the at least one resonant capacitor C1 and the corresponding inductor L in the second process. In one embodiment, the above-mentioned DC potential is ground potential.

Figure 2B:
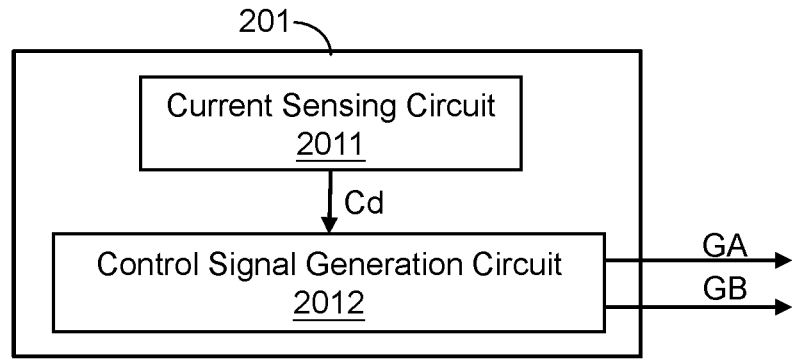
FIG. 2B shows a schematic circuit block diagram of a control circuit of a switched capacitor voltage converter circuit according to an embodiment of the present invention.

FIG. 2B shows a schematic circuit block diagram of a control circuit of switched capacitor voltage converter circuit according to an embodiment of the present invention. Please refer to FIG. 2A and FIG. 2B. In one embodiment, the control circuit 201 includes a current sensing circuit 2011 and a control signal generation circuit 2012. The current sensing circuit 2011 is configured to sense the current flowing through the at least one inductor L to generate at least one corresponding current sensing signal Cd. The control signal generation circuit 2012 is coupled to the current sensing circuit 2011 configured to generate the control signal according to the current sensing signal Cd and predetermined ratio.

Figure 2C:
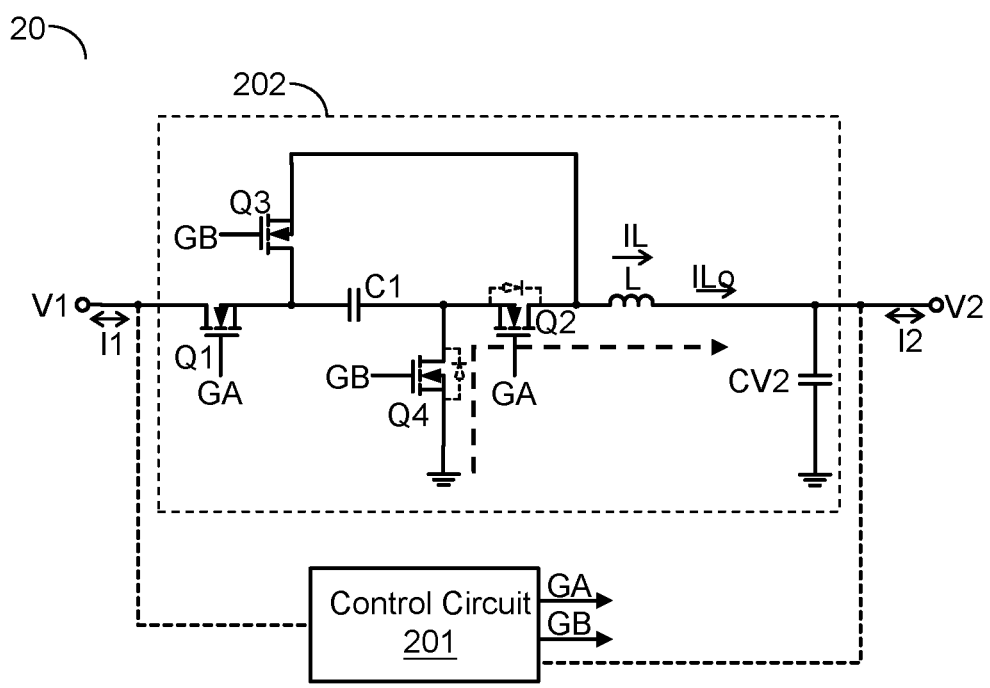
FIG. 2C shows a schematic circuit diagram of a control circuit of a switched capacitor voltage converter circuit according to an embodiment of the present invention.

FIG. 2C shows a schematic circuit diagram of a switched capacitor voltage converter circuit according to an embodiment of the present invention. Referring to FIG. 2A, when the control circuit 201 decreases the duty ratio of the first operation signal GA and/or the duty ratio of the second operation signal GB according to the predetermined ratio, in the first process and/or the second process, when the first switches (e.g., switches Q1 and Q2) and/or the second switches (e.g., switches Q3 and Q4) are turned ON, the inductor current ILo flowing toward the second voltage V2 is in a first state. In one embodiment, the first state is that the inductor current ILo flowing toward the second voltage V2 is a resonant current.

Referring to FIG. 2C again, when the control circuit 201 decreases the duty ratio of the first operation signal GA and/or the duty ratio of the second operation signal GB according to the predetermined ratio, in the first process and/or the second process, the inductor current IL flowing through the corresponding inductor L will continue to freewheel through a current freewheeling path, so that the inductor current ILo flowing toward the second voltage V2 becomes a second state. Thus, the corresponding inductor L switches between the first state and the second state to perform inductive power conversion.

The above-mentioned current freewheeling path can be embodied in various forms. For example, referring to FIG. 2C, when the control circuit 201 decreases the duty ratio of the first operation signal GA and/or the second operation signal GB according to the predetermined ratio, in the first process and/or the second process, when the first switches (e.g., switches Q1 and Q2) and the second switches (e.g., switches Q3 and Q4) are non-conductive, the inductor current IL flowing through the corresponding inductor L will freewheel through the conduction of the body diode (shown by the dashed line in FIG. 2C) of at least one switch (e.g., switches Q2 and Q4), whereby the inductor current ILo flowing toward the second voltage V2 is in the second state. As such, the corresponding inductor L switches between the first state and the second state to perform inductive power conversion. In this case, the current freewheeling path includes the body diodes in the non-conductive switches Q2 and Q4.

In another embodiment of the current freewheeling path, for example, referring to FIG. 2C, when the control circuit 201 decreases the duty ratio of the first operation signal GA and/or the second operation signal GB according to the predetermined ratio, in the first process and/or the second process, when the switches Q1 and Q3 are non-conductive, and the switches Q2 and Q4 are both turned ON, the inductor current IL flowing through the corresponding inductor L continues flowing through the conductive switches Q2 and Q4, whereby the inductor current ILo flowing toward the second voltage V2 is in the second state. As such, the corresponding inductor L switches between the first state and the second state to perform inductive power conversion. In this case, the current freewheeling path includes the conductive switches Q2 and Q4.

In one embodiment, the second state is that the inductor current ILo flowing toward the second voltage V2 is a non-resonant current. In a preferred embodiment, the second state is that the inductor current ILo stops flowing toward the second voltage V2 or the inductor current ILo flowing toward the second voltage V2 is a linear ramp current. In the embodiment shown in FIG. 2C, the inductor current ILo flowing toward the second voltage V2 is a linear ramp current.

In a preferred embodiment, when the control circuit 201 decreases the duty ratio of the first operation signal GA and/or the second operation signal GB according to the predetermined ratio, in the first process and/or the second process, when the plural switches (e.g., switches Q1~Q4) are all non-conductive, one end of the corresponding inductor L is connected to the body diode (shown as the dotted line in FIG. 2C) of at least one switch (such as the switches Q2 and Q4) to be conducted at a DC potential, so that the inductor current ILo flowing toward the second voltage V2 is a linear ramp current, so as to adjust the predetermined ratio. For example, the inductor L is connected in series between the second voltage V2 and ground potential through the body diodes of the switches Q4 and Q2, so that the inductor current IL can freewheel according to the current direction shown by the dashed arrow in FIG. 2C; as an example, the inductor current ILo flowing toward the second voltage V2 is a linear ramp current to adjust the predetermined ratio.

Figure 3A:
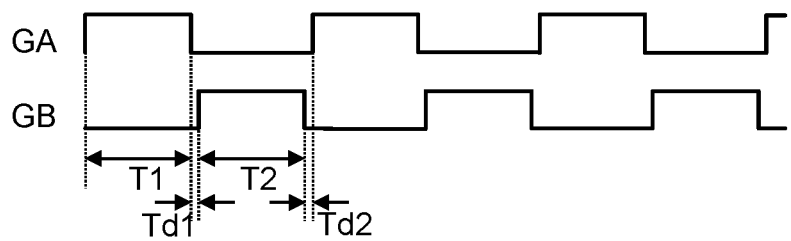
FIG. 3A shows a schematic diagram of waveforms of related signals of a control circuit of a switched capacitor voltage converter circuit according to an embodiment of the present invention.

FIG. 3A shows a schematic diagram of waveforms of related signals of a control circuit of a switched capacitor voltage converter circuit according to an embodiment of the present invention. FIG. 3A shows the first operation signal GA and the second operation signal GB when the duty ratios are not adjusted. The duty ratio of the first operation signal GA and the duty ratio of the second operation signal GB are both about 50%. As shown in FIG. 3A, the conduction period T1 of the first switches (e.g., switches Q1 and Q2) and the conduction period T2 of the second switches (e.g., switches Q3 and Q4) do not overlap with each other, so that the first process and the second process do not overlap each other.

Figure 3B:
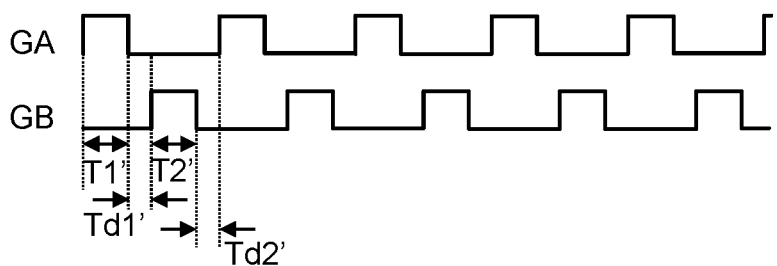
FIG. 3B shows a schematic diagram of waveforms of related signals of a control circuit of a switched capacitor voltage converter circuit according to an embodiment of the present invention.

FIG. 3B shows a schematic diagram of waveforms of related signals of a control circuit of a switched capacitor voltage converter circuit according to an embodiment of the present invention. FIG. 3B shows the first operation signal GA and the second operation signal GB after the duty ratios are decreased. As shown in FIG. 3A and FIG. 3B, after the duty ratios are decreased, the conduction period T1 of the first switches (e.g., switches Q1 and Q2) and the conduction period T2 of the second switches (e.g., switches Q3 and Q4) are decreased to conductive periods T1' and T2', respectively. The delay times Td1 and Td2 are respectively increased to the delay times Td1' and Td2'.

Figure 3C:
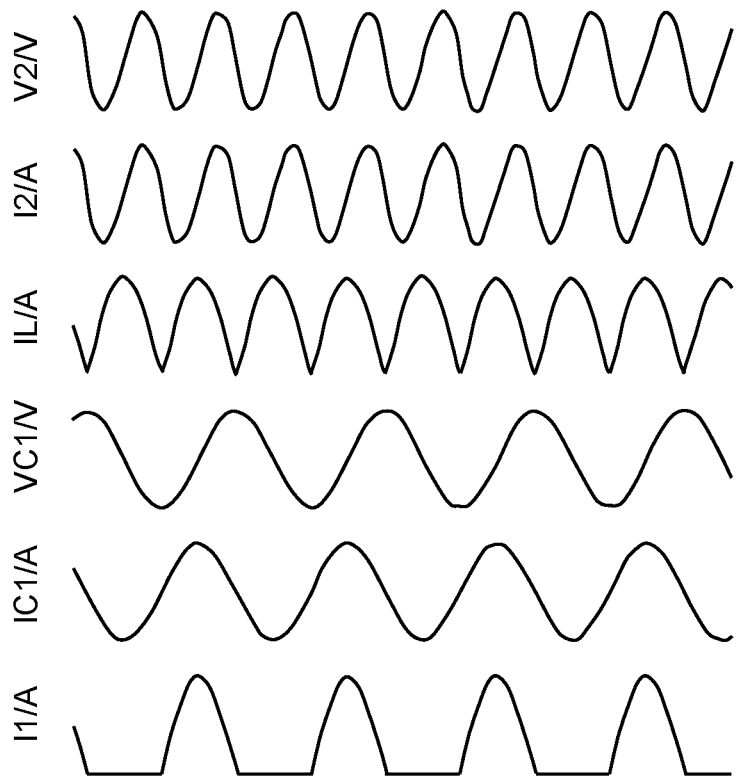
FIG. 3C shows a schematic circuit diagram of waveforms of related signals of a switched capacitor voltage converter circuit according to an embodiment of the present invention.
Figure 3D:
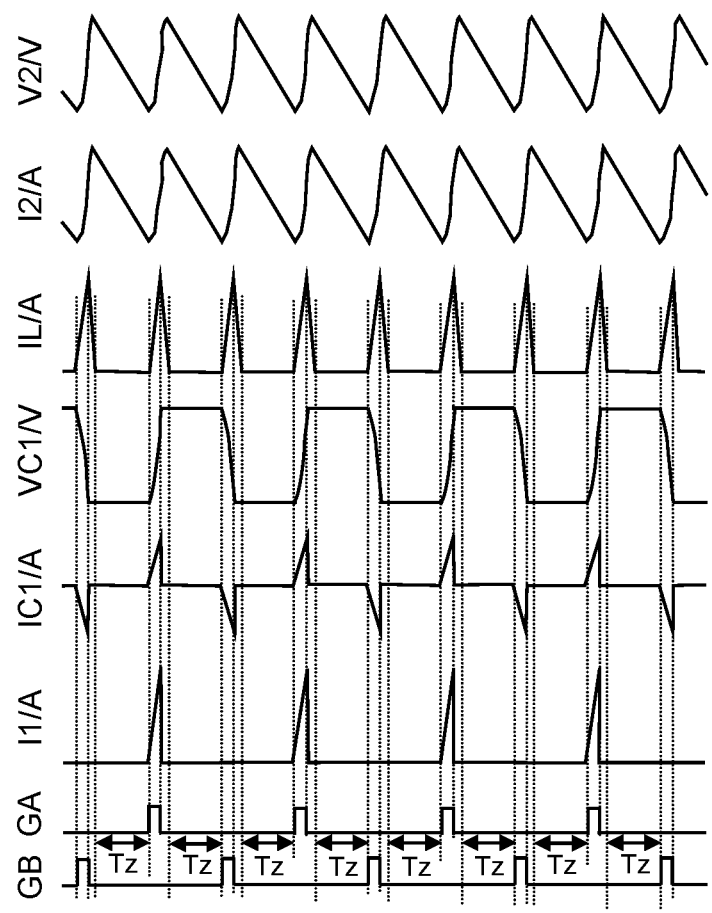
FIG. 3D shows a schematic circuit diagram of waveforms of related signals of a switched capacitor voltage converter circuit according to another embodiment of the present invention.

FIG. 3C shows a schematic diagram of waveforms of related signals of a control circuit of a switched capacitor voltage converter circuit according to an embodiment of the present invention. This embodiment is a schematic diagram of signal waveforms when the duty ratios and operation frequencies are not adjusted. The second voltage V2, second current I2, inductor current IL, resonant capacitor span-voltage VC1, resonant capacitive current IC1, and first current I1 are shown in FIG. 3C. In this embodiment the first voltage V1 is 48V and second voltage V2 is 24V. FIG. 3D shows a schematic circuit diagram of waveforms of related signals of a switched capacitor voltage converter circuit according to another embodiment of the present invention. This embodiment is a schematic diagram of the signal waveforms when the duty ratios are decreased but the operation frequencies remain unchanged. The second voltage V2, second current I2, inductor current IL, resonant capacitor span-voltage VC1, resonant capacitive current IC1, first current I1, first operation signal GA, and second operation signal GB are shown in FIG. 3D. In this embodiment the first voltage V1 is 48V and second voltage V2 is 16V. In this embodiment and other embodiments. As shown in FIG. 3D, in the first process and/or the second process, after the inductor current IL flowing through corresponding inductor L is decreased to zero, the plural switches (e.g., switches Q1~Q4) remain non-conductive for a zero-current period Tz, whereby the ratio of the first voltage V1 to the second voltage V2 can be further adjusted.

Figure 3E:
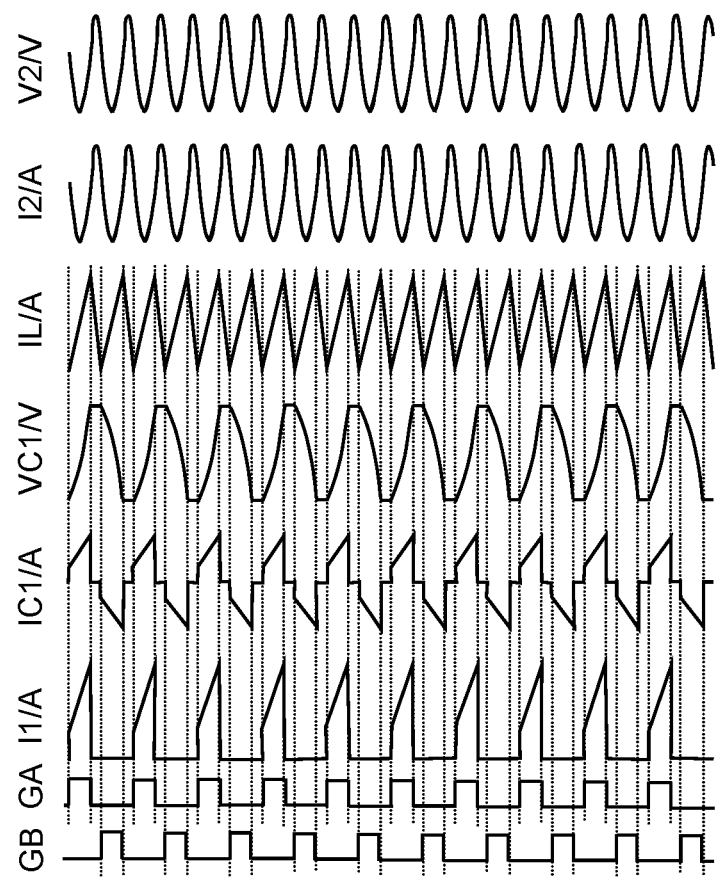
FIG. 3E shows a schematic circuit diagram of waveforms of related signals of a switched capacitor voltage converter circuit according to another embodiment of the present invention.

FIG. 3E shows a schematic diagram of waveforms of related signals of a control circuit of a switched capacitor voltage converter circuit according to another embodiment of the present invention. This embodiment is a schematic diagram of signal waveforms when the duty ratios are decreased, and the operation frequencies are increased. The second voltage V2, second current I2, inductor current IL, resonant capacitor span-voltage VC1, resonant capacitive current IC1, first current I1, first operation signal GA, and second operation signal GB are shown in FIG. 3E. In this embodiment the first voltage V1 is 48V and the second voltage V2 is 16V. It can be seen from FIG. 3E that the ripple in this embodiment is smaller than that in FIG. 3D.

Figure 3F:
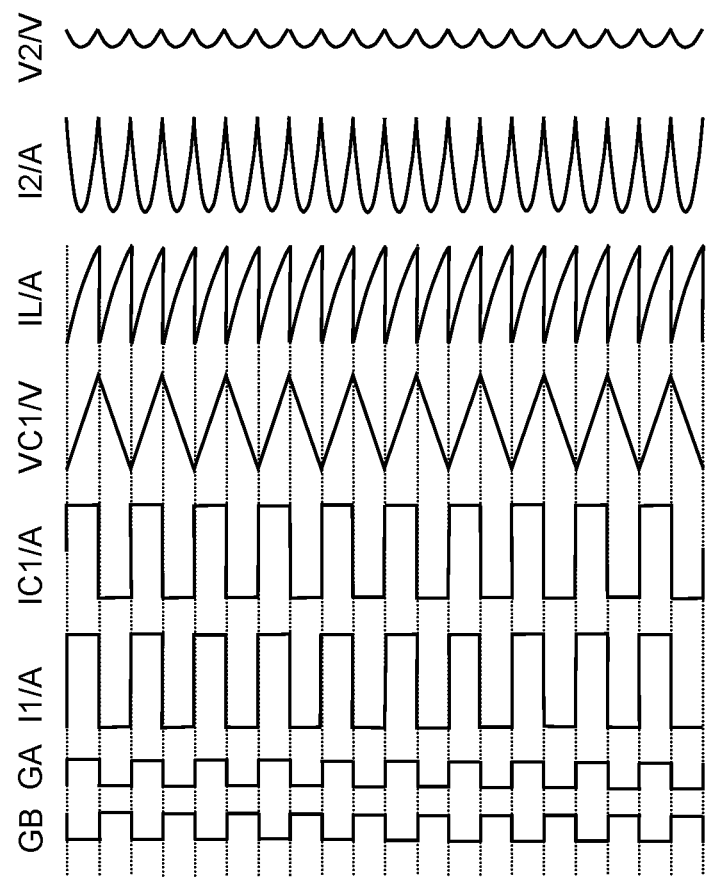
FIG. 3F shows schematic circuit diagram of waveforms of related signals of a switched capacitor voltage converter circuit according to another embodiment of the present invention.

FIG. 3F shows a schematic diagram of waveforms of related signals of a control circuit of a switched capacitor voltage converter circuit according to another embodiment of the present invention. This embodiment is a schematic diagram of signal waveforms when the duty ratios are decreased, and the operation frequencies are further increased. The second voltage V2, second current I2, inductor current IL, resonant capacitor span-voltage VC1, resonant capacitive current IC1, first current I1, first operation signal GA, and second operation signal GB are shown in FIG. 3F. In this embodiment, the first voltage V1 is 48V and the second voltage V2 is 24V. It can be seen from FIG. 3F that the ripple in this embodiment is smaller than that in FIG. 3E.

Figure 4:
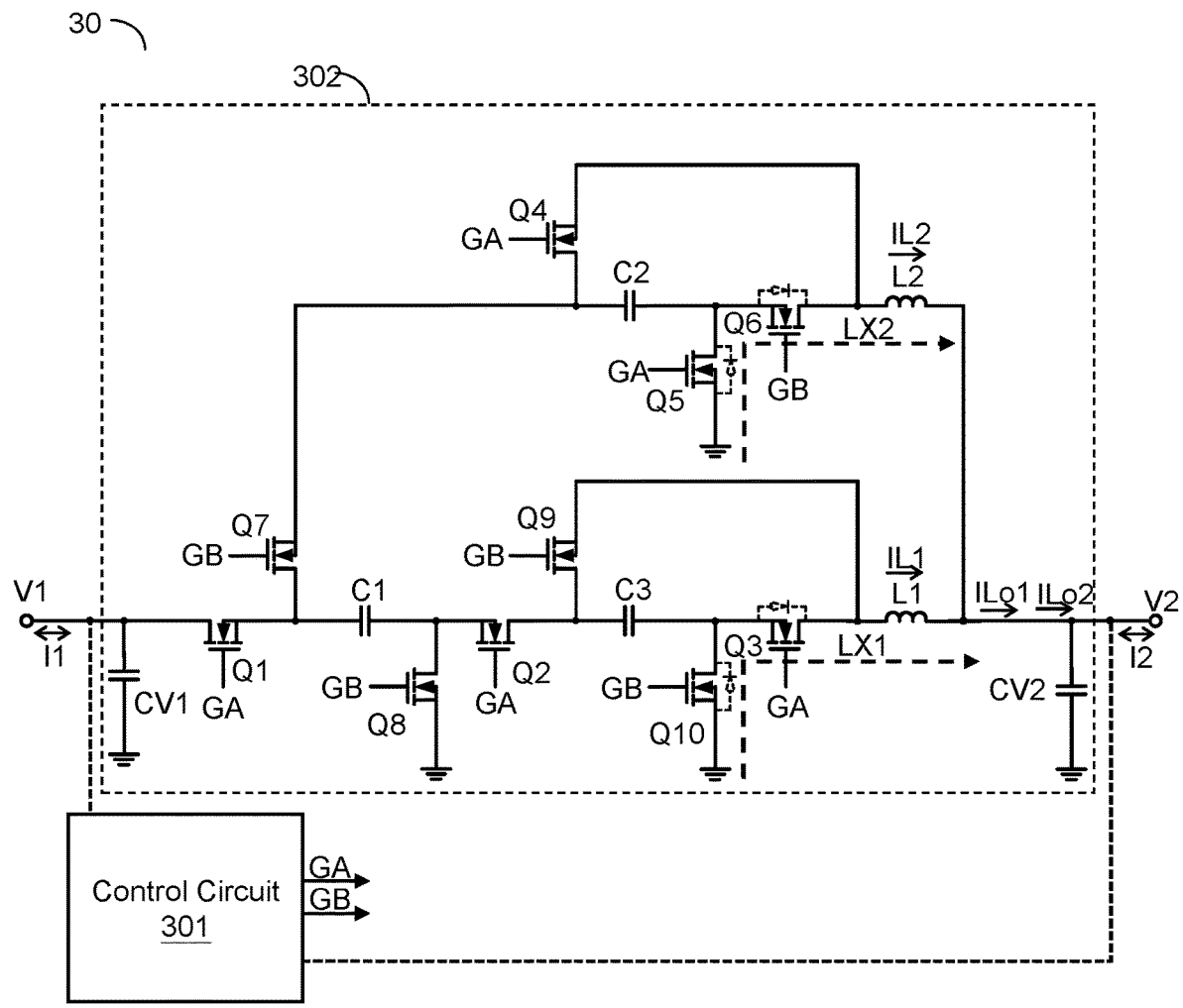
FIG. 4 shows a schematic circuit diagram of a switched capacitor voltage converter circuit according to another embodiment of the present invention.

FIG. 4 illustrates a schematic diagram of a switched capacitor voltage converter circuit in accordance with one embodiment of the present invention. The switched capacitor voltage converter circuit 30 is configured to operably convert a first voltage V1 to a second voltage V2 or is configured to operably convert the second voltage V2 to the first voltage V1. In this embodiment, the switched capacitor voltage converter circuit 30 includes a switched capacitor 302. The switched capacitor 302 includes: a non-resonant capacitor C1, a resonant capacitor C2, and a resonant capacitor C3, and a plurality of switches (e.g., switches Q1~Q10) which are coupled with one another. Note that, when the capacitance of the capacitor C1 is much larger than the capacitances of the capacitors C2 and C3, the capacitor C1 is considered as a non-resonant capacitor.

In one embodiment, during a first process, the switches (e.g., switches Q1~Q10) are configured to operably control the non-resonant capacitor C1 and the resonant capacitor C3 to be electrically connected in series between the first voltage V1 and the second voltage V2, and to operably control the resonant capacitor C2 to be electrically connected in parallel to the second voltage V2, wherein the other end of the resonant capacitor C2 is controlled to be coupled to a ground voltage level. Specifically, the switches Q1~Q3 are ON, so as to control the non-resonant capacitor C1 and the resonant capacitor C3 to be electrically connected in series between the first voltage V1 and the second voltage V2, whereas, the switches Q4~Q5 are ON, so as to control the resonant capacitor C2 to be electrically connected in parallel to the second voltage V2; in the meantime, the switches Q6~Q10 are OFF. In this embodiment, during the first process, the control signal GA is in enable state, so that the switches controlled by the control signal GA are ON. On the other hand, during the first process, the control signal GB is in disable state, so that the switches controlled by the control signal GB are OFF.

During a second process, the switches (e.g., switches Q1~Q10) are configured to operably control the resonant capacitor C2 and the non-resonant capacitor C1 to be electrically connected in series between the second voltage V2 and a ground voltage level, and to operably control the resonant capacitor C3 to be electrically connected in parallel to the second voltage V2. In one embodiment, during the second process, the resonant capacitor C2 and the non-resonant capacitor C1 are electrically connected in series in a reversed direction between the second voltage V2 and the ground voltage level. Specifically, the switches Q6~Q8 are ON, so as to control the resonant capacitor C2 and the non-resonant capacitor C1 to be electrically connected in series between the second voltage V2 and the ground voltage level, and the switches Q9~Q10 are ON, so as to control the resonant capacitor C3 to be electrically connected in parallel to the second voltage V2; in the meantime, the switches Q1~Q5 are OFF. In this embodiment, during the second process, the control signal GA is in disable state, so that the switches controlled by the control signal GA are OFF. On the other hand, during the second process, the control signal GB is in enable state, so that the switches controlled by the control signal GB are ON.

The switched capacitor voltage converter circuit 30 executes power conversion between the first voltage V1 and the second voltage V2 through periodically conducting the above-mentioned operations. In this embodiment, a ratio of the first voltage V1 of the first voltage V1 to the second voltage V2 of the second voltage V2 is equal to 4.

It is worthwhile noting that, in one embodiment, as one having ordinary skill in the art readily understands, the term "electrically connected in series 'in a reversed direction'", refers to that the voltage across the resonant capacitor C2 and the voltage across the non-resonant capacitor C1 are in opposite direction to each other (i.e., the direction from the positive end to the negative end of the capacitor C2 is opposite to the direction from the positive end to the negative end of the capacitor C1).

In the embodiment wherein the first voltage V1 is converted to the second voltage V2, during the first process, the first voltage V1 charges the non-resonant capacitor C1 and the resonant capacitor C3 which are electrically connected in series, whereas, the resonant capacitor C2 is discharged, to thereby supply power to the second voltage V2; that is, the resonant capacitor C2 charges a capacitor CV2 coupled to the second voltage V2. On the other hand, during the second process, the non-resonant capacitor C1 charges the resonant capacitor C2 and the second voltage V2.

In addition, in the embodiment wherein the second voltage V2 is converted to the first voltage V1, during the first process, the second voltage V2 charges the non-resonant capacitor C1 and the resonant capacitor C3 which are electrically connected in series and the second voltage V2 charges the resonant capacitor C2. On the other hand, during the second process, the second voltage V2 charges the resonant capacitor C3, and the second voltage V2 charges the non-resonant capacitor C1 via the resonant capacitor C2.

Through periodically conducting the above-mentioned operations, in this embodiment, in a steady state, a ratio of the voltage VC1 across the non-resonant capacitor C1 to the second voltage V2 is equal to 2. A ratio of a voltage VC3 across the resonant capacitor C3 to the second voltage V2 is equal to 1. And, a ratio of a voltage VC2 across the resonant capacitor C2 to the second voltage V2 is equal to 1. In an implementation wherein the second voltage V2 is equal to 12V, in a steady state, the voltage VC3 across the resonant capacitor C3 and the voltage VC2 across the resonant capacitor C2 are both equal to 12V. It is worthwhile noting that, because the present invention can ensure a voltage across a capacitor to be kept at a relatively lower voltage level in a steady state, the effective capacitance of such capacitor will be relatively higher. As a result, both the required voltage withstanding capability and the required size for such capacitor can be effectively decreased. Besides, under such situation, the resonant frequency of the present invention is relatively stabler and the transient response is better. Moreover, it is worthwhile noting that, because the output current (e.g., corresponding to the second current I2) of the present invention are provided by two channels, ripple can be reduced.

In the embodiment wherein the first voltage V1 is converted to the second voltage V2, the non-resonant capacitor CV1 coupled to the first voltage V1 and the non-resonant capacitor CV2 coupled to the second voltage V2 correspond to an input capacitor and an output capacitor, respectively. Or, in the embodiment wherein the second voltage V2 is converted to the first voltage V1, the non-resonant capacitor CV1 coupled to the first voltage V1 and the non-resonant capacitor CV2 coupled to the second voltage V2 correspond to an output capacitor and an input capacitor, respectively.

The switched capacitor 302 of this embodiment further includes an inductor L1 and an inductor L2. The inductor L1 is coupled between the second voltage V2 and a first switching node LX1, whereas, the inductor L2 is coupled between the second voltage V2 and a second switching node LX2. During the first process, the switches (e.g., switches Q1~Q10) control the non-resonant capacitor C1 and the resonant capacitor C3 to be electrically connected in series to the inductor L1 via the first switching node LX1, and the series circuit formed by the non-resonant capacitor C1, the resonant capacitor C3 and the inductor L1 is electrically connected in series between the first voltage V1 and the second voltage V2, and the switches Q1~Q10 control the resonant capacitor C2 to be electrically connected in series to the inductor L2 via the second switching node LX2, and the series circuit formed by the resonant capacitor C2 and the inductor L2 is electrically connected in parallel to the second voltage V2. On the other hand, during the second process, the switches Q1~Q10 control the resonant capacitor C2 and the non-resonant capacitor C1 to be electrically connected in series to the inductor L2 via the second switching node LX2, and the series circuit formed by the resonant capacitor C2, the non-resonant capacitor C1 and the inductor L2 is electrically connected in series between the second voltage V2 and the ground voltage level, and the switches Q1~Q10 control the resonant capacitor C3 to be electrically connected in series to the inductor L1 via the first switching node LX1, and the series circuit formed by the resonant capacitor C3 and the inductor L1 is electrically connected in parallel to the second voltage V2. In one embodiment, both the inductor L1 and the inductor L2 operate in a continuous conduction mode, thereby further reducing inrush current and ripple current.

In one embodiment, the capacitance of the non-resonant capacitor C1 is far more greater than the capacitance of the resonant capacitor C3 and the capacitance of the resonant capacitor C2, so that a first resonant frequency of the resonant capacitor C3 and the inductor is far more greater than a third resonant frequency of the non-resonant capacitor C1 and the inductor, and a second resonant frequency of the resonant capacitor C2 and the inductor is far more greater than a third resonant frequency of the non-resonant capacitor C1 and the inductor. In one embodiment, the first resonant frequency and the second resonant frequency are both greater than or equal to ten times of the third resonant frequency.

The control circuit 301 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 5:
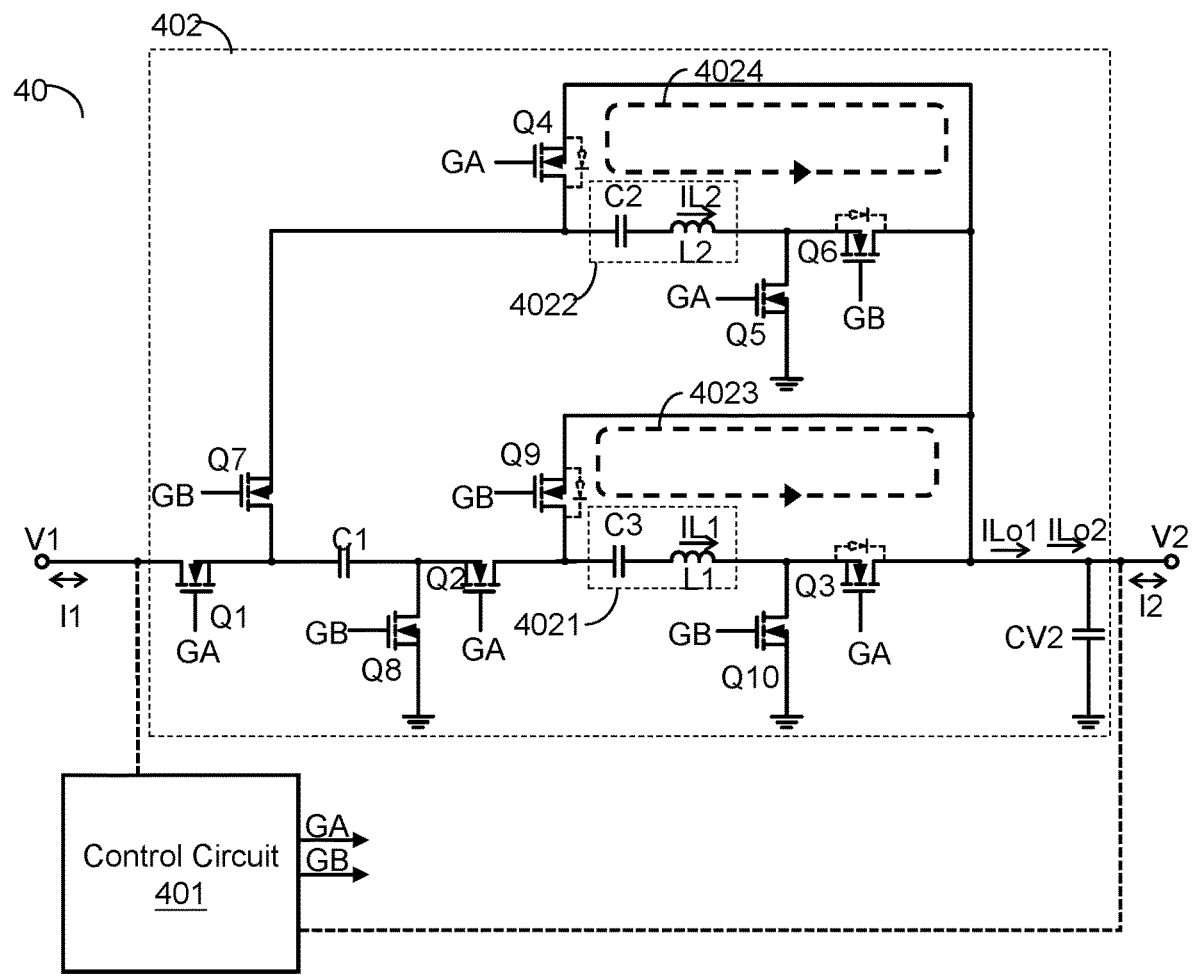
FIG. 5 shows a schematic circuit diagram of a switched capacitor voltage converter circuit according to another embodiment of the present invention.

FIG. 5 illustrates a schematic circuit diagram of a switched capacitor voltage converter circuit in accordance with another embodiment of the present invention. The switched capacitor 402 of this embodiment is similar to the switched capacitor 302 of the embodiment shown in FIG. 4, but is different in that: the inductor L1 of the switched capacitor 402 is directly electrically connected in series to the resonant capacitor C3, so that the resonant capacitor C3 and the inductor L1 constitutes a resonant tank 4021. The inductor L2 of the switched capacitor 402 is directly electrically connected in series to the resonant capacitor C2, so that the resonant capacitor C2 and the inductor L2 constitutes a resonant tank 4022. In one embodiment, during a first process, the switches Q1~Q10 are configured to operably control the resonant tank 4021 and the non-resonant capacitor C1 to be electrically connected in series between the first voltage V1 and the second voltage V2, and the switches Q1~Q10 are configured to operably control the resonant tank 4022 to be electrically connected in parallel to the second voltage V2. On the other hand, during a second process, the switches Q1~Q10 are configured to operably control the resonant tank 4022 and the non-resonant capacitor C1 to be electrically connected in series between the second voltage V2 and a ground voltage level, and the switches Q1~Q10 are configured to operably control the resonant tank 4021 to be electrically connected in parallel to the second voltage V2. The switched capacitor 402 executes power conversion between the first voltage V1 and the second voltage V2 through periodically conducting the above-mentioned operations in resonant fashion. In regard to operation details of the switches Q1~Q10, please refer to the embodiment shown in FIG. 4.

The control circuit 401 of this embodiment can be implemented by using the control circuit structure of FIGS. 2A and 2B; please refer to the detailed descriptions of FIGS. 2A and 2B. As shown in FIG. 5, when the control circuit 401 decreases the duty ratio of the first operation signal GA and/or the second operation signal GB according to the predetermined ratio, in the first process and/or the second process, when the first switches (e.g., switches Q1~Q5) and the second switches (e.g., switches Q6~Q10) are non-conductive, the inductor currents IL1 and IL2 flowing through the corresponding inductors L1 and L2 respectively pass through the body diodes (as shown by the dashed line in FIG. 5) of at least one switch (e.g., switches Q9 and Q3 and switches Q4 and Q6), and the currents IL1 and IL2 continues to freewheel respectively along the closed-loops 4023 and 4024 formed by the resonant tanks 4021 and 4022 and the body diodes (as shown by the dashed line in FIG. 5) of at least one switch (e.g., switches Q9 and Q3 and switches Q4 and Q6). In this embodiment, the second state is that the inductor currents ILo1 and ILo2 stop flowing toward the second voltage V2. As shown in FIG. 5, at least one resonant capacitor C3 and at least one inductor L1 form the resonant tank 4021, and at least one resonant capacitor C2 and at least one inductor L2 form the resonant tank 4022. In this case, the closed-loop currents (i.e. the inductor currents IL1 and IL2) do not result in a net current flowing into or out of the non-resonant capacitor CV2 (which can be regarded as the output capacitor).

For example, by means of the conduction of the body diodes in the switches Q9 and Q3, the inductor current IL1 flowing through the corresponding inductor L1 keeps freewheeling along the closed-loop 4023 formed by the resonant tank 4021 and the body diodes in the switches Q9 and Q3; in this case, the second state is that the inductor current ILo1 stops flowing toward the second voltage V2. By means of the conduction of the body diodes in the switches Q4 and Q6, the inductor current IL2 flowing through the corresponding inductor L2 keeps freewheeling along the closed-loop 4024 formed by the resonant tank 4022 and the body diodes in the switches Q4 and Q6; in this case, the second state is that the inductor current ILo2 stops flowing toward the second voltage V2.

Figure 6:
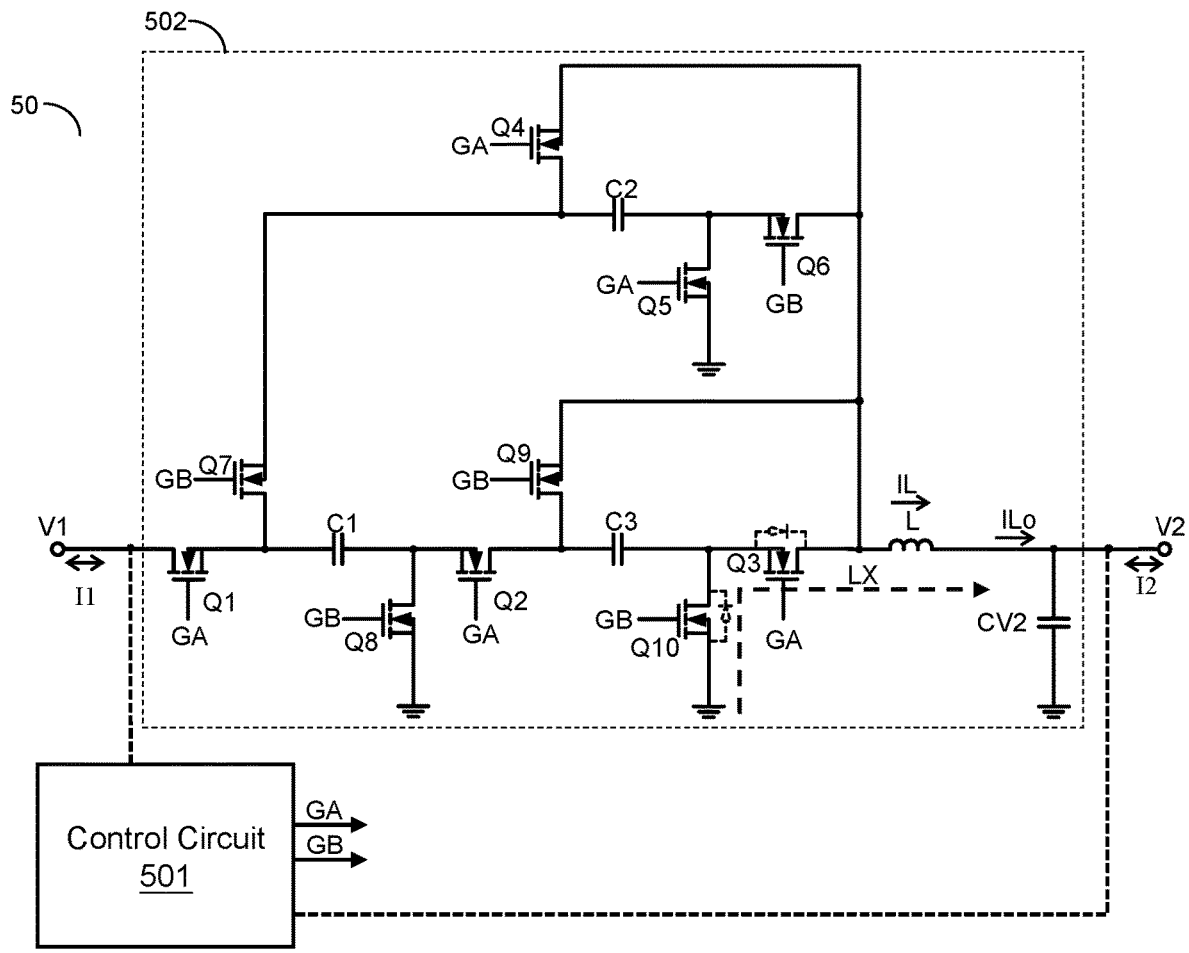
FIG. 6 shows a schematic circuit diagram of a switched capacitor voltage converter circuit according to another embodiment of the present invention.

FIG. 6 illustrates a schematic circuit diagram of a switched capacitor voltage converter circuit in accordance with still another embodiment of the present invention. The switched capacitor 502 of this embodiment is similar to the switched capacitor 302 of the embodiment shown in FIG. 4, but is different in that: the switched capacitor 502 shares an inductor L, and the inductor L is coupled between the second voltage V2 and the switching node LX. During the first process, the switches Q1~Q10 control the non-resonant capacitor C1 and the resonant capacitor C3 to be electrically connected in series to the inductor L via the switching node LX, and the series circuit formed by the non-resonant capacitor C1, the resonant capacitor C3 and the inductor L is electrically connected in series between the first voltage V1 and the second voltage V2, and the switches Q1~Q10 control the resonant capacitor C2 to be electrically connected in series to the inductor L via the switching node LX, and the series circuit formed by the resonant capacitor C2 and the inductor L is electrically connected in parallel to the second voltage V2. On the other hand, during the second process, the switches Q1~Q10 control the resonant capacitor C2 and the non-resonant capacitor C1 to be electrically connected in series to the inductor L via the switching node LX, and the series circuit formed by the resonant capacitor C2, the non-resonant capacitor C1 and the inductor L is electrically connected in series between the second voltage V2 and the ground voltage level, and the switches Q1~Q10 control the resonant capacitor C3 to be electrically connected in series to the inductor L via the switching node LX, and the series circuit formed by the resonant capacitor C3 and the inductor L is electrically connected in parallel to the second voltage V2. In this embodiment, the non-resonant capacitor C1, the resonant capacitor C2, and the resonant capacitor C3 operate together with the inductor L in resonant fashion to execute power conversion between the first voltage V1 and the second voltage V2. In regard to operation details of the above-mentioned switches Q1~Q10, please refer to the embodiment shown in FIG. 4.

The control circuit 501 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

It is worthwhile noting that, in this embodiment, the charging and discharging operations are executed in resonant fashion by a capacitor (or capacitors) in cooperation with an inductor. As a result, this embodiment can effectively reduce surge currents in the charging and discharging operations. Besides, this embodiment can achieve zero current switching or zero voltage switching in resonant fashion. The embodiments operating in resonant fashion which will be described later in the specification operate in the same way as this embodiment. The details will be explained later.

Figure 7:
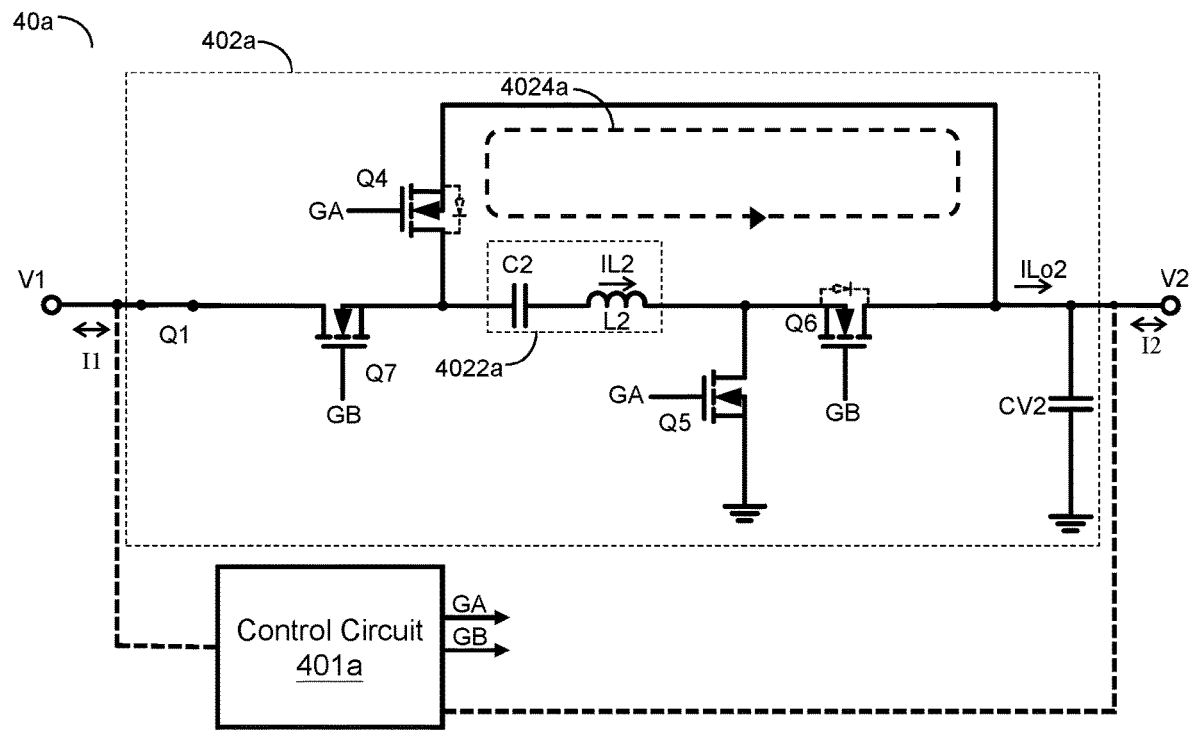
FIG. 7 shows a schematic circuit diagram of a switched capacitor voltage converter circuit according to another embodiment of the present invention.

FIG. 7 illustrates a schematic circuit diagram of a switched capacitor voltage converter circuit in accordance with whereas, another embodiment of the present invention. The switched capacitor 402a of FIG. 7 corresponds to the switched capacitor 402 of the embodiment shown in FIG. 5. To elaborate in more detail, in this embodiment, the switched capacitor 402a operates in a 2-fold conversion mode, wherein the switch Q1 is always ON (as shown by short circuit in FIG. 7), whereas, the switches Q2, Q3, and Q8~Q10 are always OFF. Besides, the switches Q4~Q7 are configured to operably switch the resonant capacitor C2, so that during the first process, the resonant capacitor C2 and the inductor L2 is electrically connected in series between the first voltage V1 and the second voltage V2, and during the second process, the resonant capacitor C2 and the inductor L2 form a series circuit which is electrically connected in parallel to the second voltage V2, such that a ratio of the first voltage V1 of the first voltage V1 to the second voltage V2 of the second voltage V2 is equal to 2. The resonant capacitor C2 and the inductor L2 operate in resonant fashion to achieve power conversion between the first voltage V1 and the second voltage V2. In this embodiment, because the switches Q2, Q3, and Q8~Q10 are always OFF, each of the resonant tank 3021a (which includes the resonant capacitor C3 and the inductor L1) and the non-resonant capacitor C1 has at least one end which is always floating.

The control circuit 401a of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 8:
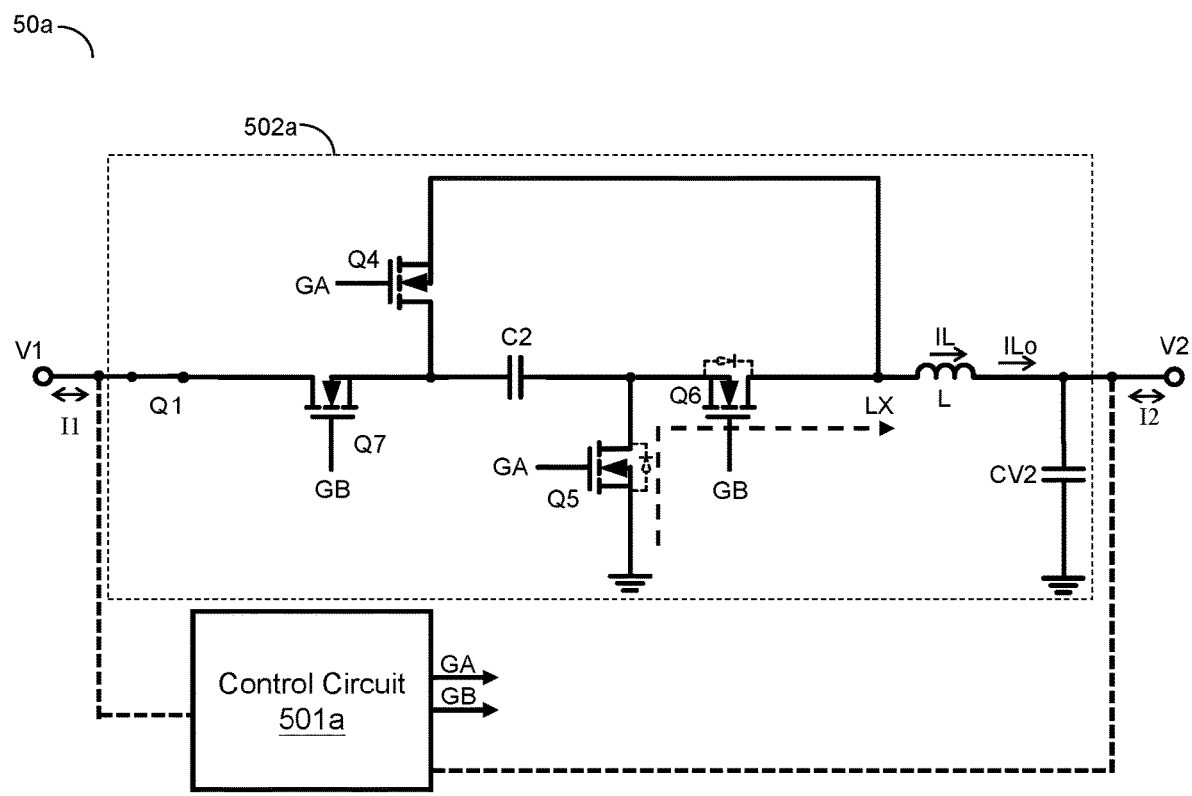
FIG. 8 shows a schematic circuit diagram of a switched capacitor voltage converter circuit according to another embodiment of the present invention.

FIG. 8 illustrates a schematic circuit diagram of a switched capacitor voltage converter circuit in accordance with still another embodiment of the present invention. The switched capacitor 502a of FIG. 8 corresponds to the switched capacitor 502 of the embodiment shown in FIG. 6. To elaborate in more detail, in this embodiment, the switched capacitor 502a operates in a 2-fold conversion mode, wherein the switch Q1 is always ON (as shown by short circuit in FIG. 8), whereas, the switches Q2, Q3, and Q8~Q10 are always OFF. Besides, the switches Q4~Q7 are configured to operably switch the resonant capacitor C2, so that during the first process, the switches Q4~Q7 control the resonant capacitor C2 to be electrically connected in series to the inductor L via the switching node LX, and the series circuit formed by the resonant capacitor C2 and the inductor L is electrically connected in series between the first voltage V1 and the second voltage V2, and during the second process, the switches Q4~Q7 control the resonant capacitor C2 to be electrically connected in series to the inductor L via the switching node LX, and the series circuit formed by the resonant capacitor C2 and the inductor L is electrically connected in parallel to the second voltage V2. In other words, during the second process, the switches Q4~Q7 control the resonant capacitor C2 to be electrically connected in series to the inductor L via the switching node LX, and the series circuit formed by the resonant capacitor C2 and the inductor L is connected between the second voltage V2 and the ground voltage level, such that a ratio of the first voltage V1 of the first voltage V1 to the second voltage V2 of the second voltage V2 is equal to 2. The resonant capacitor C2 and the inductor L operate in resonant fashion to achieve power conversion between the first voltage V1 and the second voltage V2. In this embodiment, because the switches Q2, Q3, and Q8~Q10 are always OFF, each of the non-resonant capacitor C1 and the resonant capacitor C3 has at least one end which is always floating.

The control circuit 501a of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 9:
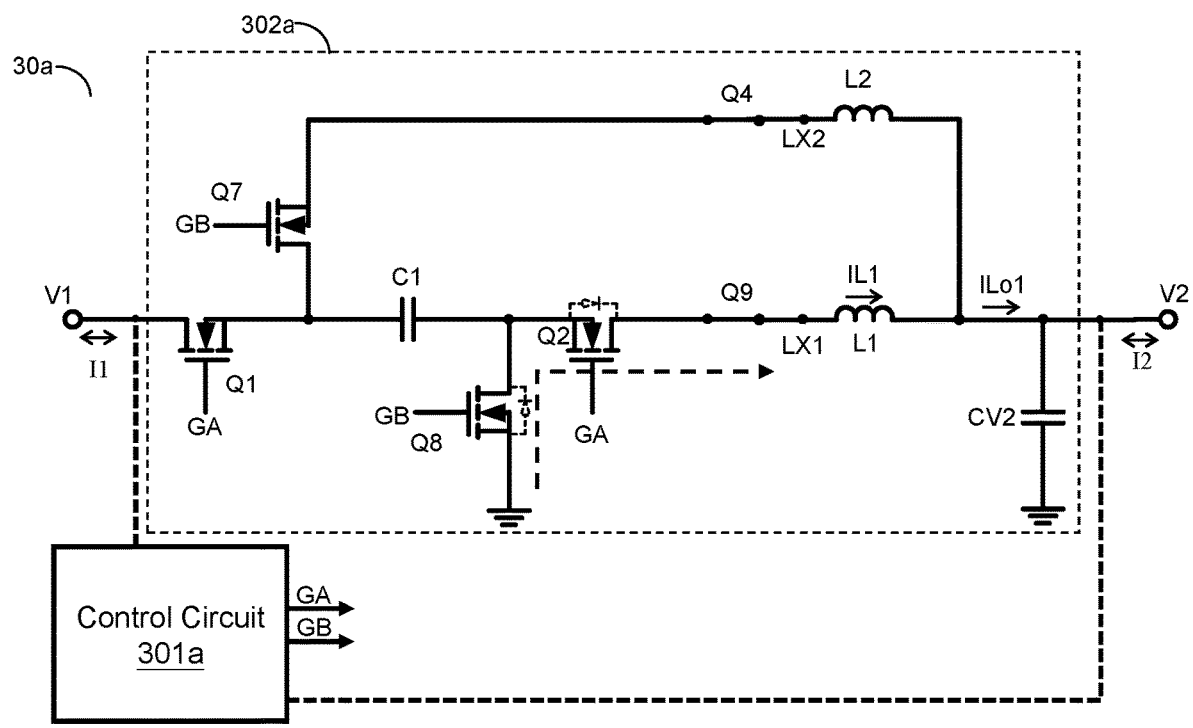
FIG. 9 shows a schematic circuit diagram of a switched capacitor voltage converter circuit according to another embodiment of the present invention.

FIG. 9 illustrates a schematic circuit diagram of a switched capacitor voltage converter circuit in accordance with whereas, another embodiment of the present invention. The switched capacitor 302a of FIG. 9 corresponds to the switched capacitor 302 of the embodiment shown in FIG. 4. To elaborate in more detail, in this embodiment, the switched capacitor 202a operates in a 2-fold conversion mode, wherein the switches Q4 and Q9 are always ON (as shown by short circuit in FIG. 9), whereas, the switches Q3, Q5, Q6, and Q10 are always OFF. Besides, the switches Q1, Q2, Q7, and Q8 are configured to operably switch the non-resonant capacitor C1, so that during the first process, the switches Q1, Q2, Q7, and Q8 control the non-resonant capacitor C1 to be electrically connected in series to the inductor L1 via the first switching node LX1, and the series circuit formed by the non-resonant capacitor C1 and the inductor L1 is electrically connected in series between the first voltage V1 and the second voltage V2, and during the second process, the switches Q1, Q2, Q7, and Q8 control the non-resonant capacitor C1 to be electrically connected in series to the inductor L2 via the second switching node LX2, and the series circuit formed by the non-resonant capacitor C1 and the inductor L2 is electrically connected in parallel to the second voltage V2. In other words, during the second process, the switches Q1, Q2, Q7, and Q8 control the non-resonant capacitor C1 to be electrically connected in series to the inductor L2 via the second switching node LX2, and the series circuit formed by the non-resonant capacitor C1 and the inductor L2 is connected between the second voltage V2 and the ground voltage level, such that a ratio of the first voltage V1 of the first voltage V1 to the second voltage V2 of the second voltage V2 is equal to 2. The non-resonant capacitor C1 and the inductors L1 and L2 operate in resonant fashion to achieve power conversion between the first voltage V1 and the second voltage V2. In this embodiment, because the switches Q3, Q5, Q6, and Q10 are always OFF, each of the resonant capacitor C3 and the resonant capacitor C2 has at least one end which is always floating.

The control circuit 301a of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 10:
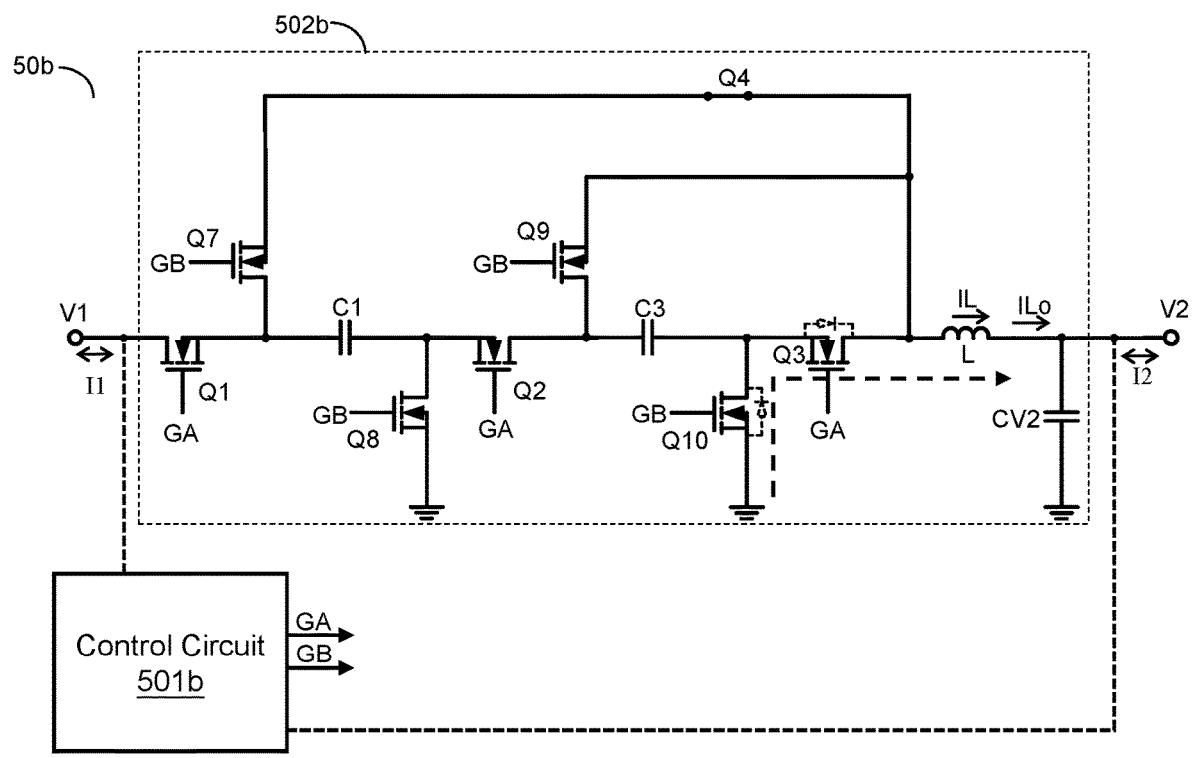
FIG. 10 shows a schematic circuit diagram of a switched capacitor voltage converter circuit according to another embodiment of the present invention.

FIG. 10 illustrates a schematic circuit diagram of a switched capacitor voltage converter circuit in accordance with still another embodiment of the present invention. The switched capacitor 502b of FIG. 10 corresponds to the switched capacitor 502 of the embodiment shown in FIG. 6. To elaborate in more detail, in this embodiment, the switched capacitor 502b operates in a 3-fold conversion mode, wherein the switch Q4 is always ON (as shown by short circuit in FIG. 10), whereas, the switches Q5 and Q6 are always OFF. Besides, the switches Q1~Q3 and Q7~Q10 are configured to operably switch the non-resonant capacitor C1 and the resonant capacitor C3, so that during the first process, the non-resonant capacitor C1, the resonant capacitor C3 and the inductor L are electrically connected in series between the first voltage V1 and the second voltage V2, and during the second process, the non-resonant capacitor C1 and the resonant capacitor C3 form a parallel circuit which is electrically connected in series to the inductor L, and the series circuit formed by the inductor L with the parallel circuit is electrically connected in parallel to the second voltage V2, such that a ratio of the first voltage V1 of the first voltage V1 to the second voltage V2 of the second voltage V2 is equal to 3. The non-resonant capacitor C1 and the resonant capacitor C3 and the inductor L operate in resonant fashion to achieve power conversion between the first voltage V1 and the second voltage V2. In this embodiment, because the switches Q5 and Q6 are always OFF, the resonant capacitor C2 has one end which is always floating.

The control circuit 501b of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 11:
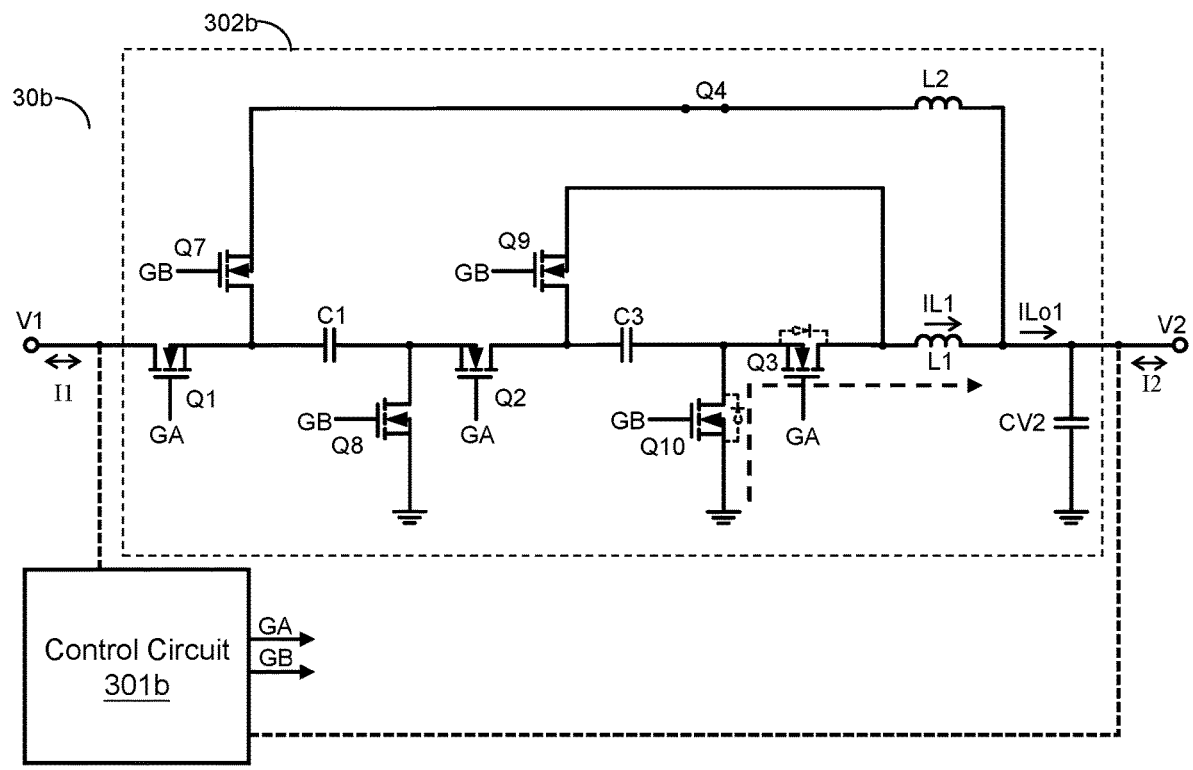
FIG. 11 shows a schematic circuit diagram of a switched capacitor voltage converter circuit according to another embodiment of the present invention.

FIG. 11 illustrates a schematic circuit diagram of a switched capacitor voltage converter circuit in accordance with whereas, another embodiment of the present invention. The switched capacitor 302b of FIG. 11 corresponds to the switched capacitor 302 of the embodiment shown in FIG. 4. And, the operation mechanism of the switches in the switched capacitor 302b shown in FIG. 11 is similar to the operation mechanism of the switches in the switched capacitor 502b shown in FIG. 10, but is different in that: during the first process, the non-resonant capacitor C1, the resonant capacitor C3 and the inductor L1 are electrically connected in series between the first voltage V1 and the second voltage V2. On the other hand, during the second process, the resonant capacitor C3 is electrically connected in series to the inductor L1 and the non-resonant capacitor C1 is electrically connected in series to the inductor L2, and the series circuit formed by the resonant capacitor C3 and the inductor L1 is electrically connected in parallel to the second voltage V2 and the series circuit formed by the non-resonant capacitor C1 and the inductor L2 is electrically connected in parallel to the second voltage V2, such that a ratio of the first voltage V1 of the first voltage V1 to the second voltage V2 of the second voltage V2 is equal to 3. In regard to operation details of the above-mentioned switches, please refer to the embodiment shown in FIG. 10.

The control circuit 301b of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

It is worthwhile noting that, the arrangement of switches and devices in the above-mentioned FIGS. 7~11 correspond to the arrangement of switches and devices in the above-mentioned FIG. 5, FIG. 6 and FIG. 4. That is, by keeping a part of the switches to be always ON and another part of the switches to be always OFF, and controlling a still other part of the switches to switch according the required conversion mode, the embodiments shown in the above-mentioned FIGS. 7~11 can achieve a desired ratio of the first voltage V1 of the first voltage V1 to the second voltage V2 of the second voltage V2, which can be several different values. Note that FIGS. 7~11 show equivalent circuit diagrams corresponding to the embodiments shown in FIG. 5, FIG. 6 and FIG. 5, wherein for simplicity, the switches which are always OFF and the capacitors which are always floating are omitted.

Figure 12:
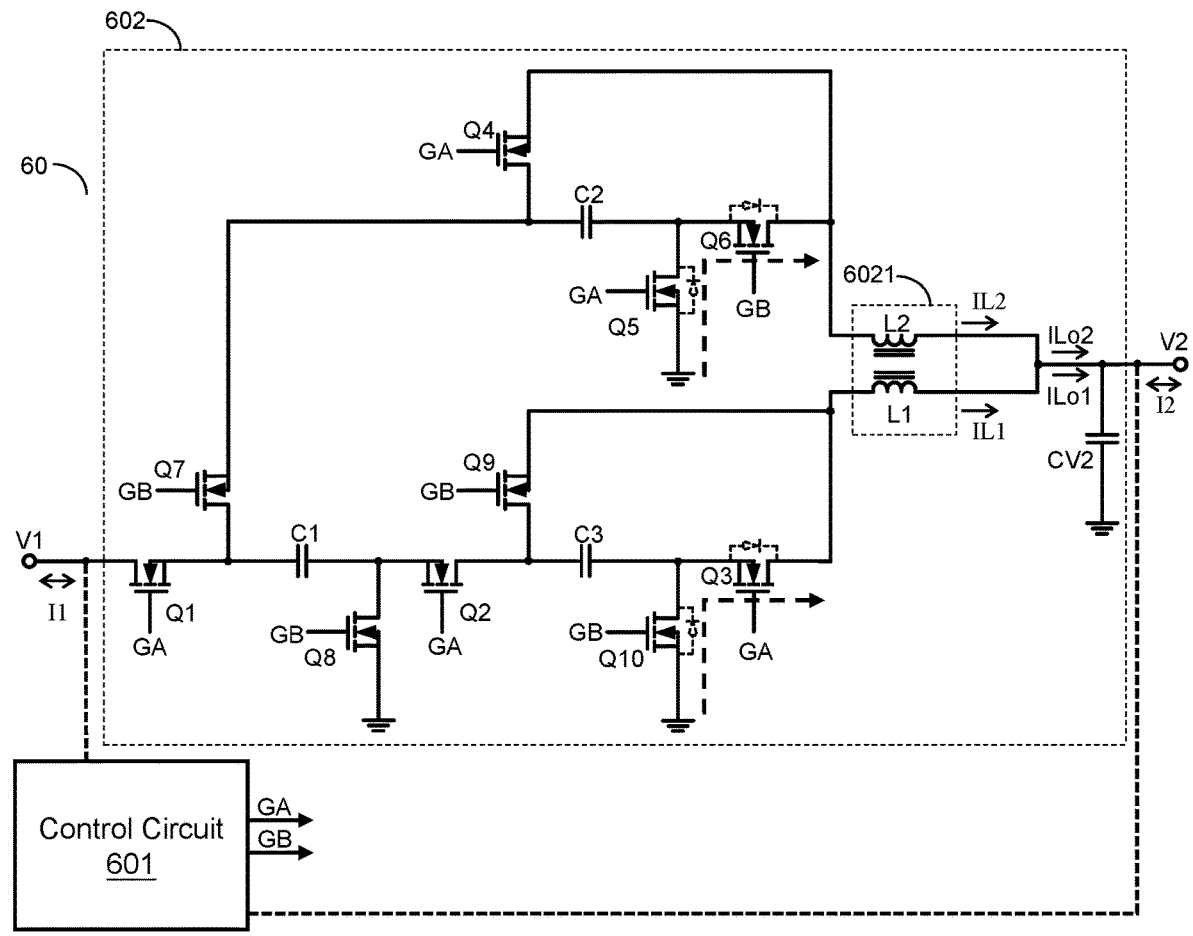
FIG. 12 shows a schematic circuit diagram of a switched capacitor voltage converter circuit according to another embodiment of the present invention.

FIG. 12 illustrates a schematic circuit diagram of a switched capacitor voltage converter circuit in accordance with still another embodiment of the present invention. The switched capacitor 602 of FIG. 12 is similar to the switched capacitor 302 of the embodiment shown in FIG. 4. In this embodiment, the inductor L1 and the inductor L2 of the switched capacitor 602 have coupled inductance (i.e. the inductances of interaction the inductor L1 and the inductor L2 interact with each other). As a consequence, there is better current balance between the inductor current IL1 and the inductor current IL2 of the switched capacitor 502 and also a better voltage balance between the capacitor C3 and the capacitor C2 of the switched capacitor 602.

The control circuit 601 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

In one embodiment, the inductor L1 and the inductor L2 can be configured as coupled inductors or configured as a transformer (e.g., as shown by numerical reference 6021 in FIG. 12).

Figure 13:
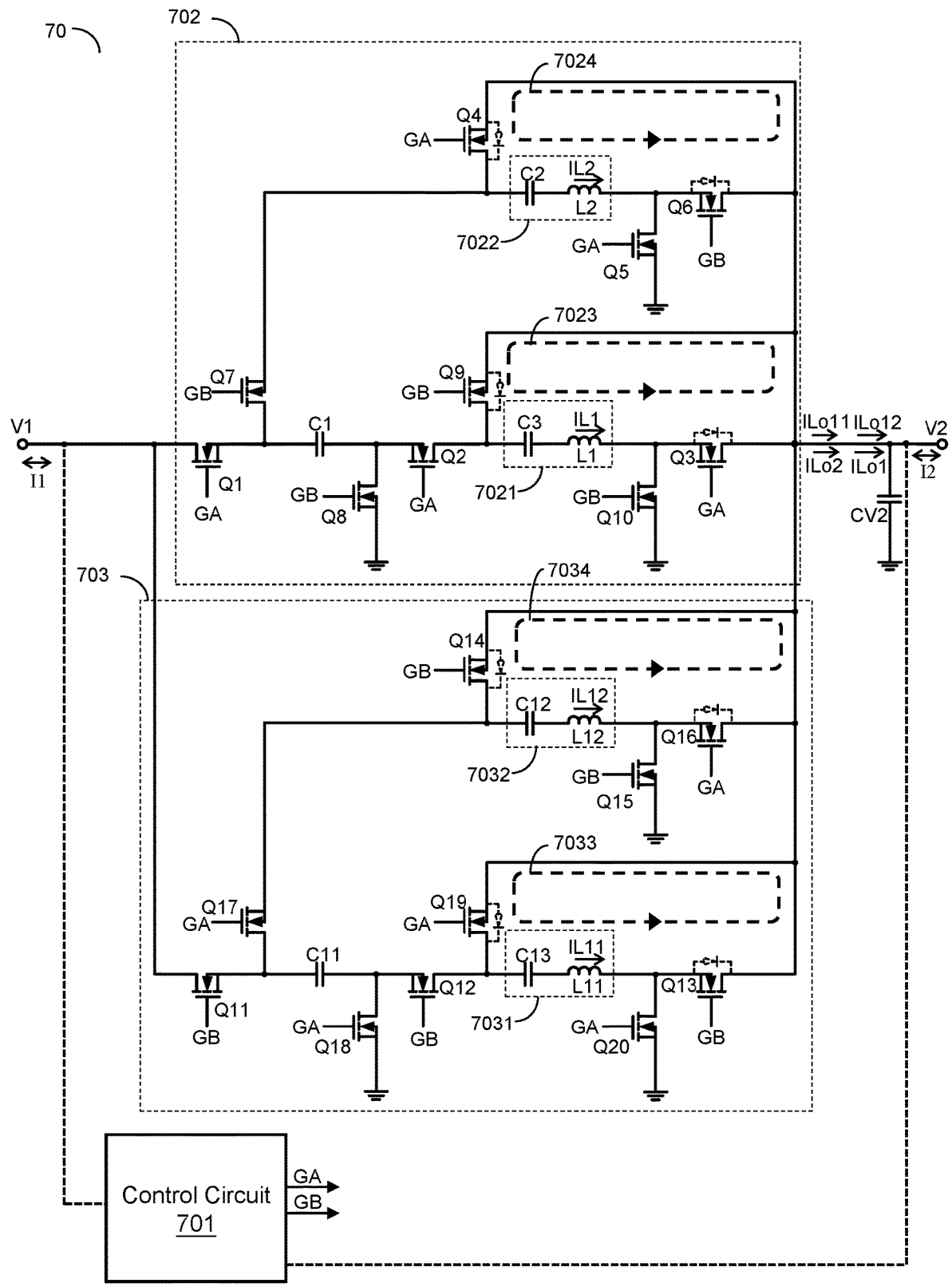
FIG. 13 shows a schematic circuit diagram of a switched capacitor voltage converter circuit according to another embodiment of the present invention.

FIG. 13 illustrates a schematic circuit diagram of a switched capacitor voltage converter circuit in accordance with whereas, another embodiment of the present invention. In one embodiment, the switched capacitor voltage converter circuit 70 includes: a first switched capacitor 702 and a second switched capacitor 703. The first switched capacitor 702 and the second switched capacitor 703 are coupled in parallel between the first voltage V1 and the second voltage V2. In this embodiment, the first switched capacitor 702 and the second switched capacitor 703 correspond to, for example, the switched capacitor 402 of the embodiment shown in FIG. 5. In this embodiment, through operation of the switched capacitors (i.e., the first switched capacitor 702 and the second switched capacitor 703) coupled in parallel to each other, this embodiment can increase the output power or can reduce the ripples. That the switched capacitors are "coupled in parallel" indicates that the input ends of the switched capacitors are both electrically connected to for example the first voltage V1, whereas, the output ends of the switched capacitors are both electrically connected to for example the second voltage V2.

In one embodiment, the first switched capacitor 702 and the second switched capacitor 703 are configured to respectively control the switches therein in opposite phases, to execute power conversion in an alternating fashion. To elaborate in more detail, in this embodiment, as shown in FIG. 13, control signals GA and GB for controlling the switches Q1~Q10 of the first switched capacitor 702 are in phase with the control signals GA and GB for controlling the switches Q1~Q10 of the switched capacitor 402 of the embodiment shown in FIG. 5, whereas, control signals GA and GB for controlling the switches Q11~Q20 of the second switched capacitor 703 are in opposite phase with the control signals GA and GB for controlling the switches Q1~Q10 of the switched capacitor 402 of the embodiment shown in FIG. 5 (i.e., the control signals GA and GB for controlling the switches Q11~Q20 of the second switched capacitor 703 are in opposite phase with the control signals GA and GB for controlling the switches Q1~Q10 of the first switched capacitor 702).

The first switched capacitor 702 and the second switched capacitor 703 include: an inductor L1, an inductor L2, an inductor L11 and an inductor L12, which are electrically connected in series to a capacitor C3, a capacitor C2, a capacitor C13 and a capacitor C12, respectively, so as to constitute a resonant tank 7021, a resonant tank 7022, a resonant tank 7031 and a resonant tank 7032, respectively. The switched capacitor voltage converter circuit 70 of this embodiment operates the first switched capacitor 702 and the second switched capacitor 703 in an alternating fashion, so as to execute power conversion in an alternating fashion. Each of the first switched capacitor 702 and the second switched capacitor 703 is similar to the switched capacitor 702 of the embodiment shown in FIG. 5, to execute power conversion in resonant fashion.

The control circuit 701 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 14:
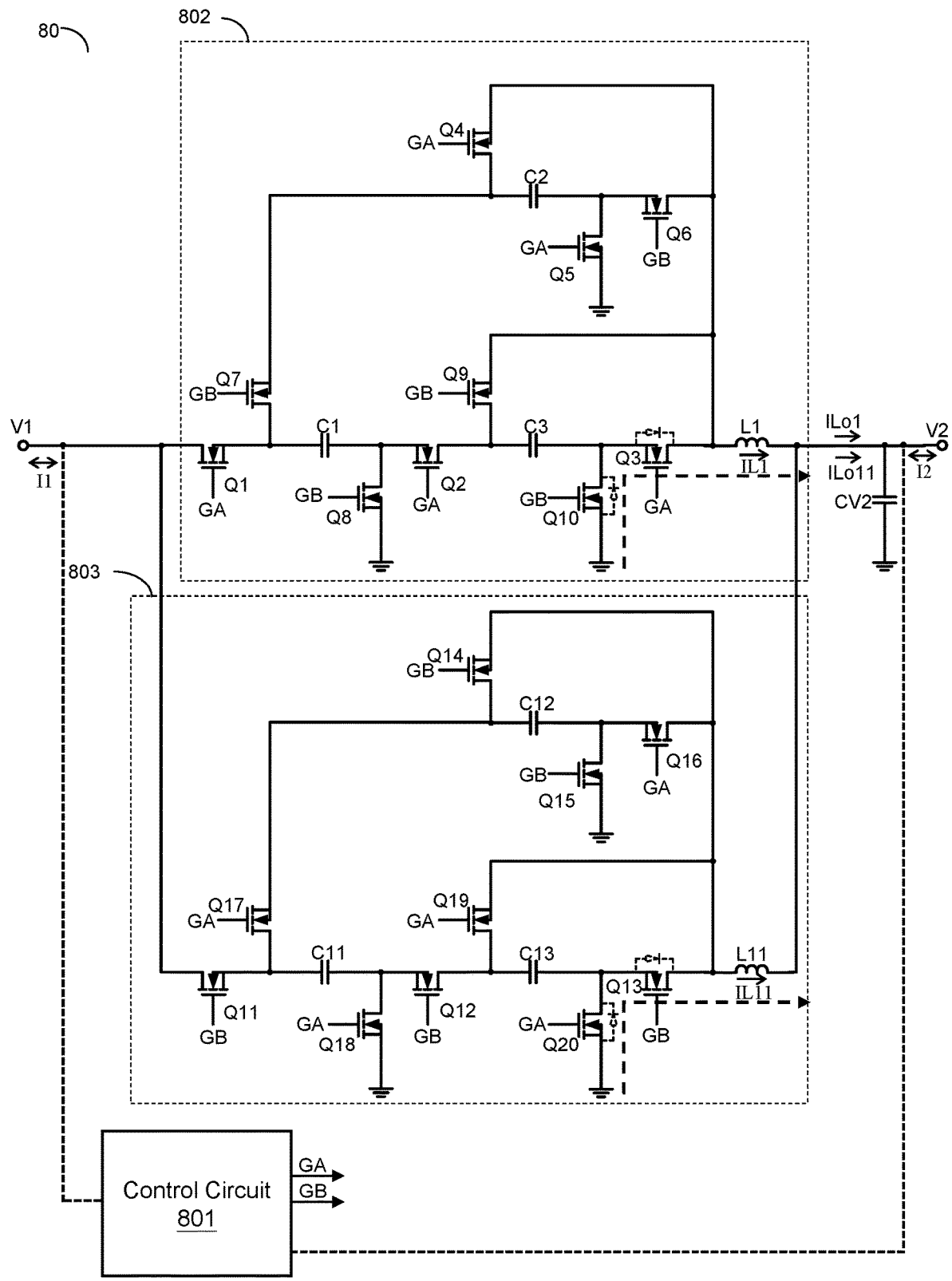
FIG. 14 shows a schematic circuit diagram of a switched capacitor voltage converter circuit according to another embodiment of the present invention.

FIG. 14 illustrates a schematic circuit diagram of a switched capacitor voltage converter circuit in accordance with still another embodiment of the present invention. The switched capacitor voltage converter circuit 80 of FIG. 14 is similar to the switched capacitor voltage converter circuit 70 of the embodiment shown in FIG. 13 (i.e., the switched capacitor voltage converter circuit 80 includes a first switched capacitor 802 and a second switched capacitor 803), but is different in that: the first switched capacitor 802 shares an inductor L1 while the second switched capacitor 803 shares an inductor L11. The capacitor C3 and the capacitor C2 form a parallel circuit which is electrically connected in series to the inductor L1 in a way similar to the embodiment shown in FIG. 6. The capacitor C13 and the capacitor C12 form a parallel circuit which is electrically connected in series to the inductor L11 in a way similar to the embodiment shown in FIG. 6. Similar to the switched capacitor voltage converter circuit 60 of the embodiment shown in FIG. 13, the switched capacitor voltage converter circuit 70 of this embodiment operates the first switched capacitor 802 and the second switched capacitor 803 in an alternating fashion, so as to execute power conversion in an alternating fashion. Each of the first switched capacitor 802 and the second switched capacitor 803 is similar to the switched capacitor 502 of the embodiment shown in FIG. 6, to execute power conversion in resonant fashion.

The control circuit 801 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 15:
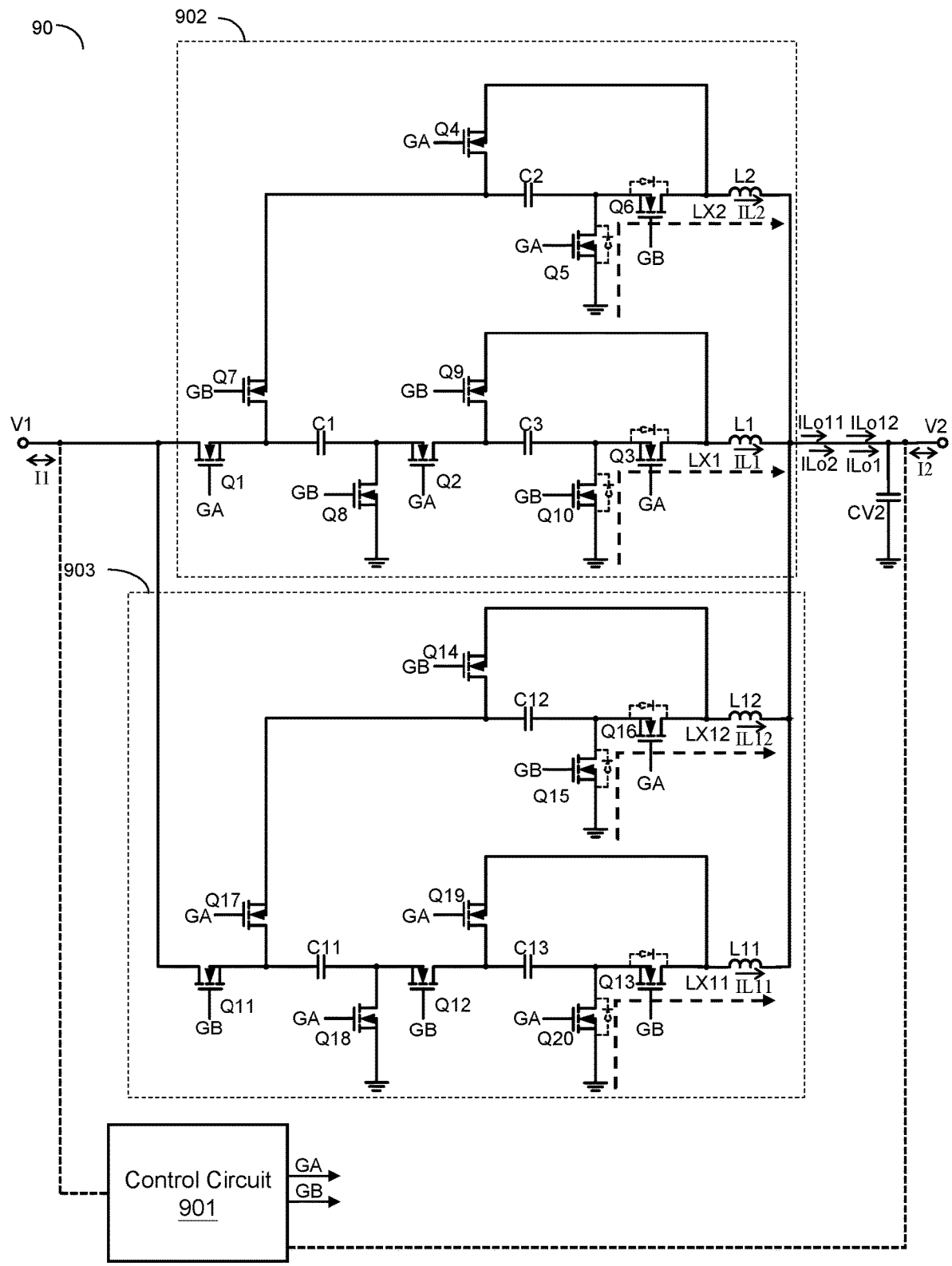
FIG. 15 shows a schematic circuit diagram of a switched capacitor voltage converter circuit according to another embodiment of the present invention.

FIG. 15 illustrates a schematic circuit diagram of a switched capacitor voltage converter circuit in accordance with whereas, another embodiment of the present invention. The switched capacitor voltage converter circuit 90 of FIG. 15 is similar to the switched capacitor voltage converter circuit 70 of the embodiment shown in FIG. 13 (i.e., the switched capacitor voltage converter circuit 90 includes a first switched capacitor 902 and a second switched capacitor 903), but is different in that: an inductor L1, an inductor L2, an inductor L11 and an inductor L12 of the first switched capacitor 902 and the second switched capacitor 903 are not directly connected in series to a capacitor C3, a capacitor C2, a capacitor C13 and a capacitor C12, respectively, but are connected in series to the capacitor C3, the capacitor C2, the capacitor C13 and the capacitor C12 via the first switching node LX1, the second switching node LX2, the first switching node LX11 and the second switching node LX12, respectively. Similar to the switched capacitor voltage converter circuit 70 of the embodiment shown in FIG. 13, the switched capacitor voltage converter circuit 90 of FIG. 15 operates the first switched capacitor 902 and the second switched capacitor 903 in an alternating fashion, so as to execute power conversion in an alternating fashion. Each of the first switched capacitor 902 and the second switched capacitor 903 is similar to the switched capacitor 302 of the embodiment shown in FIG. 4, to execute power conversion in resonant fashion.

The control circuit 901 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 16:
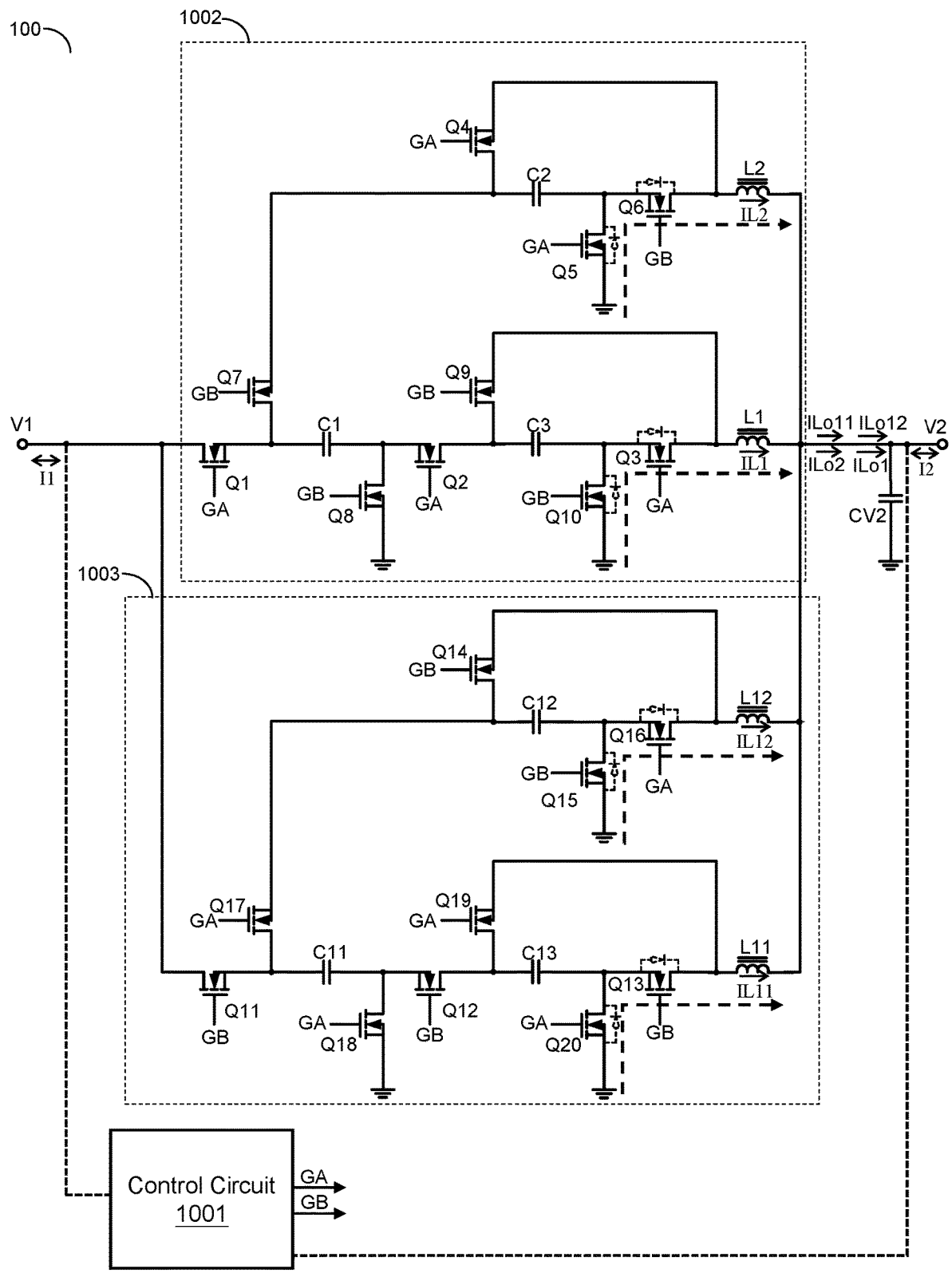
FIG. 16 shows a schematic circuit diagram of a switched capacitor voltage converter circuit according to another embodiment of the present invention.

FIG. 16 illustrates a schematic circuit diagram of a switched capacitor voltage converter circuit in accordance with still another embodiment of the present invention. The switched capacitor voltage converter circuit 100 of FIG. 16 is similar to the switched capacitor voltage converter circuit 90 of the embodiment shown in FIG. 15. An inductor L1, an inductor L2, an inductor L11 and an inductor L12 of the switched capacitor voltage converter circuit 100 have coupled inductance among one another. As a consequence, there is better current balance among an inductor current IL', an inductor current IL2, an inductor current IL11 and an inductor current IL12 of the switched capacitor voltage converter circuit 100, and better voltage balance among a capacitor C3 a capacitor C2, a capacitor C13 and a capacitor C12 of the switched capacitor voltage converter circuit 100. In one embodiment, depending upon practical consideration, it can be arranged so that all four of the inductor L1, the inductor L2, the inductor L11 and the inductor L12 of the switched capacitor voltage converter circuit 100 have coupled inductance among one another or just a part of the above-mentioned four inductors have coupled inductance among one another. In one embodiment, the inductor L1, the inductor L2, the inductor L11 and the inductor L12 can be configured as at least one transformer.

The control circuit 1001 of this embodiment can be implemented by using the control circuit structure of FIGS.

2A and 2B; please refer to the detailed descriptions of FIGS. 2A and 2B. The inductor current freewheeling is similar to that described with reference to FIG. 2C, and please refer to the detailed description of FIG. 2C.

Figure 17:
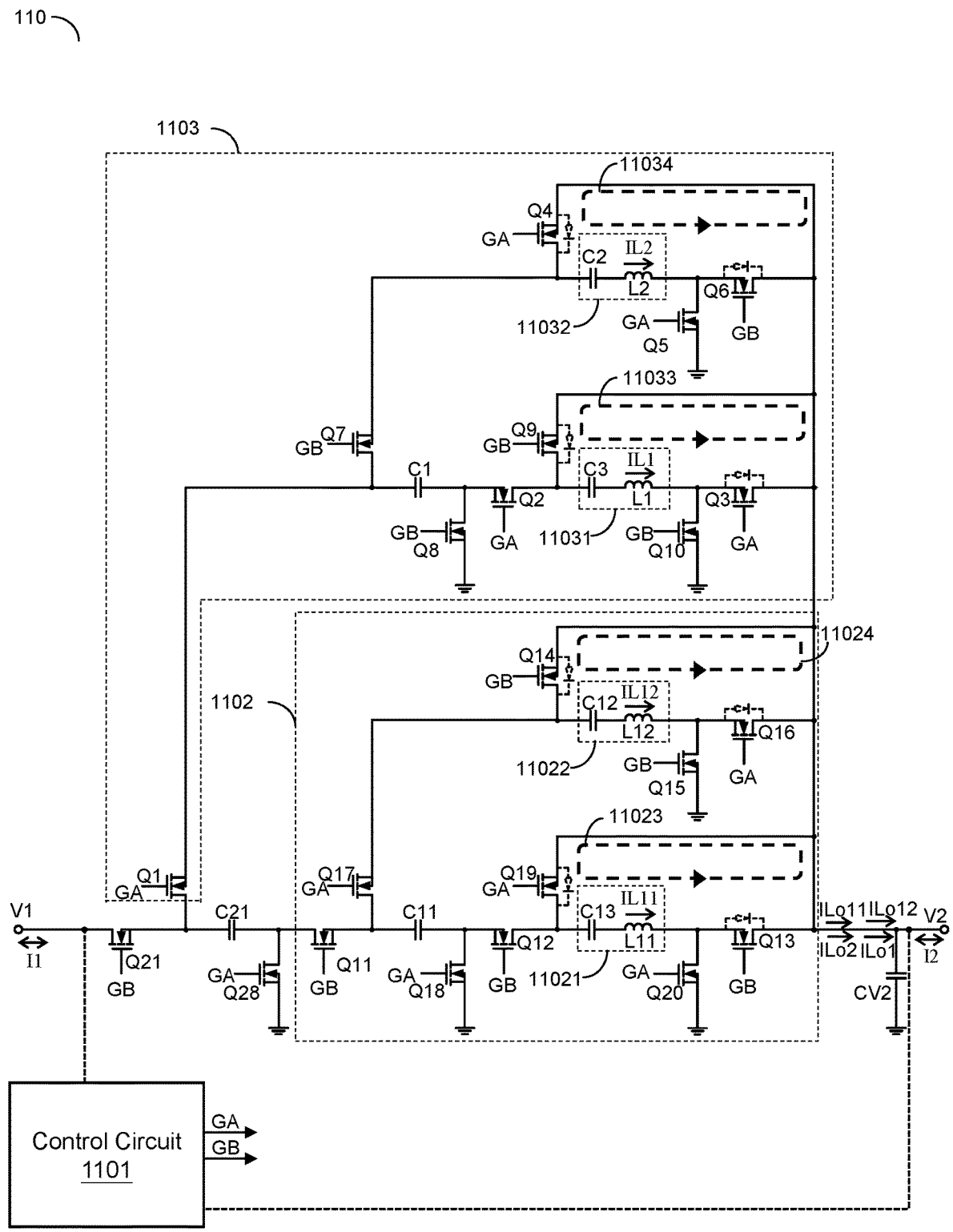
FIG. 17 shows a schematic circuit diagram of a switched capacitor voltage converter circuit according to another embodiment of the present invention.

FIG. 17 illustrates a schematic circuit diagram of a switched capacitor voltage converter circuit in accordance with whereas, another embodiment of the present invention. The switched capacitor voltage converter circuit 110 shown in FIG. 17 includes: a first switched capacitor 1102, a second switched capacitor 1103, an upper layer capacitor (i.e., capacitor C21) and upper layer switches (i.e., switches Q21 and Q28). The first switched capacitor 1102 and the second switched capacitor 1103 correspond to, for example, the switched capacitor 402 of the embodiment shown in FIG. 5. From one perspective, the switched capacitor voltage converter circuit 110 shown in FIG. 17 is a multi-layer structure based on a basic configuration of the switched capacitor 402 shown in FIG. 5. To elaborate in more detail, in this embodiment, the upper layer capacitor (i.e., capacitor C21), the upper layer switches (i.e., switches Q21 and Q28), the first switched capacitor 1102 and the second switched capacitor 1103 are coupled to one another according to a fundamental topology. Please refer to FIG. 18, the "fundamental topology" refers to a structure unit including the upper layer capacitor (i.e., capacitor C21), the upper layer switches (i.e., switches Q21 and Q28), the first switched capacitor 1102 and the second switched capacitor 1103, and the coupling relationships among them. The details thereof will be described later.

The control circuit 1101 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 18:
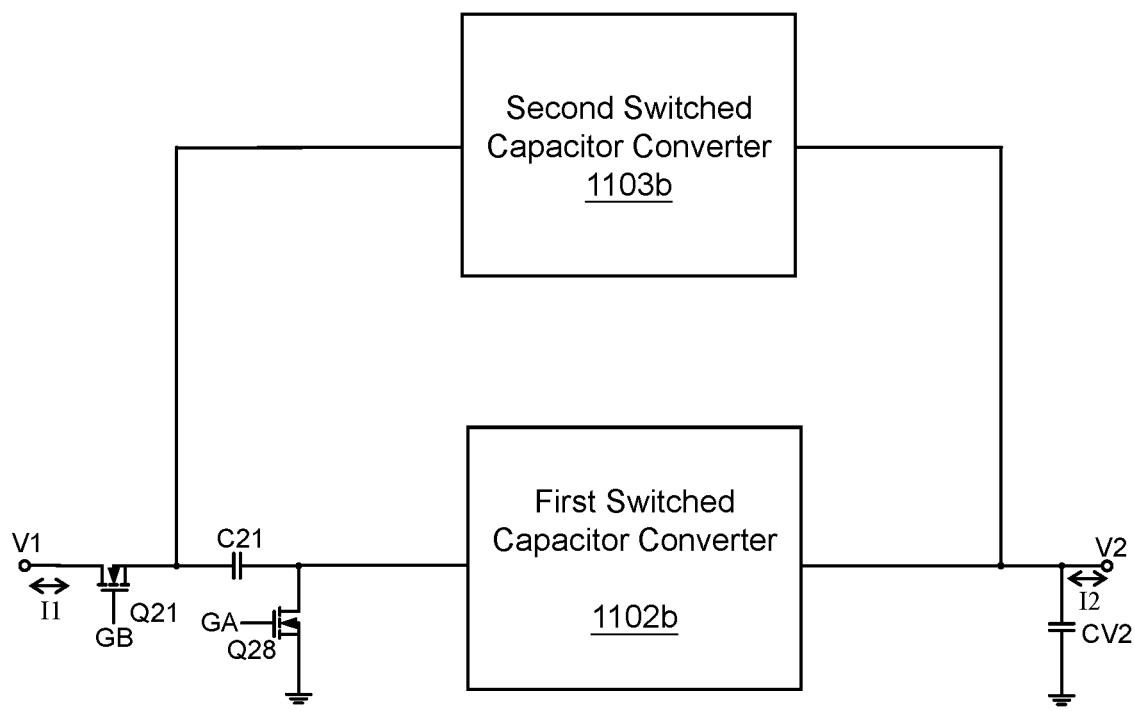
FIG. 18 shows a schematic circuit diagram of a switched capacitor voltage converter circuit according to another embodiment of the present invention.

In one embodiment, based upon the above-mentioned fundamental topology, an input end of the first switched capacitor 1102 (corresponding to the first switched capacitor 1102b shown in FIG. 18) is electrically connected to one end of the upper layer capacitor (i.e., capacitor C21), whereas, an input end of the second switched capacitor 1103 (corresponding to the second switched capacitor 1103b shown in FIG. 18 is electrically connected to the other end of the upper layer capacitor (i.e., capacitor C21). Besides, an output end of the first switched capacitor 1102 and an output end of the second switched capacitor 1103 are both electrically connected to the second voltage V2.

During a first process (e.g., corresponding to a period wherein the control signal GA is in enable state while the control signal GB is in disable state), the upper layer switches (i.e., switches Q21 and Q28) and the switches (e.g., Q11~Q20) of the first switched capacitor 1102 control the upper layer capacitor (i.e., capacitor C21) to be electrically connected in series to the first switched capacitor 1102, so that at least one current path is formed between the first voltage V1 and the second voltage V2, and the upper layer switches (i.e., switches Q21 and Q28) and the switches (e.g., Q1~Q10) of the second switched capacitor 1103 control the upper layer capacitor (i.e., capacitor C21) to be disconnected from the second switched capacitor 1103, and the upper layer switches (i.e., switches Q21 and Q28) and the switches (e.g., Q1~Q10) of the second switched capacitor 1103 control the second switched capacitor 1103 to form at least one current path between the second voltage V2 and a ground voltage level.

On the other hand, during a second process (e.g., corresponding to a period wherein the control signal GA is in disable state while the control signal GB is in enable state), the upper layer switches (i.e., switches Q21 and Q28) and the switches (e.g., Q1~Q10) of the second switched capacitor 1103 control the second switched capacitor 1103 and the upper layer capacitor (i.e., capacitor C21) to be electrically connected in series between the second voltage V2 and the ground voltage level, so that at least one current path is formed between the second voltage V2 and the ground voltage level, and the upper layer switches (i.e., switches Q21 and Q28) and the switches (e.g., Q11~Q20) of the first switched capacitor 1102 control the upper layer capacitor (i.e., capacitor C21) to be disconnected from the first switched capacitor 1102, and the upper layer switches (i.e., switches Q21 and Q28) and the switches (e.g., Q11~Q20) of the first switched capacitor 1102 control the first switched capacitor 1102 to form at least one current path between the second voltage V2 and the ground voltage level.

The above-mentioned current path refers to a current path formed by conductive switches corresponding to the control signal GA or the control signal GB which is in enable state.

The first switched capacitor 1102 and the second switched capacitor 1103 are equipped with the resonant tanks shown in the embodiment of FIG. 5, i.e. resonant tanks 11021, 11022, 11031 and 11032, to achieve power conversion between the first voltage V1 and the second voltage V2 by means of the resonant tanks 11021, 11022, 11031 and 11032 in resonant fashion.

In this embodiment of FIG. 17, a ratio of the first voltage V1 of the first voltage V1 to the second voltage V2 of the second voltage V2 is equal to 8. To be more specific, in a steady state, the voltage across the resonant capacitor C21 is equal to 4*V2; the voltage across the non-resonant capacitor C1 and the voltage across the non-resonant capacitor C11 (both C1 and C11 correspond to the non-resonant capacitor in the aforementioned embodiment) are equal to 2*V2; the voltage across the resonant capacitor C3, the voltage across the resonant capacitor C13 (both C3 and C13 correspond to the resonant capacitor in the aforementioned embodiment), the voltage across the resonant capacitor C2 and the voltage across the resonant capacitor C12 (both C2 and C22 correspond to the resonant capacitor in the aforementioned embodiment) are equal to V2.

Please refer to FIG. 18. The present invention can recursively expand layers of the pipeline switched capacitor voltage converter circuit based on the fundamental topology shown in FIG. 18, so as to achieve higher scaling factor of conversion between the first voltage and the second voltage. As shown in FIG. 18, any pipeline switched capacitor voltage converter circuit complying with the fundamental topology shown in FIG. 18 can be employed to replace the first switched capacitor 1102 and the second switched capacitor 1103 (e.g., each of the first switched capacitor 1102b and the second switched capacitor 1103b can be an N-layers pipeline switched capacitor voltage converter circuit shown in FIG. 18, wherein N is an integer greater than or equal to two), so that the pipeline switched capacitor voltage converter circuit have even more layers. That is, under such situation, the pipeline switched capacitor voltage converter circuit 110b will become a pipeline switched capacitor voltage converter circuit having (N+1) layers.

As an example, assumed that the first switched capacitor 1102b and the second switched capacitor 1103b shown in FIG. 18 are each replaced by a pipeline switched capacitor voltage converter circuit 110 shown in FIG. 17, then the pipeline switched capacitor voltage converter circuit 110b shown in FIG. 18 will become a pipeline switched capacitor voltage converter circuit having a conversion ratio of 16:1.

Repeating such replacement recursively, the conversion ratio can be increased even more (e.g., by replacing each of the first switched capacitor 1102b and the second switched capacitor 1103b shown in FIG. 18 by a pipeline switched capacitor voltage converter circuit having a conversion ratio of 16:1, the conversion ration becomes 32:1, and so on).

In this embodiment (i.e., a pipeline switched capacitor voltage converter circuit having a ratio of 16:1), the first switched capacitor 1102 and the second switched capacitor 1103 shown in FIG. 17 are regarded as a bottom layer (which is the first layer) of the pipeline switched capacitor voltage converter circuit, which has a configuration corresponding to, for example, the switched capacitor 402 of the embodiment shown in FIG. 5; the pipeline switched capacitor voltage converter circuit 110 shown in FIG. 17 can be regarded as a 2-layers pipeline switched capacitor voltage converter circuit; if each of the first switched capacitor 1102b and the second switched capacitor 1103b shown in FIG. 18 is replaced by a 2-layers pipeline switched capacitor voltage converter circuit 110 shown in FIG. 17, then the pipeline switched capacitor voltage converter circuit 110b shown in FIG. 18 will become a 3-layers pipeline switched capacitor voltage converter circuit.

Figure 19:
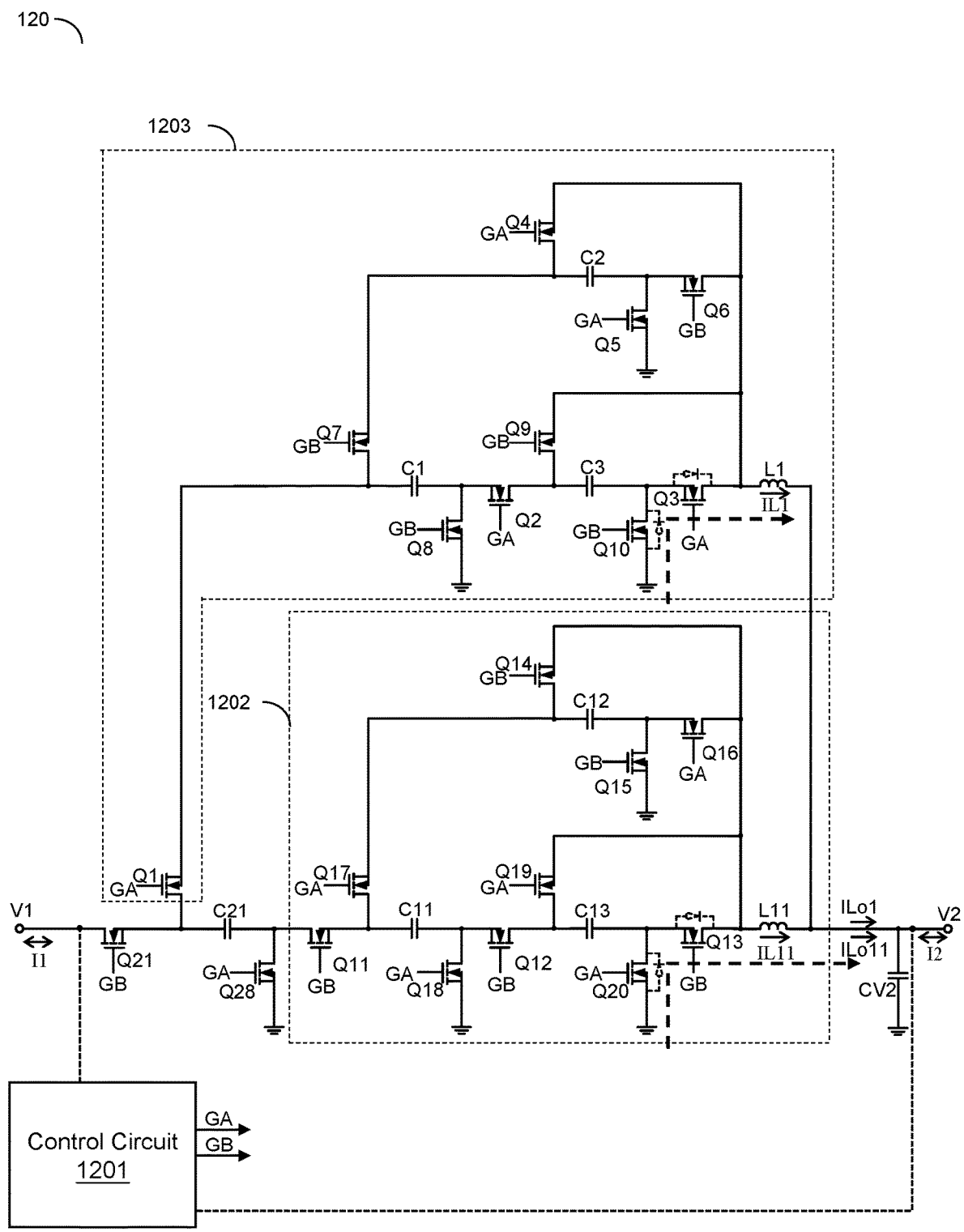
FIG. 19 shows a schematic circuit diagram of a switched capacitor voltage converter circuit according to another embodiment of the present invention.

FIG. 19 shows a schematic circuit diagram of a switched capacitor voltage converter circuit according to another embodiment of the present invention. The switched capacitor voltage converter circuit 120 shown in FIG. 19 is similar to the switched capacitor voltage converter circuit 110 shown in FIG. 17, but is different in that: the first switched capacitor 1202 shares an inductor L11, and the second switched capacitor 1203 shares an inductor L1. Similar to FIG. 6, the capacitors C3 and C2 are connected in parallel and the parallel circuit is connected in series with the inductor L1, and the capacitors C13 and C12 are connected in parallel and the parallel circuit is connected in series with the inductor L11. Similar to the switched capacitor voltage converter circuit 110 of FIG. 17, the present invention alternatingly operate the first switched capacitor 1202 and the second switched capacitor 1203 to perform power conversion, wherein each of the first switched capacitor 1202 and the second switched capacitor 1203 is similar to the switched capacitor 502 in FIG. 6, which performs power conversion in resonant fashion.

The control circuit 1201 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 20:
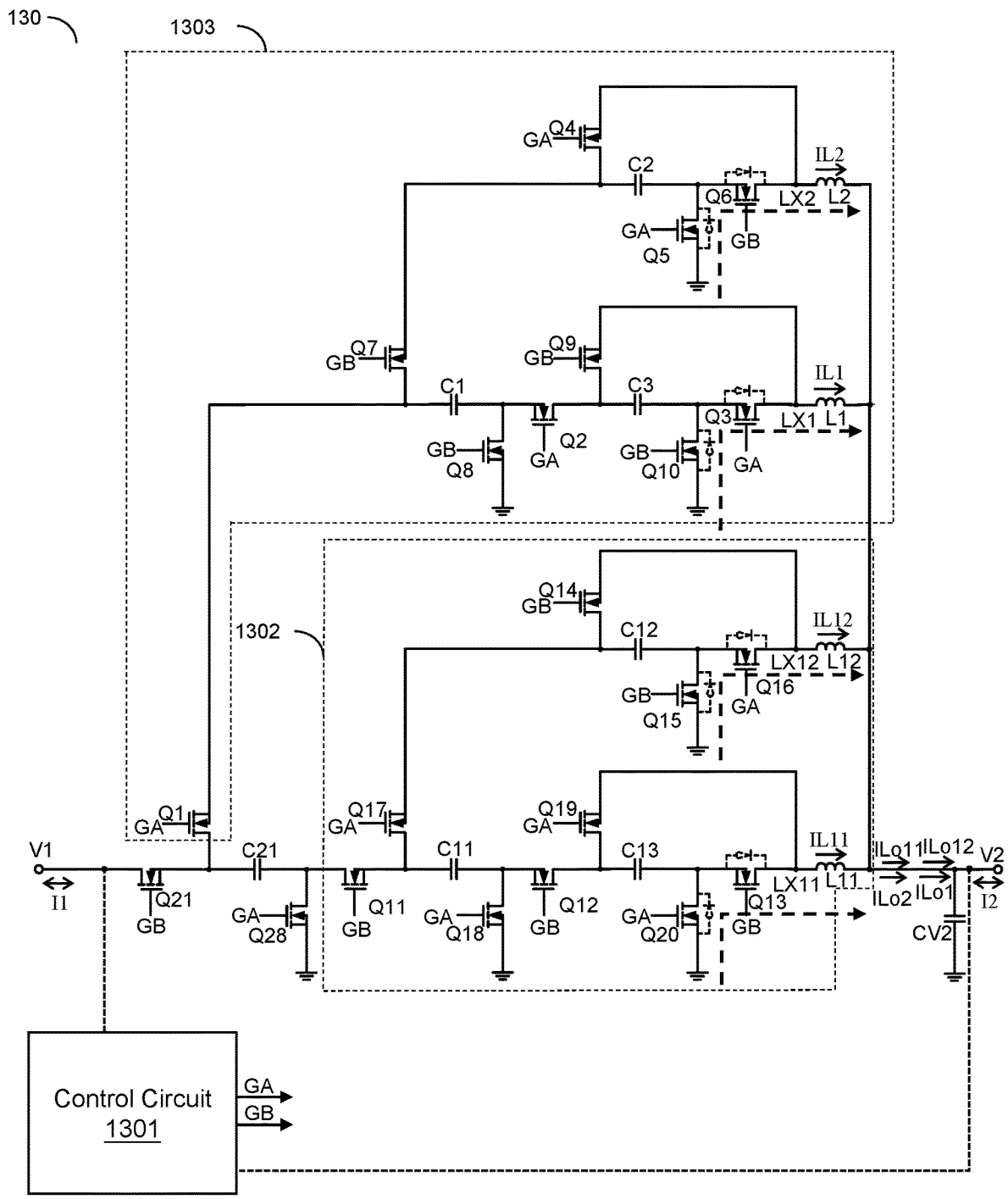
FIG. 20 shows a schematic circuit diagram of a switched capacitor voltage converter circuit according to another embodiment of the present invention.

FIG. 20 shows a schematic circuit diagram of a switched capacitor voltage converter circuit according to another embodiment of the present invention. The switched capacitor voltage converter circuit 130 of FIG. 20 is similar to the switched capacitor voltage converter circuit 110 of the embodiment shown in FIG. 17, but is different in that: the inductors L11 and L12 of the inductors L1 and L2 of the first switched capacitor 1302 and the inductors L1 and L2 of the second switched capacitor 1303 are not directly connected in series with the capacitors C3, C2, C13 and C12, but instead, these inductors are connected in series with the capacitors C3, C2, C13 and C12 through the first switching node LX1, the second switching node LX2, the first switching node LX11 and the second switching node LX12. The switched capacitor voltage converter circuit 130 executes power conversion between the first voltage V1 and the second voltage V2 in resonant fashion which is similar to the switched capacitor voltage converter circuit 110 via the inductors L1, L2, L11 and L12 and the capacitors corresponding to the inductors L1, L2, L11 and L12. In this embodiment, a ratio of the first voltage V1 of the first voltage V1 to the second voltage V2 of the second voltage V2 is also equal to 8.

The control circuit 1301 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 21:
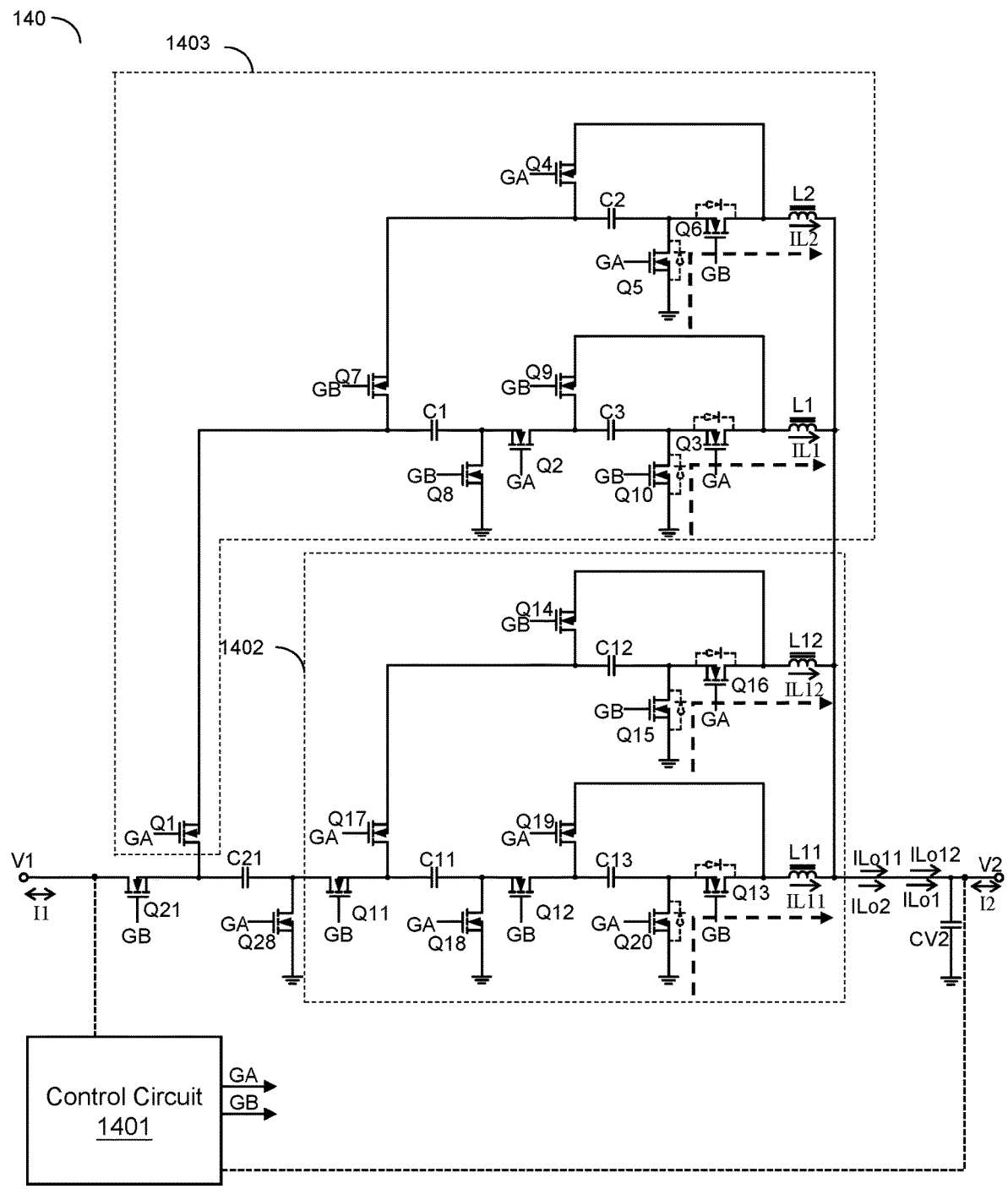
FIG. 21 shows a schematic circuit diagram of a switched capacitor voltage converter circuit according to another embodiment of the present invention.

FIG. 21 shows a schematic circuit diagram of a switched capacitor voltage converter circuit according to another embodiment of the present invention. The switched capacitor voltage converter circuit 140 of FIG. 21 is similar to the switched capacitor voltage converter circuit 130 of the embodiment shown in FIG. 20. The inductor L1, the inductor L2, the inductor L11 and the inductor L12 of the switched capacitor voltage converter circuit 140 have coupled inductance among one another. As a consequence, there is better current balance among the inductor current IL', the inductor current IL2, the inductor current IL11 and the inductor current IL12 of the switched capacitor voltage converter circuit 140, and there is better voltage balance among the capacitor C1, the capacitor C2, the capacitor C11 and the capacitor C12 of the switched capacitor voltage converter circuit 140. In one embodiment, depending upon practical consideration, the switched capacitor voltage converter circuit 140 can arrange all of the inductor L1, the inductor L2, the inductor L11 and the inductor L12 to have coupled inductance among one another or just a part of the above-mentioned four inductors to have coupled inductance among one another. In one embodiment, the inductor L1, the inductor L2, the inductor L11 and the inductor L12 can be configured as at least one transformer.

The control circuit 1401 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 22A:
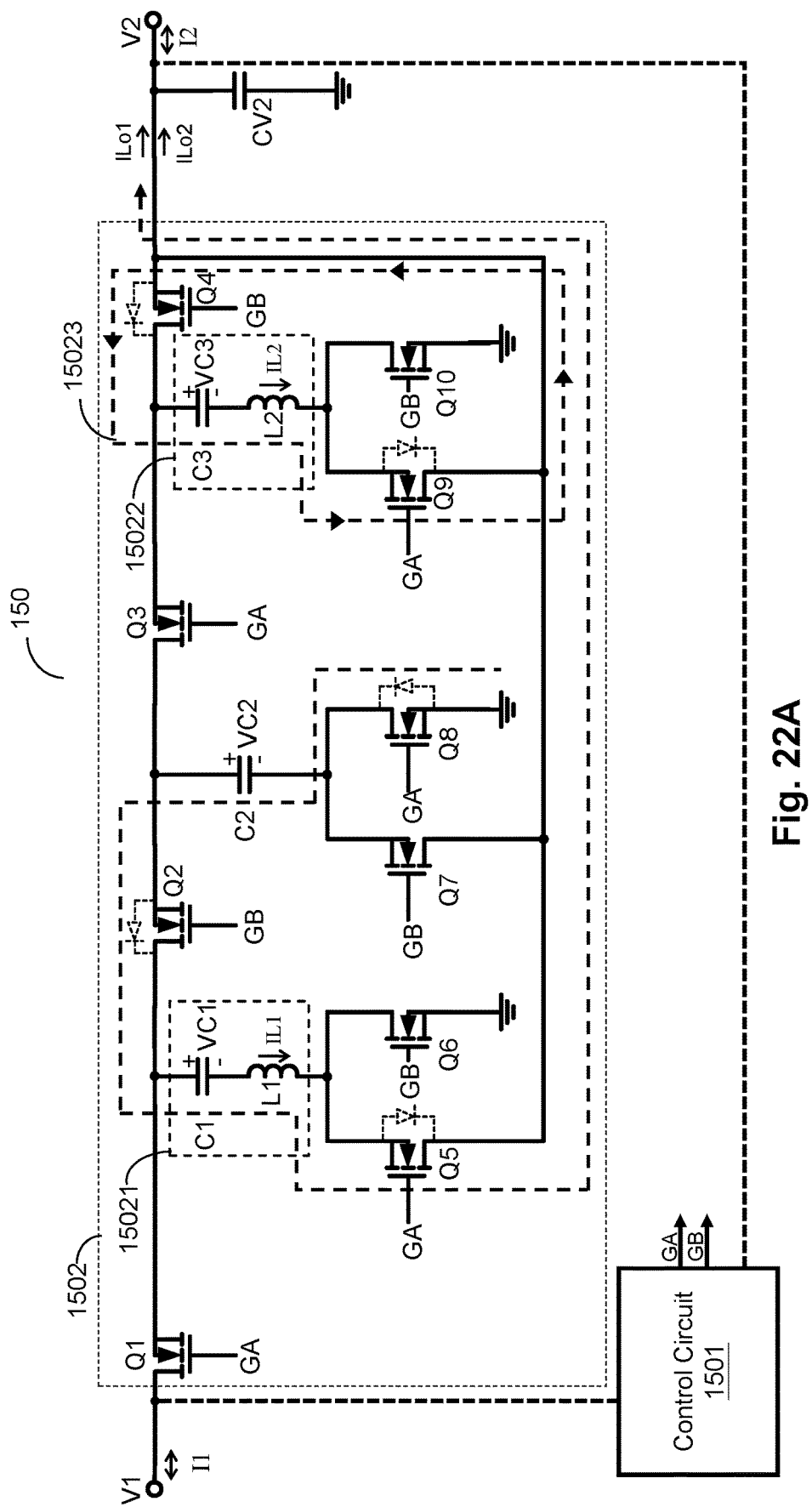
FIG. 22A shows a schematic circuit diagram of a switched capacitor voltage converter circuit according to another embodiment of the present invention.

FIG. 22A shows a schematic circuit diagram of a switched capacitor voltage converter circuit according to another embodiment of the present invention. As shown in FIG. 22A, the switched capacitor voltage converter circuit 150 includes resonant capacitors C1 and C3, at least one non-resonant capacitor C2, switches Q1~Q10, resonant inductors L1 and L2, and a controller 1501.

As shown in FIG. 22A, in one embodiment, the controller 1501 is configured to operably generate a first control signal GA corresponding to a first resonant process in the resonant voltage conversion mode and is configured to operably generate a second control signal GB corresponding to a second resonant process in the resonant voltage conversion mode, so as to operate the switches Q1~Q10 in the resonant voltage conversion mode to switch electrical connection relationships of the resonant capacitors C1 and C3 and the at least one non-resonant capacitor C2. The switched capacitor voltage converter circuit 150 includes at least one resonant tank (e.g., resonant tanks 1502 and 1503), wherein the resonant tank 1502 includes a resonant capacitor C1 and a resonant inductor L1 which are connected in series to each other, whereas, the resonant tank 1503 includes a resonant capacitor C3 and a resonant inductor L2 which are connected in series to each other. The switches Q1~Q10 are coupled to the at least one resonator (e.g., resonant tanks 1502 and 1503). In the resonant voltage conversion mode, the switches Q1~Q10 are configured to operably switch electrical connection relationships of the resonant tanks 1502 and 1503 according to the first control signal GA and the second control signal GB in correspondence to the first resonant process and the second resonant process, respectively.

In the first resonant process, a resonant charging operation is performed on the resonant tanks 1502 and 1503. In a second resonant process, a resonant discharging operation is performed on the resonant tanks 1502 and 1503. The at least one non-resonant capacitor C2 is coupled to the at least one resonator (e.g., resonant tanks 1502 and 1503). In the resonant voltage conversion mode, the electrical connection relationship of the non-resonant capacitor C2 with the at least one resonator (e.g., resonant tanks 1502 and 1503) is controlled according to the first control signal GA and the second control signal GB. The voltage across the at least one non-resonant capacitor C2 has a constant ratio to the first voltage V1 of the first voltage V1. For example, in this embodiment, the voltage across the at least one non-resonant capacitor C2 is ½ of the first voltage V1. The first resonant process and the second resonant process are performed in a repeated, alternating manner, in different time periods rather than concurrently, to convert the first voltage V1 to the second voltage V2 or to convert the second voltage V2 to the first voltage V1. In the resonant voltage conversion mode, the first control signal GA and the second control signal GB have respective ON periods which do not overlap one another, so that the first resonant process and the second resonant process do not overlap each other.

In the first resonant process, according to first control signal GA, the switches Q1, Q3, Q5, Q8 and Q9 are controlled to be ON, whereas, the switches Q2, Q4, Q6, Q7 and Q10 are controlled to be OFF, so that a series connection of the resonant capacitor C1 of the resonant tank 1502 and the resonant inductor L1 is formed between the first voltage V1 and the second voltage V2 and so that a series connection of the non-resonant capacitor C2 and the resonant capacitor C3 and the resonant inductor L2 of the resonant tank 1503 is formed between a ground voltage level and the second voltage V2, and to thereby charge the resonant capacitors C1 and C3 and to thereby discharge the non-resonant capacitor C2. In the second resonant process, according to second control signal GB, the switches Q2, Q4, Q6, Q7 and Q10 are controlled to be ON, whereas, the switches Q1, Q3, Q5, Q8 and Q9 are controlled to be OFF, so that a series connection of the non-resonant capacitor C2 and the resonant capacitor C1 and the resonant inductor L1 of the resonant tank 1502 is formed between a ground voltage level and the second voltage V2 and so that a series connection of the resonant capacitor C3 and the resonant inductor L2 of the resonant tank 1503 is formed between a ground voltage level and the second voltage V2, and to thereby discharge the resonant capacitors C1 and C3 and to thereby charge the non-resonant capacitor C2.

Figure 22B:
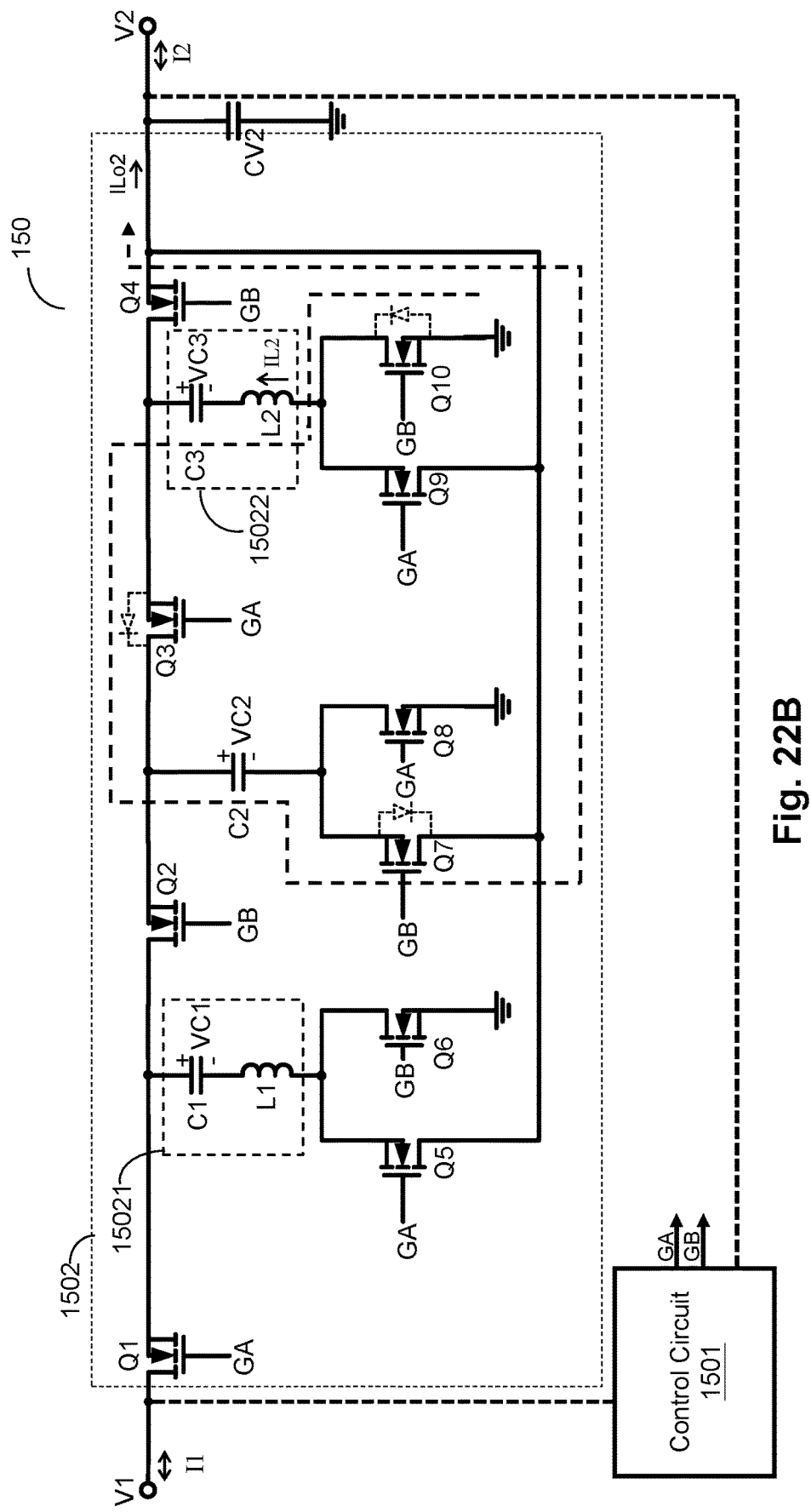
FIG. 22B shows a schematic circuit diagram of a switched capacitor voltage converter circuit according to another embodiment of the present invention.

In regard to how the resonant tanks 1502 and 1503 of the switched capacitor voltage converter circuit 150 shown in FIGS. 22A and 22B operate, this is well known to those skilled in the art, so the details thereof are not redundantly explained here.

The control circuit 1501 of this embodiment can be implemented by using the control circuit structure of FIGS. 2A and 2B; please refer to the detailed descriptions of FIGS. 2A and 2B. As shown in FIG. 22A, when the control circuit 1501 decreases the duty ratio of the first operation signal GA and/or the second operation signal GB according to the predetermined ratio, in the first process, one end of the inductor L1 is connected through the body diodes (as shown by the dashed line in FIG. 22A) of at least one switch (e.g., switches Q8 and Q2) to a DC potential, so that the inductor current ILo1 flowing toward the second voltage V2 is a linear ramp current to adjust the predetermined ratio. For example, the inductor L1 is connected in series between the second voltage V2 and the ground potential through the body diodes in the switches Q8, Q2, and Q5 so that inductor current IL1 can freewheel according to the current direction shown by the dashed arrow in FIG. 22A, to adjust the predetermined ratio. Please continue referring to FIG. 22A, when the control circuit 1501 decreases the duty ratio of the first operation signal GA and/or the second operation signal GB according to the predetermined ratio, in the first process, the inductor current ILo2 flowing toward the second voltage V2 is conducted by the body diodes (as shown by the dashed line in FIG. 22A) of at least one switch (e.g., switches Q4 and Q9), so as to keep freewheeling along the closed-loop 15023 formed by the resonant tank 15022 and the body diodes (as shown by the dashed line in FIG. 22A) of at least one switch (e.g., switches Q4 and Q9); in this embodiment, the second state is that the inductor current ILo1 stops flowing toward the second voltage V2. In this case, the closed-loop current (i.e. the inductor current IL2) does not result in a net current flowing into or out of the non-resonant capacitor CV2 (which can be regarded as the output capacitor).

Referring to FIG. 22B, when the control circuit 1501 decreases the duty ratio of the first operation signal GA and/or the second operation signal GB according to the predetermined ratio, in the second process, when the plural switches (e.g., switches Q1~Q10) are all non-conductive, one end of the corresponding inductor L2 is connected to a body diode (as shown by the dashed line in FIG. 22B) of at least one switch (e.g., switch Q10) to the DC potential to adjust the predetermined ratio. For example, the inductor L2 is connected in series between the second voltage V2 and the ground potential through the body diodes in the switches Q10, Q3 and Q7, so that the inductor current IL2 keep freewheeling according to the current direction shown by the dashed arrow in FIG. 22B to adjust the predetermined ratio.

Figure 23:
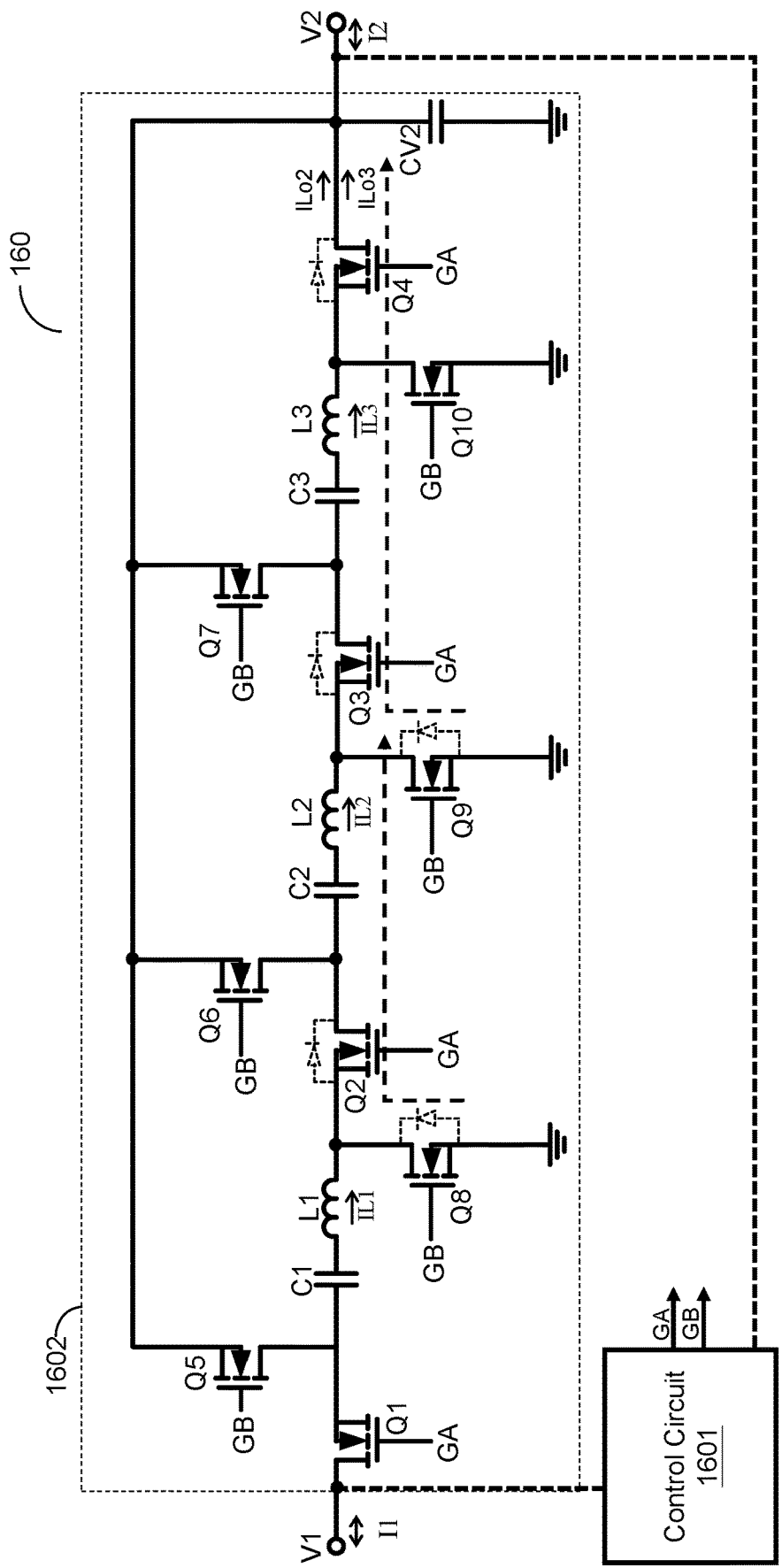
FIG. 23 shows a schematic circuit diagram of a switched capacitor voltage converter circuit according to another embodiment of the present invention.

FIG. 23 shows a schematic circuit diagram of a switched capacitor voltage converter circuit according to another embodiment of the present invention. As shown in FIG. 23, the switched capacitor voltage converter circuit 160 of the present invention comprises: capacitors C1~C3, switches Q1~Q10, and inductors L1~L3. The switches Q1, Q2 and Q3 are connected in series to the corresponding capacitors C1, C2 and C3, respectively. Certainly, it should be understood that the implementation of the number of the capacitors of the switched capacitor voltage converter circuit as three in the above-mentioned preferred embodiment is only an illustrative example, but not for limiting the broadest scope of the present invention. In other embodiments, it is also practicable and within the scope of the present invention that the number of the capacitors of the switched capacitor voltage converter circuit can be any plural number other than three. Likely, the number of the inductors of the switched capacitor voltage converter circuit also can be any plural number other than three.

The switches Q1~Q10 can switch electrical connection relationships between the capacitors C1~C3 with the inductors L1~L3 according to corresponding control signals. In a first process, the switches Q1~Q4 are ON, whereas, the switches Q5-Q10 are OFF, so that a series connection of the capacitors C1~C3 and the inductors L1~L3 is formed between the first voltage V1 and the second voltage V2, so as to form a charging path. In a second process, the inductors L1~L3 function as discharging inductors; the switches Q5-Q10 are ON, whereas, the switches Q1~Q4 are OFF. As a result, a series connection of the capacitor C1 and the inductors L1 is formed between the second voltage V2 and the ground voltage; a series connection of the capacitor C2 and the inductors L2 is formed between the second voltage V2 and the ground voltage; and a series connection of the capacitor C3 and the inductors L3 is formed between the second voltage V2 and the ground voltage, so that plural discharging paths in parallel are formed. It is noteworthy that, the above-mentioned first process and second process are performed at different periods in an alternating manner. That is, the above-mentioned first process and second process are not performed at the same time. In one embodiment, the first process and the second process are arranged in alternating and repetitive manner, so as to convert the first voltage V1 to the second voltage V2 or to convert the second voltage V2 to the first voltage V1. In this embodiment, the DC bias voltages of the capacitors C1, C2 and C3 all are the second voltage V2 of the second voltage V2, so the capacitors C1, C2 and C3 of this embodiment will only need to withstand a relatively lower rated voltage. Hence, this embodiment can utilize capacitors having a smaller size.

The control circuit 1601 of this embodiment can be implemented by using the control circuit structure of FIGS. 2A and 2B; please refer to the detailed descriptions of FIGS. 2A and 2B. As shown in FIG. 23, when the control circuit 1601 decreases the duty ratio of the first operation signal GA and/or the second operation signal GB according to the predetermined ratio, in the first process and/or the second process, when the plural switches (e.g., switches Q1~Q10) are all non-conductive, one end of the inductor L2 and one end of the inductor L3 are conducted by the body diodes (as shown by the dashed line in FIG. 23) of at least one switch (such as switches Q8 and Q2, and switches Q9 and Q3) to a DC potential, so that the inductor currents ILo2 and ILo3 flowing toward the second voltage V2 are linear ramp currents, to adjust the predetermined ratio. For example, the inductor L2 is connected in series between the second voltage V2 and the ground potential through the body diodes in the switches Q8, Q2, Q3 and Q4; the inductor L3 is connected in series between the second voltage V2 and the ground potential through the body diodes in the switches Q9, Q3, and Q4. Thus, the inductor current IL2 and inductor current IL3 keep freewheeling according to the current direction shown by the dashed arrow in FIG. 23, to adjust the predetermined ratio.

In one embodiment, the above-mentioned first process has a first resonant frequency and above-mentioned second process has a second resonant frequency. In one preferable embodiment, the first resonant frequency and the second resonant frequency are the same.

In one embodiment, the conversion ratio between the first voltage V1 and the second voltage V2 of the switched capacitor voltage converter circuit 160 is adjustable to be 4:1, 3:1 or 2:1. More specifically, the switched capacitor voltage converter circuit in this embodiment has a voltage conversion ratio of 4:1; however, by controlling ON/OFF of the first switches Q1~Q10, the voltage conversion ratio of the switched capacitor voltage converter circuit can be changed to 3:1. For example, by controlling the switch Q7 to be always ON while at the same time controlling the switches Q4 and Q10 to be always OFF, the conversion ratio of the switched capacitor voltage converter circuit will be changed to 3:1. Likely, the conversion ratio of the switched capacitor voltage converter circuit can be changed to 2:1 by properly controlling ON/OFF of the switches Q1~Q10.

Figure 24:
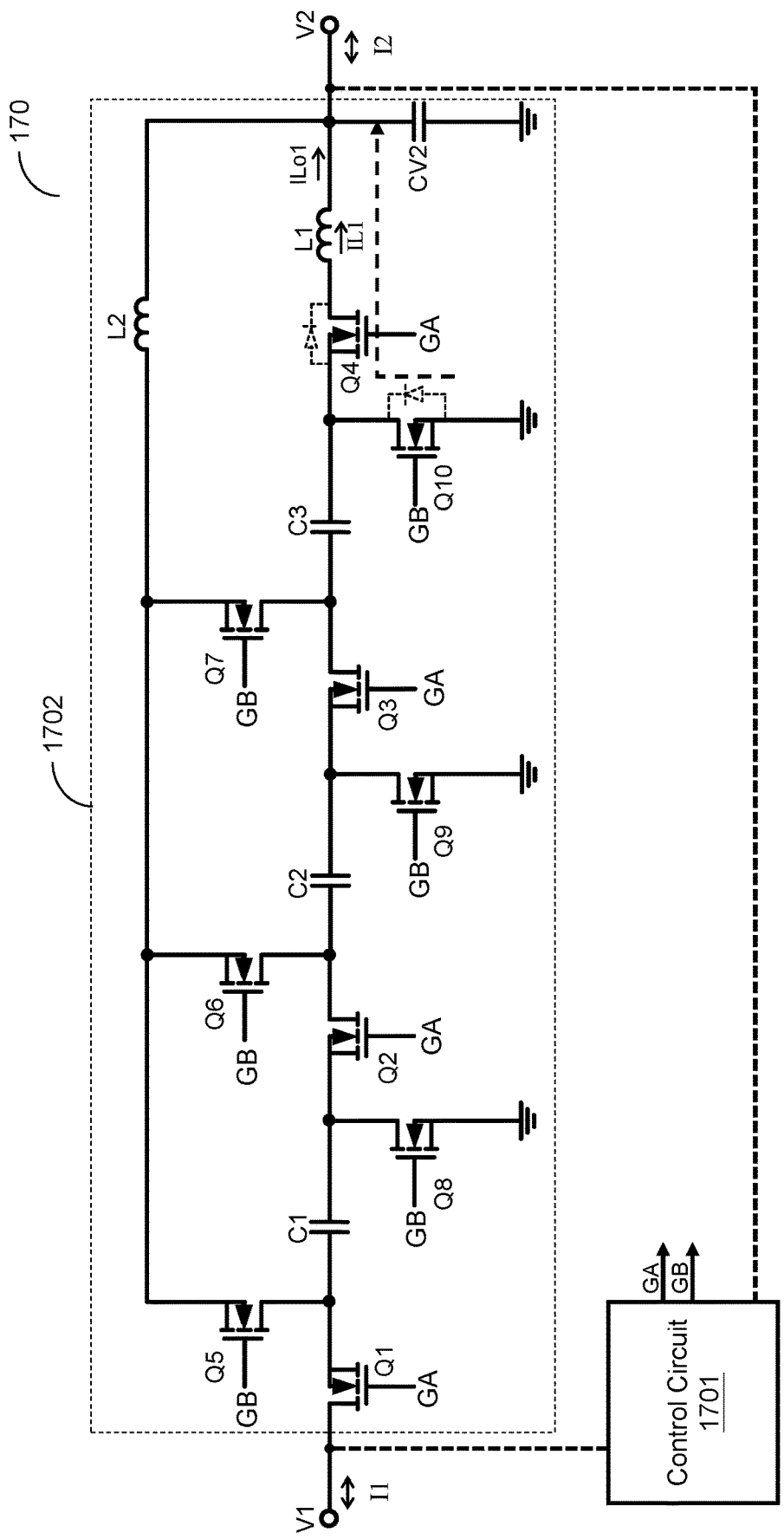
FIG. 24 shows a schematic circuit diagram of a switched capacitor voltage converter circuit according to another embodiment of the present invention.

FIG. 24 shows a schematic circuit diagram of a switched capacitor voltage converter circuit according to another embodiment of the present invention. This embodiment of FIG. 24 is different from the previous embodiment of FIG. 23 in that: this embodiment comprises plural capacitors but they share one charging inductor and one discharging inductor. In this embodiment, there is only one charging inductor and only one discharging inductor regardless how many numbers of the capacitors is. This embodiment provides a benefit of reducing the number of the inductors. As shown in FIG. 24, the switched capacitor voltage converter circuit 170 of the present invention comprises: capacitors C1~C3, switches Q1~Q10, and inductors L1~L2. The switches Q1, Q2 and Q3 are connected in series to the corresponding capacitors C1, C2 and C3, respectively. The switch Q4 is connected in series to the inductor L1. Certainly, it should be understood that the implementation of the number of the capacitors of the switched capacitor voltage converter circuit as three in the above-mentioned preferred embodiment is only an illustrative example, but not for limiting the broadest scope of the present invention. In other embodiments, it is also practicable and within the scope of the present invention that the number of the capacitors of the switched capacitor voltage converter circuit can be any plural number other than three.

The switches Q1~Q10 can switch electrical connection relationships between the capacitors C1~C3 with the inductor L1 and the inductor L2 according to corresponding control signals. In a first process, the switches Q1~Q4 are ON, whereas, the switches Q5-Q10 are OFF, so that a series connection of the capacitors C1~C3 which is further connected in series to the charging inductor L1 is formed between the first voltage V1 and the second voltage V2, so as to form a first current path for charging operation. In a second process, the switches Q5-Q10 are ON, whereas, the switches Q1~Q4 are OFF, so that a parallel connection of the capacitors C1, C2 and C3 is connected in series to the inductor L2, so as to form plural second paths for discharging operation. It is noteworthy that, in one embodiment, the above-mentioned first process and second process are performed at different periods in an alternating manner, that is, the above-mentioned first process and second process are not performed at the same time, to convert the first voltage V1 to the second voltage V2 or to convert the second voltage V2 to the first voltage V1. In this embodiment, the DC bias voltages of the capacitors C1, C2 and C3 all are the second voltage V2 of the second voltage V2. Thus, the capacitors C1, C2 and C3 of this embodiment will only need to withstand a relatively lower rated voltage. Hence, this embodiment can utilize capacitors having a smaller size.

The control circuit 1701 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

In one embodiment, the above-mentioned first process has a first resonant frequency and above-mentioned second process has a second resonant frequency. In one preferable embodiment, the first resonant frequency and the second resonant frequency are the same. In another embodiment, the first resonant frequency and the second resonant frequency are different. In one embodiment, the inductance of the inductor L1 and the inductance of the inductor L2 are the same. In another embodiment, the inductance of the inductor L1 and the inductance of the inductor L2 are different.

Figure 25:
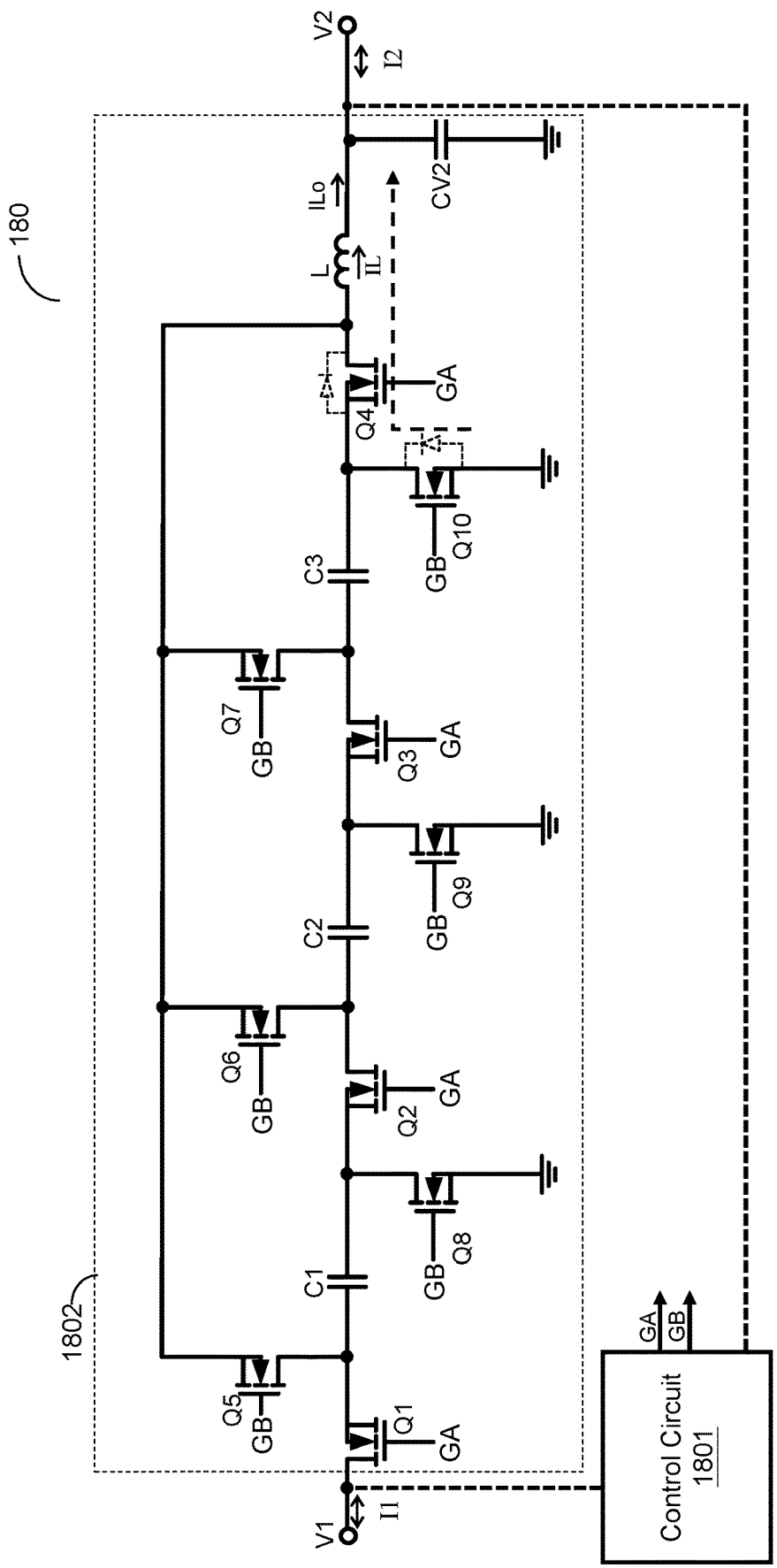
FIG. 25 shows a schematic circuit diagram of a switched capacitor voltage converter circuit according to another embodiment of the present invention.

FIG. 25 shows a schematic circuit diagram of a switched capacitor voltage converter circuit according to another embodiment of the present invention. In this embodiment, one same single inductor L1 serves as both the charging inductor and the discharging inductor; such implementation can reduce the required inductor number to minimum. As shown in FIG. 25, the switched capacitor voltage converter circuit 180 of the present invention comprises: capacitors C1~C3, switches Q1~Q10, and one inductor L1. The switches Q1, Q2 and Q3 are connected in series to the corresponding capacitors C1, C2 and C3, respectively. The switch Q4 is connected in series to the inductor L1. Certainly, it should be understood that the implementation of the number of the capacitors of the switched capacitor voltage converter circuit 170 as three in the above-mentioned preferred embodiment is only an illustrative example, but not for limiting the broadest scope of the present invention. In other embodiments, it is also practicable and within the scope of the present invention that the number of the capacitors of the switched capacitor voltage converter circuit 170 can be any multiple number other than three.

It is noteworthy that, in this embodiment, one same single inductor L1 serves as the charging inductor and the discharging inductor. In the second process, by switching the switches Q1~Q10, the capacitors C1~C3 are connected in parallel and the parallel connection is connected to the same single inductor L1. As one of average skill in the art readily understands by the description above, when the charging inductor and the discharging inductor are one same single inductor L1, a charging resonant current IL1 flows through the same inductor L1 during the first (charging) process, whereas, a discharging resonant current IL2 flows through the same inductor L1 during the second (discharging) process. Neither the charging resonant current IL1 nor the discharging resonant current IL2 flows through any other inductor.

The switches Q1~Q10 can respectively switch electrical connection relationships between the corresponding capacitors C1~C3 and the inductor L1 according to corresponding control signals. In a first process, the switches Q1~Q4 are ON, whereas, the switches Q5-Q10 are OFF, so that a series connection of the capacitors C1~C3 and the inductor L1 is formed between the first voltage V1 and the second voltage V2, which forms a first current path for charging operation. In a second process, the switches Q5-Q10 are ON, whereas, the switches Q1~Q4 are OFF, so that the capacitors C1, C2 and C3 form a parallel connection, which is connected to the inductor L1, to form plural second paths for discharging operation. It is noteworthy that, in one embodiment, the above-mentioned first process and second process are arranged at different periods in a repeated, alternating manner, that is, the above-mentioned first process and second process are not performed at the same time, to convert the first voltage V1 to the second voltage V2 or to convert the second voltage V2 to the first voltage V1. In this embodiment, the DC bias voltages of the capacitors C1, C2 and C3 all are the second voltage V2 of the second voltage V2. Thus, the capacitors C1, C2 and C3 of this embodiment will only need to withstand a relatively lower rated voltage. Hence, this embodiment can utilize capacitors having a smaller size.

The control circuit 1801 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

In one embodiment, the conversion ratio between the first voltage V1 and the second voltage V2 of the switched capacitor voltage converter circuit 180 is adjustable to be 4:1, 3:1 or 2:1 of the aforementioned switched capacitor voltage converter circuit 180.

In one embodiment, the conversion ratio of the switched capacitor voltage converter circuit 180 between the first voltage V1 and the second voltage V2 is adjustable to be 4:1, 3:1 or 2:1. For example, by controlling the switch Q7 to be always ON while at the same time controlling the switches Q4 and Q10 to be always OFF, the conversion ratio of the switched capacitor voltage converter circuit 180 will be changed to 3:1. by controlling the switch Q6 to be always ON while at the same time controlling the switches Q9, Q3, Q7, Q10 and Q4 to be always OFF, the conversion ratio of the switched capacitor voltage converter circuit 180 will be changed to 2:1.

Figure 26:
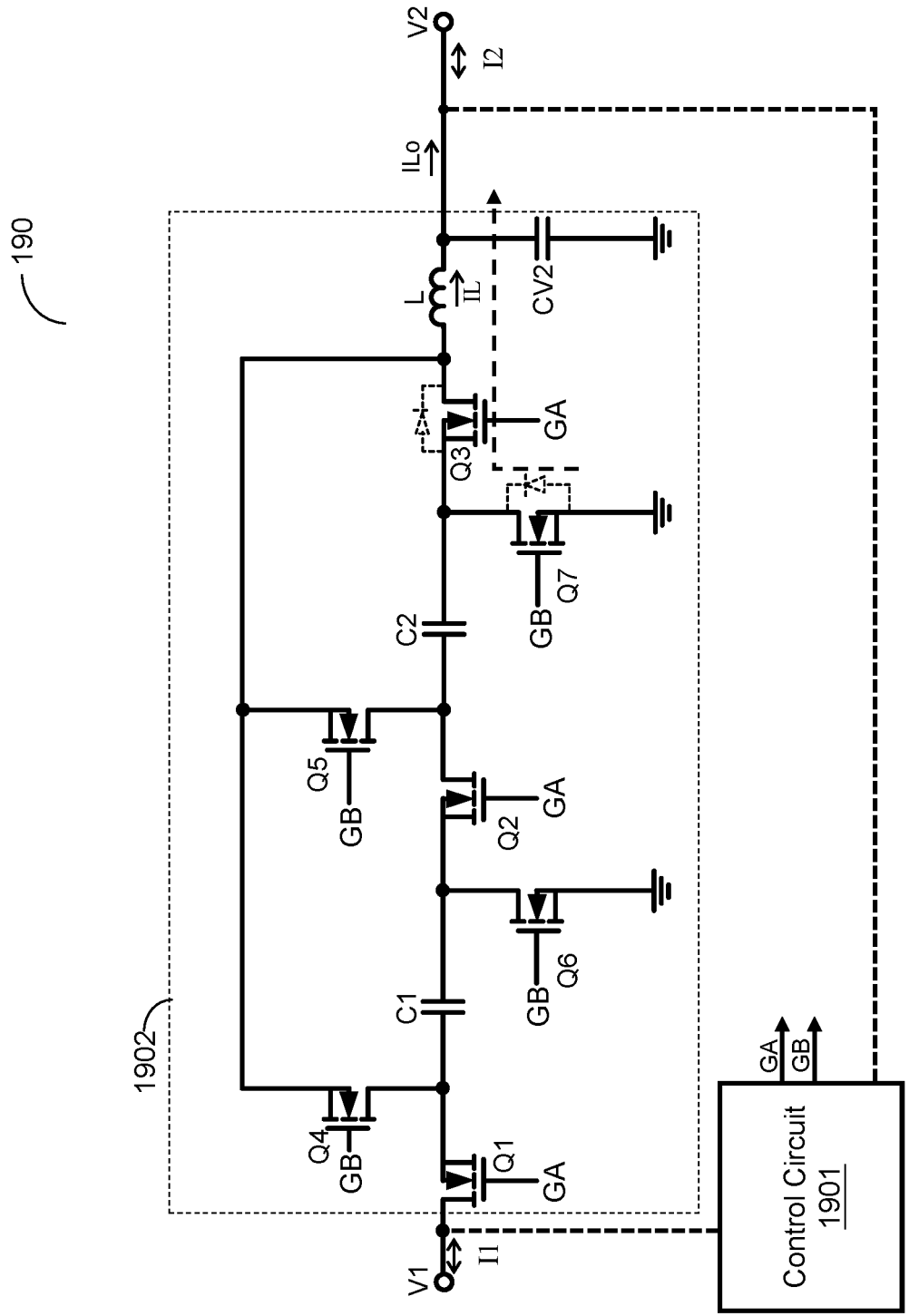
FIG. 26 shows a schematic circuit diagram of a switched capacitor voltage converter circuit according to another embodiment of the present invention.

FIG. 26 is a circuit schematic diagram showing a switched capacitor voltage converter circuit according to another embodiment of the present invention. As shown in FIG. 26, the switched capacitor voltage converter circuit 190 of the present invention includes resonant capacitors C1~C2, switches Q1~Q7, and an inductor L. The switches Q1~Q2 are connected in series with the corresponding resonant capacitors C1~C2 respectively, and the switch Q3 is connected in series with the inductor L.

The switches Q1~Q7 can switch the coupling relationships of the resonant capacitors C1~C2 with the inductor L according to corresponding operation signals. In the first process, according to the first operation signal GA, the switches Q1~Q3 are turned ON and the switches Q4~Q7 are turned OFF, so that resonant capacitors C1~C2 are connected in series with each other, and the series connection of the resonant capacitors C1~C2 is further connected in series with the inductor L between the first voltage V1 and second voltage V2, to form a first current path for the charging process. In the second process, according to the second operation signal GB, the switches Q4~Q7 are turned ON and the switches Q1~Q3 are turned OFF, so that the resonant capacitors C1~C2 are connected in parallel with each other, and the parallel connection of the resonant capacitors C1~C2 is further connected in series with the inductor L between the second voltage V2 and ground potential, to form a second current paths for the discharging process. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1. In this embodiment, the DC bias voltage of each resonant capacitor C1~C2 is the second voltage V2; therefore, the resonant capacitors C1~C2 in this embodiment only need to withstand a lower-rated voltage, so a capacitor with a smaller size can be used.

The control circuit 1901 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

In one embodiment, the voltage conversion ratio between the first voltage V1 and the second voltage V2 of the switched capacitor voltage converter circuit 190 is adjustable to be 3:1 or 2:1.

Figure 27:
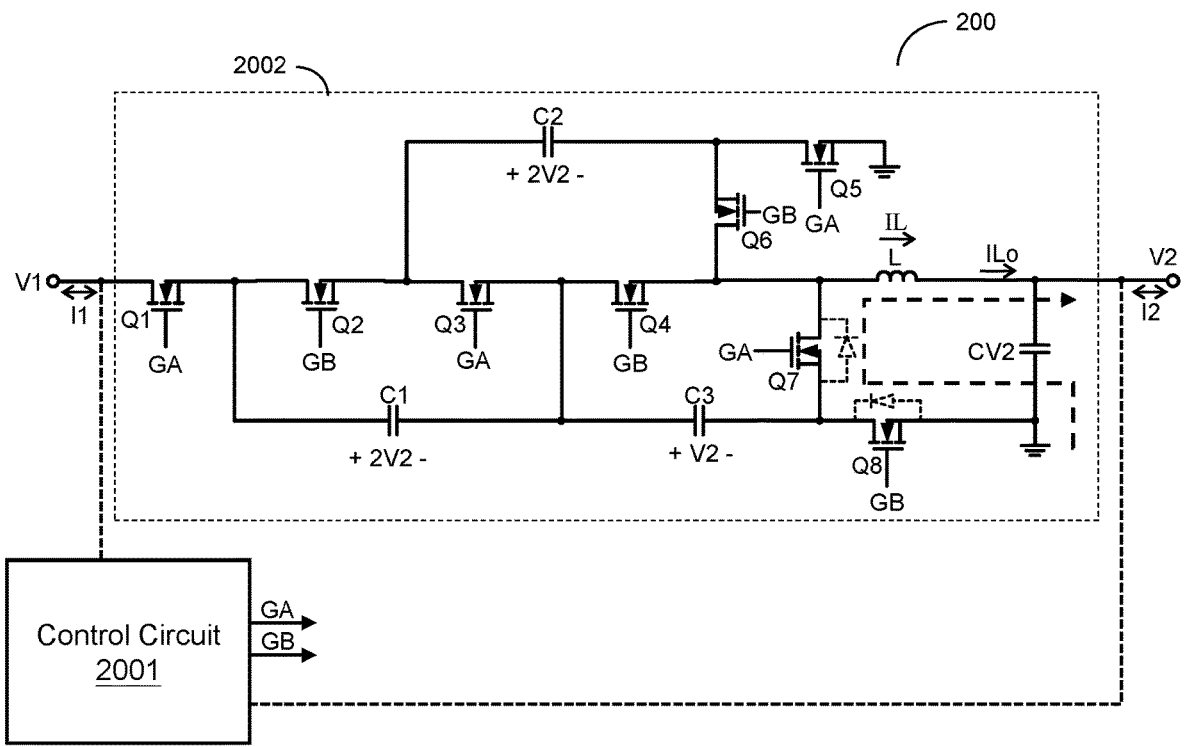
FIG. 27 shows a schematic circuit diagram of a switched capacitor voltage converter circuit according to another embodiment of the present invention.

FIG. 27 shows a schematic circuit diagram of a switched capacitor voltage converter circuit according to another embodiment of the present invention. As shown in FIG. 27, the switched capacitor voltage converter circuit 200 of the present invention includes a resonant capacitor C3, non-resonant capacitors C1~C2, switches Q1~Q8, and an inductor L.

The switches Q1~Q8 can switch the coupling relationships of the resonant capacitor C3 and non-resonant capacitors C1~C2 with the inductor L according to corresponding operation signals. In the first process, according to the first operation signal GA, the switches Q1, Q3, Q5, and Q7 are turned ON, whereas, the switches Q2, Q4, Q6, and Q8 are turned OFF, whereby the non-resonant capacitor C1, resonant capacitor C3, and inductor L are connected in series between the first voltage V1 and second voltage V2, and one end of the non-resonant capacitor C2 is coupled between the non-resonant capacitor C1 and resonant capacitor C3, whereas, the other end of non-resonant capacitor C2 is coupled to the ground potential to, form a first current path for the charging process. In the second process, according to the second operation signal GB, the switches Q2, Q4, Q6, and Q8 are turned ON, whereas, the switches Q1, Q3, Q5, and Q7 are turned OFF, whereby the resonant capacitor C3 and inductor L are connected in series between the second voltage V2 and ground potential to form a second current path for the discharging process. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1.

The control circuit 2001 of this embodiment can be implemented by using the control circuit structure of FIGS. 2A and 2B; please refer to the detailed descriptions of FIGS. 2A and 2B. As shown in FIG. 27, when the control circuit 2001 decreases the duty ratio of the first operation signal GA and/or the second operation signal GB according to the predetermined ratio, in the first process and/or the second process, when the plural switches (e.g., switches Q1~Q8) are all non-conductive, one end of the inductor L is conducted through the body diodes (shown by the dashed line in FIG. 27) of at least one switch (e.g., switches Q8 and Q7) to a DC potential, so that the inductor current ILo flowing toward the second voltage V2 is a linear ramp current to adjust the predetermined ratio.

Figure 28:
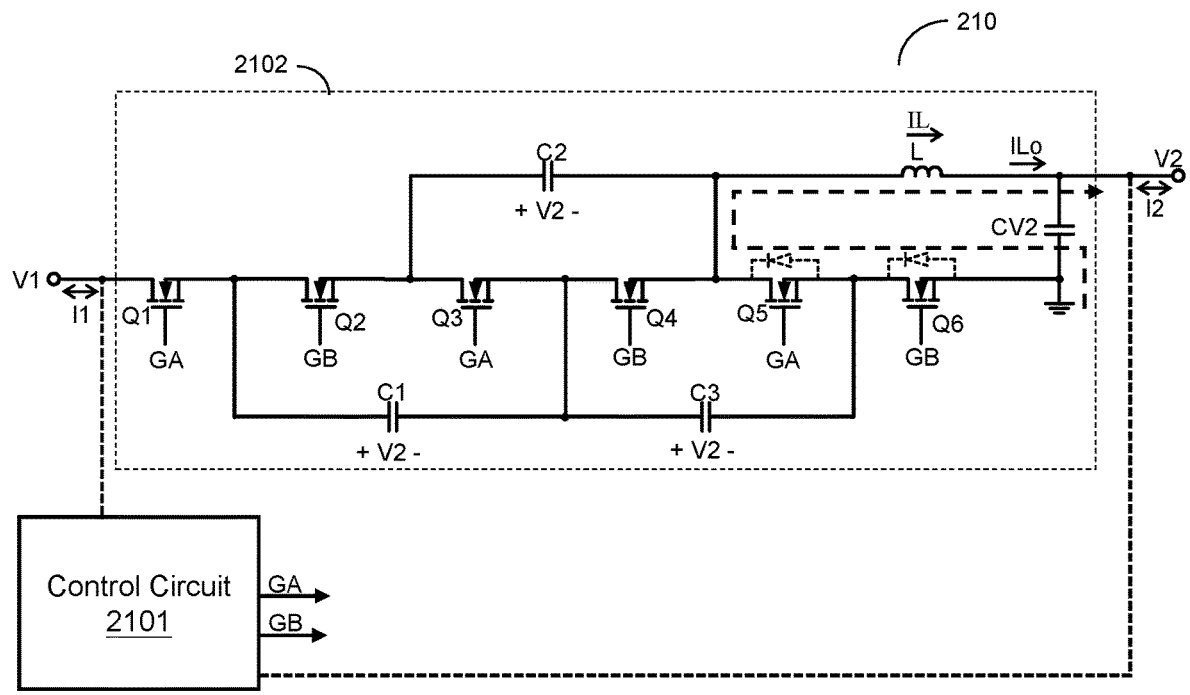
FIG. 28 shows a schematic circuit diagram of a switched capacitor voltage converter circuit according to another embodiment of the present invention.

FIG. 28 is a circuit schematic diagram showing a switched capacitor voltage converter circuit according to another embodiment of the present invention. As shown in FIG. 28, the switched capacitor voltage converter circuit 210 of the present invention includes a resonant capacitor C3, non-resonant capacitors C1~C2, switches Q1~Q6, and an inductor L.

The switches Q1~Q6 can switch the coupling relationships of the resonant capacitor C3 and non-resonant capacitors C1~C2 with the inductor L according to corresponding operation signals. In the first process, according to the first operation signal GA, the switches Q1, Q3, and Q5 are turned ON, whereas, the switches Q2, Q4, and Q6 are turned OFF, whereby the non-resonant capacitor C2 and the resonant capacitor C3 are connected in parallel, and the parallel connection of the non-resonant capacitor C2 and the resonant capacitor C3 is connected in series with the non-resonant capacitor C1 and inductor L between the first voltage V1 and second voltage V2 to form a first current path for the charging process. In the second process, according to the second operation signal GB, the switches Q2, Q4, and Q6 are turned ON, and the switches Q1, Q3, and Q5 are turned OFF, so that the resonant capacitor C3 and inductor L are connected in series between the second voltage V2 and ground potential, ro form a second current path for the discharging process. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1.

The control circuit 2101 of this embodiment can be implemented by using the control circuit structure of FIGS. 2A and 2B; please refer to the detailed descriptions of FIGS. 2A and 2B. As shown in FIG. 28, when the control circuit 2101 decreases the duty ratio of the first operation signal GA and/or the second operation signal GB according to the predetermined ratio, in the first process and/or the second process, when the plural switches (e.g., switches Q1~Q6) are all non-conductive, one end of the inductor L is conducted through the body diodes (as shown by the dashed line in FIG. 28) of at least one switch (e.g., switches Q5 and Q6) to a DC potential, so that the inductor current ILo flowing toward the second voltage V2 is a linear ramp current, to adjust the predetermined ratio.

Figure 29:
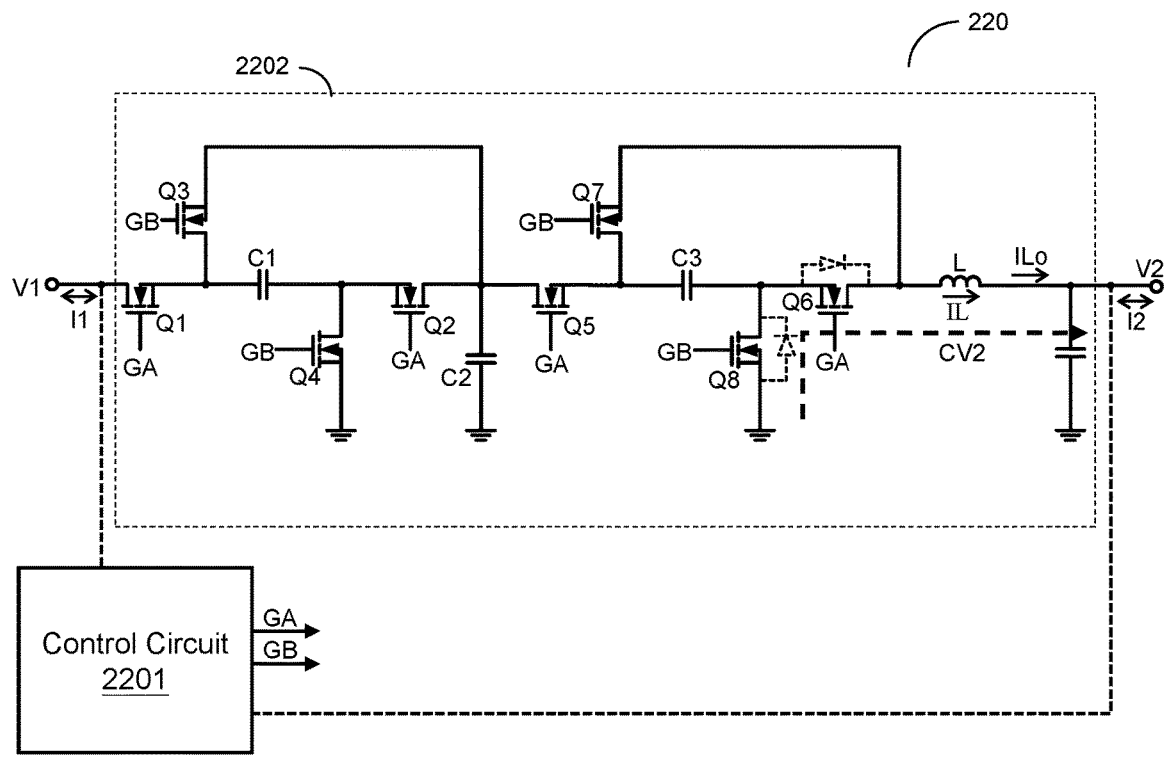
FIG. 29 shows a schematic circuit diagram of a switched capacitor voltage converter circuit according to another embodiment of the present invention.

FIG. 29 shows a schematic circuit diagram of a switched capacitor voltage converter circuit according to another embodiment of the present invention. As shown in FIG. 29, the switched capacitor voltage converter circuit 220 of the present invention includes a resonant capacitor C3, non-resonant capacitors C1~C2, switches Q1~Q8, and an inductor L.

The switches Q1~Q8 can switch the coupling relationships of the corresponding resonant capacitor C3 and the non-resonant capacitors C1~C2 with inductor L according to corresponding operation signals. In the first process, according to the first operation signal GA, the switches Q1, Q2, Q5, and Q6 are turned ON, whereas, the switches Q3, Q4, Q7, and Q8 are turned OFF, whereby the non-resonant capacitor C1, resonant capacitor C3, and inductor L are connected in series between the first voltage V1 and second voltage V2, and one end of the non-resonant capacitor C2 is coupled between the non-resonant capacitor C1 and resonant capacitor C3, whereas the other end of the non-resonant capacitor C2 is coupled to the ground potential, to form a first current path for the charging process. In the second process, according to the second operation signal GB, the switches Q3, Q4, Q7, and Q8 are turned ON, whereas, the switches Q1, Q2, Q5, and Q6 are turned OFF, whereby the resonant capacitor C3 and inductor L are connected in series between the second voltage V2 and ground potential to form a second current path for the discharging process. It should be noted that the above-mentioned first process and the above-mentioned second process are performed in a repeated, alternating manner, in different time periods rather than concurrently, to convert the first voltage V1 to second voltage V2 or to convert the second voltage V2 to first voltage V1.

The control circuit 2201 of this embodiment can be implemented by using the control circuit structure of FIGS. 2A and 2B; please refer to the detailed descriptions of FIGS. 2A and 2B. The inductor current freewheeling is similar to that described with reference to FIG. 2C, and please refer to the detailed description of FIG. 2C.

Figure 30:
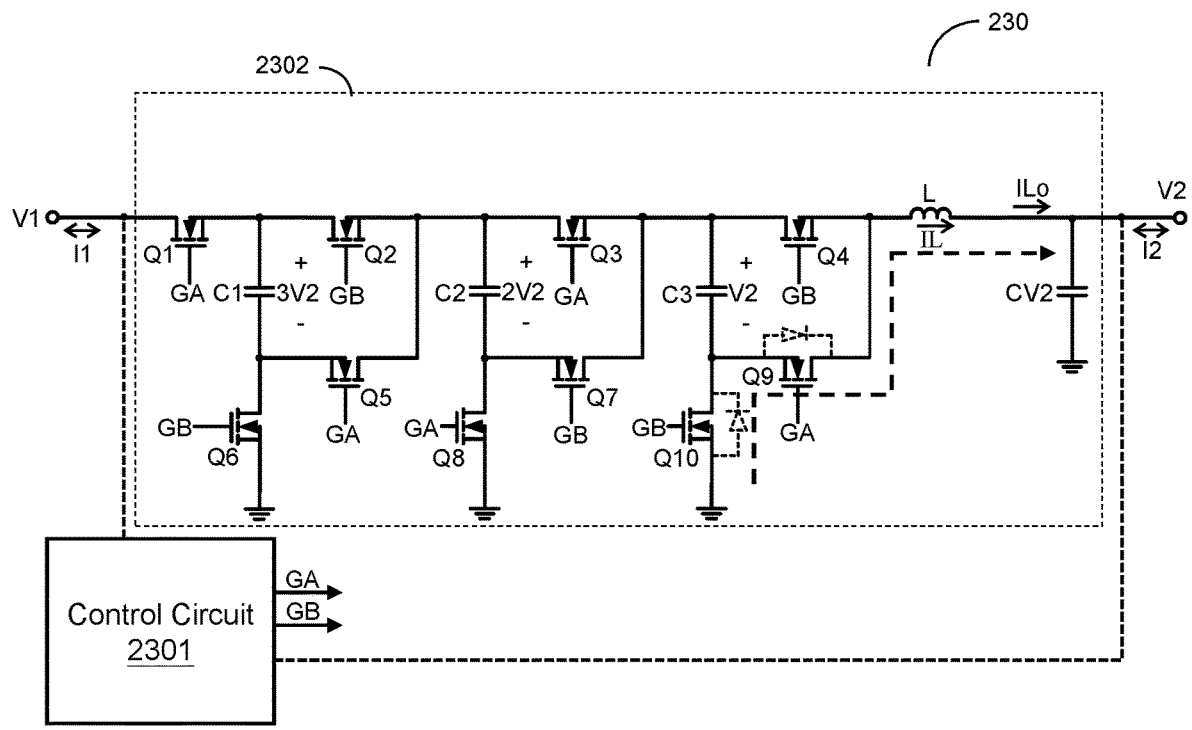
FIG. 30 shows a schematic circuit diagram of a switched capacitor voltage converter circuit according to another embodiment of the present invention.

FIG. 30 shows a schematic circuit diagram of a switched capacitor voltage converter circuit according to another embodiment of the present invention. As shown in FIG. 30, the switched capacitor voltage converter circuit 230 of the present invention includes resonant capacitors C1~C3, switches Q1~Q10, and an inductor L.

The switches Q1~Q10 can switch the coupling relationships of the resonant capacitor C1~C3 with inductor L according to the corresponding operation signal. In the first process, according to the first operation signal GA, the switches Q1, Q3, Q5, Q8, and Q9 are turned ON, whereas, the switches Q2, Q4, Q6, Q7, and Q10 are turned OFF, whereby the resonant capacitor C1, resonant capacitor C3 and inductor L are connected in series between the first voltage V1 and second voltage V2, and one end of the resonant capacitor C2 is coupled between the resonant capacitor C1 and resonant capacitor C3, whereas, the other end of the resonant capacitor C2 is coupled to the ground potential, to form a first current path for the charging process. In the second process, according to the second operation signal GB, the switches Q2, Q4, Q6, Q7, and Q10 are turned ON, whereas, the switches Q1, Q3, Q5, Q8, and Q9 are turned OFF, whereby the resonant capacitor C1 and resonant capacitor C2 are connected in series, and the series connection of the resonant capacitor C1 and resonant capacitor C2 is connected in parallel with the resonant capacitor C3, and the parallel connection is further connected in series with the inductor L between the second voltage V2 and the ground potential, to form a second current path for discharging process. It should be noted that the above-mentioned first process and the above-mentioned second process are performed in different time periods in a repeated, alternating manner, to convert the first voltage V1 to second voltage V2 or to convert the second voltage V2 to first voltage V1.

The control circuit 2301 of this embodiment can be implemented by using the control circuit structure of FIGS. 2A and 2B; please refer to the detailed descriptions of FIGS. 2A and 2B. As shown in FIG. 30, when the control circuit 2301 decreases the duty ratio of the first operation signal GA and/or the second operation signal GB according to the predetermined ratio, in the first process and/or the second process, when the plural switches (e.g., switches Q1~Q10) are non-conductive, one end of the corresponding inductor L is conducted through the body diodes (shown by the dotted line in FIG. 30) of at least one of the switches (e.g., switches Q10 and Q9) to a DC potential, so that the inductor current ILo flowing toward the second voltage V2 is a linear ramp current, to adjust the predetermined ratio.

The present invention provides a switched capacitor voltage converter circuit as described above. By adjusting the duty ratios and/or the operation frequencies and by keeping the inductor current freewheeling, this invention improves the power conversion efficiency, reduces the switching loss, reduces the voltage stress on the switches and the inductor, reduces the required size of the inductor, and the output voltage is adjustable.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switched capacitor voltage converter circuit configured to convert a first voltage into a second voltage or to convert the second voltage into the first voltage, the switched capacitor voltage converter circuit comprising:
   a switched capacitor converter coupled between the first voltage and second voltage; and
   a control circuit configured to generate a control signal to control the switched capacitor converter to convert the first voltage to the second voltage or to convert the second voltage to the first voltage;
   wherein the switched capacitor converter includes:
   at least one resonant capacitor;
   a plurality of switches coupled to the at least one resonant capacitor; and
   at least one inductor;
   wherein the control signal generated by the control circuit includes a first operation signal and a second operation signal, wherein the first operation signal is configured to operate first plural switches of the plurality of switches, and the second operation signal is configured to operate second plural switches of the plurality of switches;
   wherein, in a first process, the first operation signal controls the first switches so that the at least one resonant capacitor and a corresponding one of the at least one inductor are connected in series between the first voltage and second voltage, to form a first current path and to operate in resonant operation;
   wherein, in at least one second process, the second operation signal controls the second switches so that the at least one resonant capacitor and the corresponding inductor are connected in series between the second voltage and a DC potential, to simultaneously form or sequentially form a plurality of second current paths and operate in resonant operation;
   wherein the first switches and the second switches have respective conduction periods which do not overlap each other, so that the first process and the second process do not overlap each other;
   wherein the control circuit adjusts an operation frequency and/or a duty ratio of the first operation signal and/or an operation frequency and/or a duty ratio of the second operation signal according to a predetermined ratio, so as to adjust a ratio between the first voltage and second voltage to the predetermined ratio;
   wherein the first process and the at least one second processes are performed in a repeated, alternating manner, so as to convert the first voltage into the second voltage or to convert the second voltage into the first voltage;
   wherein when the control circuit decreases the duty ratio of the first operation signal and/or the second operation signal according to the predetermined ratio, in the first process and/or the second process, when the first switches and/or the second switches are turned ON, an inductor current flowing toward the second voltage is in a first state, wherein the first state is that the inductor current flowing toward the second voltage is a resonant current, and wherein when the control circuit decreases the duty ratio of the first operation signal and/or the second operation signal according to the predetermined ratio, in the first process and/or in the second process, the inductor current flowing through the corresponding inductor keeps freewheeling along a current freewheeling path, whereby the inductor current flowing toward the second voltage is in a second state, such that the inductor current of the corresponding inductor is rendered to switch between the first state and the second state, thereby performing inductive power conversion.

2. The switched capacitor voltage converter circuit as claimed in claim 1, wherein the second state is that the inductor current flowing toward the second voltage is a non-resonant current.

3. The switched capacitor voltage converter circuit as claimed in claim 2, wherein the second state is that the inductor current stops flowing toward the second voltage, or the inductor current flowing toward the second voltage is a linear ramp current.

4. The switched capacitor voltage converter circuit as claimed in claim 3, in the first process and/or the second process, when the first switches and the second switches are non-conductive, the inductor current is in the second state, and the current freewheeling path along which the inductor current flows includes a body diode in a corresponding switch of the first or second switches.

5. The switched capacitor voltage converter circuit as claimed in claim 4, wherein when the control circuit decreases the duty ratio of the first operation signal and/or the duty ratio of the second operation signal according to the predetermined ratio, in the first process and/or the second process, when the first switches and the second switches are all non-conductive, one end of the corresponding inductor is conducted through the body diode of at least one switch to the DC potential, so that the inductor current flowing toward the second voltage is the linear ramp current, to adjust the predetermined ratio.

6. The switched capacitor voltage converter circuit as claimed in claim 4, wherein when the control circuit decreases the duty ratio of the first operation signal and/or the second operation signal according to the predetermined ratio, in the first process and/or the second process, when the first switches and the second switches are non-conductive, by means of a conduction of the body diode in at least one of the switches, the inductor current flowing through the corresponding inductor keeps freewheeling along a closed-loop formed by a resonant tank and the body diode in the at least one switch, so that the second state is that the inductor current stops flowing toward the second voltage, wherein the resonant tank is formed by the at least one resonant capacitor and the at least one inductor.

7. The switched capacitor voltage converter circuit as claimed in claim 2, further comprising a non-resonant capacitor coupled to the resonant capacitor, wherein a voltage across the non-resonant capacitor is maintained at a constant DC voltage in the first process and the second process.

8. The switched capacitor voltage converter circuit as claimed in claim 2, wherein the first voltage is twice the second voltage, and the first operation signal and second operation signal have respective corresponding operation frequencies.

9. The switched capacitor voltage converter circuit as claimed in claim 8, the duty ratio of the first operation signal and the duty ratio of the second operation signal are both 50%.

10. The switched capacitor voltage converter circuit as claimed in claim 2, wherein the predetermined ratio is a ratio of the first voltage to the second voltage, and the operation frequency of the first operation signal and/or the operation frequency of the second operation signal is in positive correlation to the predetermined ratio.

11. The switched capacitor voltage converter circuit as claimed in claim 2, wherein the operation frequency of the first operation signal is higher than a resonant frequency of the at least one resonant capacitor and the corresponding inductor in the first process, and the operation frequency of the second operation signal is higher than a resonant frequency of the at least one resonant capacitor and the corresponding inductor in the second process.

12. The switched capacitor voltage converter circuit as claimed in claim 2, wherein the predetermined ratio is a positive integer not less than 2.

13. The switched capacitor voltage converter circuit as claimed in claim 2, wherein the switched capacitor converter comprises a distributed switched capacitor converter, series-parallel switched capacitor converter, Dickson switched capacitor converter, ladder switched capacitor converter, doubler switched capacitor converter, Fibonacci switched capacitor converter, pipelined switched capacitor converter, or switched cavity converter.

14. The switched capacitor voltage converter circuit as claimed in claim 13, wherein the series-parallel switched capacitor converter includes: a 2-to-1 series-parallel switched capacitor converter, 3-to-1 series-parallel switched capacitor converter, or 4-to-1 series-parallel switched capacitor converter.

15. The switched capacitor voltage converter circuit as claimed in claim 2, wherein the DC potential is ground potential.

16. The switched capacitor voltage converter circuit as claimed in claim 2, wherein the control circuit comprises:
a current sensing circuit for sensing a current flowing through the at least one inductor to generate a current sensing signal; and
a control signal generation circuit which is coupled to the current sensing circuit and which is configured to generate the control signal according to the current sensing signal and predetermined ratio.

17. The switched capacitor voltage converter circuit as claimed in claim 1, wherein in the first process and/or the second process, after the inductor current flowing through the corresponding inductor is decreased to zero, the plurality of switches remain non-conductive for a zero-current period.

18. A switched capacitor voltage conversion method for converting a first voltage into a second voltage or the second voltage into the first voltage, the switched capacitor voltage conversion method comprising:
operating a plurality of first switches according to a first operation signal;
operating a plurality of second switches according to a second operation signal;
wherein, in a first process, the first operation signal controls the first switches so that at least one resonant capacitor and a inductor are connected in series between the first voltage and second voltage, to form a first current path and to operate in resonant operation;
wherein, in at least one second process, the second operation signal controls the second switches so that the at least one resonant capacitor and the inductor are connected in series between the second voltage and a DC potential, to simultaneously form or sequentially form a plurality of second current paths and operate in resonant operation; and adjusting an operation frequency and/or a duty ratio of the first operation signal and/or an operation frequency and/or a duty ratio of the second operation signal according to a predetermined ratio, so as to adjust a ratio between the first voltage and second voltage to the predetermined ratio;

wherein the first switches and the second switches have respective conduction periods which do not overlap each other, so that the first process and the second process do not overlap each other;

wherein the first process and the at least one second processes are performed in a repeated, alternating manner, so as to convert the first voltage into the second voltage or to convert the second voltage into the first voltage;

wherein when the duty ratio of the first operation signal and/or the second operation signal is decreased according to the predetermined ratio, in the first process and/or the second process, when the first switches and/or the second switches are turned ON, an inductor current flowing toward the second voltage is in a first state, wherein the first state is that the inductor current flowing toward the second voltage is a resonant current, and wherein when the duty ratio of the first operation signal and/or the second operation signal is decreased according to the predetermined ratio, in the first process and/or in the second process, the inductor current flowing through a corresponding inductor keeps freewheeling along a current freewheeling path, whereby the inductor current flowing toward the second voltage is in a second state, such that the inductor current of the corresponding inductor is rendered to switch between the first state and the second state, thereby performing inductive power conversion.

19. The switched capacitor voltage conversion method of claim 18, wherein the second state is that the inductor current flowing toward the second voltage is a non-resonant current.

20. The switched capacitor voltage conversion method of claim 19, wherein the second state is that the inductor current stops flowing toward the second voltage, or the inductor current flowing toward the second voltage is a linear ramp current.

21. The switched capacitor voltage conversion method as claimed in claim 20, in the first process and/or the second process, when the first switches and the second switches are non-conductive, the inductor current is in the second state, and the current freewheeling path along which the inductor current flows includes a body diode in a corresponding switch of the first or second switches.

22. The switched capacitor voltage conversion method as claimed in claim 21, wherein when the duty ratio of the first operation signal and/or the duty ratio of the second operation signal is decreased according to the predetermined ratio, in the first process and/or the second process, when the first switches and the second switches are all non-conductive, one end of the corresponding inductor is conducted through the body diode of at least one switch to the DC potential, so that the inductor current flowing toward the second voltage is the linear ramp current, to adjust the predetermined ratio.

23. The switched capacitor voltage conversion method as claimed in claim 21, wherein when the duty ratio of the first operation signal and/or the second operation signal is decreased according to the predetermined ratio, in the first process and/or the second process, when the first switches and the second switches are non-conductive, by means of a conduction of the body diode in at least one of the switches, the inductor current flowing through the corresponding inductor keeps freewheeling along a closed-loop formed by a resonant tank and the body diode in the at least one switch, so that the second state is that the inductor current stops flowing toward the second voltage, wherein the resonant tank is formed by the at least one resonant capacitor and the at least one inductor.

24. The switched capacitor voltage conversion method as claimed in claim 19, further comprising providing a non-resonant capacitor coupled to the resonant capacitor, wherein a voltage across the non-resonant capacitor is maintained at a constant DC voltage in the first process and the second process.

25. The switched capacitor voltage conversion method as claimed in claim 19, wherein the first voltage is twice the second voltage, and the first operation signal and second operation signal have respective corresponding operation frequencies.

26. The switched capacitor voltage conversion method as claimed in claim 25, wherein the duty ratio of the first operation signal and the duty ratio of the second operation signal are both 50%.

27. The switched capacitor voltage conversion method as claimed in claim 19, wherein the predetermined ratio is a ratio of the first voltage to the second voltage, and the operation frequency of the first operation signal and/or the operation frequency of the second operation signal is in positive correlation to the predetermined ratio.

28. The switched capacitor voltage conversion method as claimed in claim 19, wherein the operation frequency of the first operation signal is higher than a resonant frequency of the at least one resonant capacitor and the corresponding inductor in the first process, and the operation frequency of the second operation signal is higher than a resonant frequency of the at least one resonant capacitor and the corresponding inductor in the second process.

29. The switched capacitor voltage conversion method as claimed in claim 19, wherein the predetermined ratio is a positive integer not less than 2.

30. The switched capacitor voltage conversion method as claimed in claim 19, further comprising providing a switched capacitor converter which includes the plurality of first switches, the plurality of second switches, the at least one resonant capacitor and the inductor, wherein the switched capacitor converter comprises a distributed switched capacitor converter, series-parallel switched capacitor converter, Dickson switched capacitor converter, ladder switched capacitor converter, voltage doubler switched capacitor converter, Fibonacci switched capacitor converter, pipelined switched capacitor converter, or switched cavity converter.

31. The switched capacitor voltage conversion method as claimed in claim 30, wherein the series-parallel switched capacitor converter includes: a 2-to-1 series-parallel switched capacitor converter, 3-to-1 series-parallel switched capacitor converter, 4-to-1 series-parallel or switched capacitor converter.

32. The switched capacitor voltage conversion method as claimed in claim 19, wherein the DC potential is ground potential.

33. The switched capacitor voltage conversion method as claimed in claim 19, further including:
sensing a current flowing through the inductor to generate at least one current sensing signal; and
generating the first operation signal and/or the second operation signal according to the current sensing signal and the predetermined ratio.

34. The switched capacitor voltage conversion method as claimed in claim 18, wherein in the first process and/or the second process, after the inductor current flowing through the corresponding inductor is decreased to zero, the first and second switches remain non-conductive for a zero-current period.

* * * * *